(12) United States Patent
Deutsch et al.

(10) Patent No.: US 11,784,786 B2
(45) Date of Patent: Oct. 10, 2023

(54) MITIGATING SECURITY VULNERABILITIES WITH MEMORY ALLOCATION MARKERS IN CRYPTOGRAPHIC COMPUTING SYSTEMS

(71) Applicant: Intel Corporation, Santa Clara, CA (US)

(72) Inventors: Sergej Deutsch, Hillsboro, OR (US); David M. Durham, Beaverton, OR (US); Karanvir S. Grewal, Hillsboro, OR (US); Michael D. LeMay, Hillsboro, OR (US); Michael E. Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 17/214,222

(22) Filed: Mar. 26, 2021

(65) Prior Publication Data
US 2021/0240638 A1    Aug. 5, 2021

Related U.S. Application Data

(60) Provisional application No. 63/065,840, filed on Aug. 14, 2020.

(51) Int. Cl.
*G06F 9/50* (2006.01)
*G06F 12/121* (2016.01)
(Continued)

(52) U.S. Cl.
CPC .......... *H04L 9/0618* (2013.01); *G06F 9/5016* (2013.01); *G06F 12/121* (2013.01);
(Continued)

(58) Field of Classification Search
CPC .. G06F 9/5016; G06F 12/121; G06F 12/1408; G06F 12/1458; G06F 2212/7207; G06F 12/1441
(Continued)

(56) References Cited

U.S. PATENT DOCUMENTS 9,436,847 B2   9/2016 Durham et al.
10,838,878 B2  11/2020 Barnes
(Continued)

OTHER PUBLICATIONS

Wikipedia; "Stack buffer overflow" article retrieved from the Internet at https://en.wikipedia.org/wiki/Stack_buffer_overflow#Stack_canaries, page version as of Jan. 13, 2021, 7 pages.
(Continued)

*Primary Examiner* — Prasith Thammavong
*Assistant Examiner* — Sidney Li
(74) *Attorney, Agent, or Firm* — Alliance IP, LLC

(57) ABSTRACT

Technologies disclosed herein provide one example of a processor that includes a register to store a first encoded pointer for a first memory allocation for an application and circuitry coupled to memory. Size metadata is stored in first bits of the first encoded pointer and first memory address data associated with the first memory allocation is stored in second bits of the first encoded pointer. The circuitry is configured to determine a first memory address of a first marker region in the first memory allocation, obtain current data from the first marker region at the first memory address, compare the current data to a reference marker stored separately from the first memory allocation, and determine that the first memory allocation is in a first state in response to a determination that the current data corresponds to the reference marker.

25 Claims, 30 Drawing Sheets

(51) Int. Cl.
*G06F 12/14* (2006.01)
*H04L 9/06* (2006.01)
*H04L 9/08* (2006.01)
*H04L 9/32* (2006.01)

(52) U.S. Cl.
CPC ...... *G06F 12/1408* (2013.01); *G06F 12/1441* (2013.01); *G06F 12/1458* (2013.01); *G06F 2212/7207* (2013.01)

(58) Field of Classification Search
USPC .......................................................... 711/163
See application file for complete search history.

(56) References Cited

U.S. PATENT DOCUMENTS

| | | | |
|---|---|---|---|
| 2002/0194184 A1 | 12/2002 | Baskins et al. | |
| 2003/0037248 A1 | 2/2003 | Launchbury et al. | |
| 2011/0109431 A1* | 5/2011 | Bragagnini | G07C 9/38 340/5.52 |
| 2013/0080790 A1* | 3/2013 | Pean | G06F 12/14 713/189 |
| 2019/0227951 A1 | 7/2019 | Durham et al. | |
| 2019/0272159 A1* | 9/2019 | Pizlo | G06F 8/434 |
| 2021/0218547 A1 | 7/2021 | Weiler et al. | |
| 2021/0224380 A1 | 7/2021 | Grocutt | |
| 2021/0374047 A1 | 12/2021 | Lie et al. | |

OTHER PUBLICATIONS

Chefmax, "AddressSanitizer," May 15, 2019, retrieved on Jan. 23, 2022 from https://github.com/google/sanitizers/wiki/Address-Sanitizer, 9 pages.
Liljestrand, Hands; "Protecting the stack with PACed canaries," article retrieved from the Internet at https://arxiv.org/pdf/1909.05747.pdf#:~:text=A%20stack%20canary%20is%20a,the%20canary%20before%20function%20return; Sep. 2019; 6 pages.
Phillips, Mitch, "AddressSanitizerAlgorithm," Oct. 3, 2017, retrieved on Jan. 23, 2022 from https://github.com/google/sanitizers/wiki/AddressSanitizerAlgorithm, 7 pages.
Serebryany, Konstantin et al, "AddressSanitizer: A Fast Address Sanity Checker," USENIX ATC 2012, retrieved on Jan. 23, 2022 from https://www.usenix.org/conference/usenixfederatedconferencesweek/addresssanitizer-fast-address-sanity-checker, 10 pages.
Wikipedia; "Shadow Stack" article retrieved from the Internet at https://en.wikipedia.org/w/index.php?title=Shadow_stack&oldid=997384056, page version as of Dec. 31, 2020, 2 pages.
USPTO Non-Final OA for U.S. Appl. No. 17/213,568 (11 pages).

* cited by examiner

MITIGATING SECURITY VULNERABILITIES WITH MEMORY ALLOCATION MARKERS IN CRYPTOGRAPHIC COMPUTING SYSTEMS

CROSS REFERENCE TO RELATED APPLICATIONS

This application claims the benefit of priority under 35 U.S.C. § 119 to U.S. Provisional Application No. 63/065,840, entitled "Encoded Stack Pointers" and filed Aug. 14, 2020, the entire disclosure of which is incorporated herein by reference.

TECHNICAL FIELD

This disclosure relates in general to the field of computer systems, more particularly, to mitigating security vulnerabilities with memory allocation markers in cryptographic computing systems.

BACKGROUND

Protecting memory in computer systems from software bugs and security vulnerabilities is a significant and ongoing concern. A use-after-free attack or vulnerability can occur when certain memory is allocated to a pointer and subsequently allocated to a second pointer after the memory has been freed. If the original pointer is used again and points to some place within the re-allocated memory and changes data, this can be used to read the new data or to corrupt the memory. Additionally, the new pointer can be used to access the old data. Repeatedly clearing memory with every memory allocation is inefficient and can negatively impact performance. Thus, different approaches are needed to prevent use-after-free attacks and other security vulnerabilities and to provide memory safety to computing systems.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
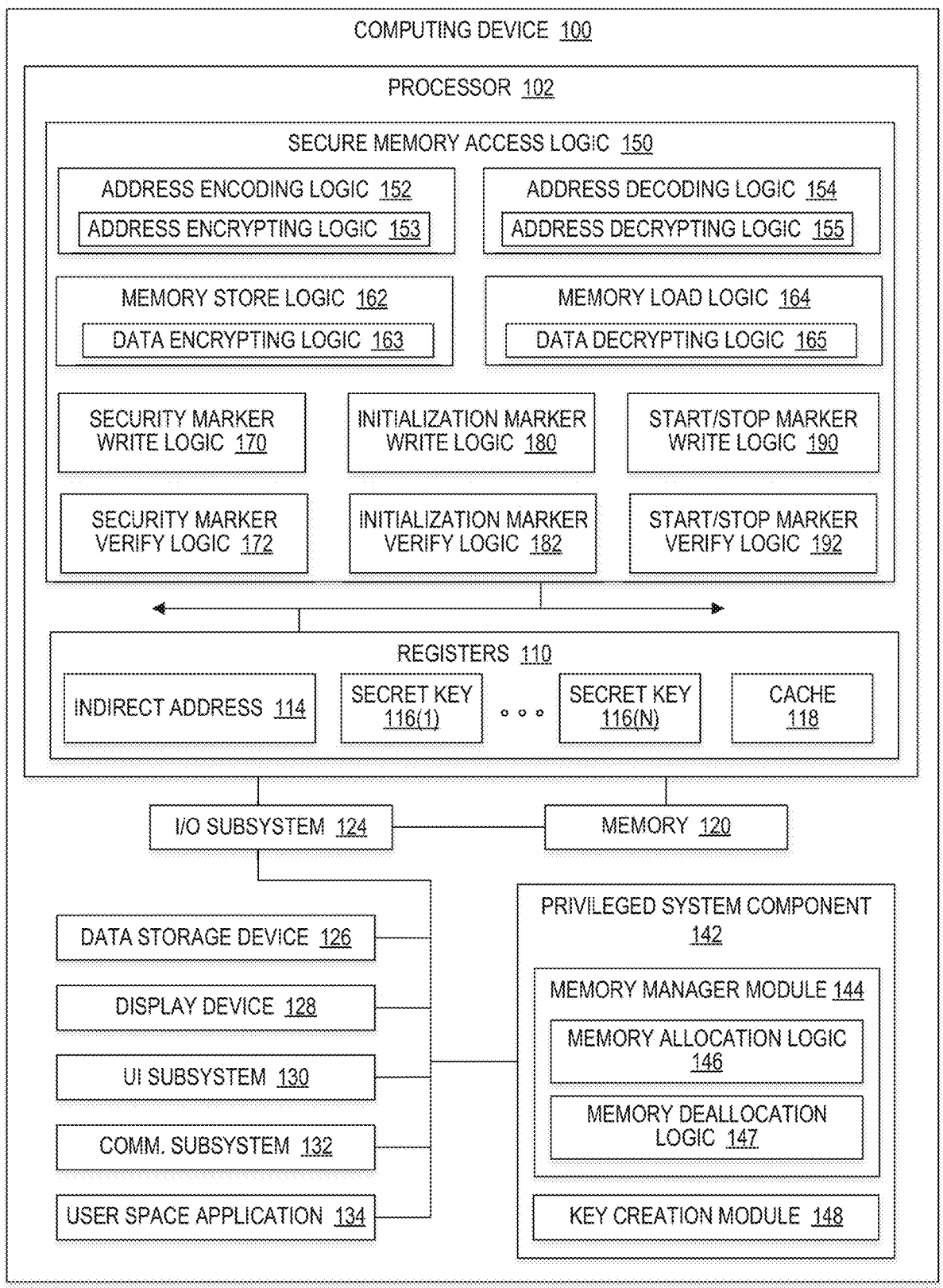
FIG. 1 is a simplified block diagram of an example computing device configured with secure memory access logic according to an embodiment.

The following disclosure provides various possible embodiments, or examples, for implementations of techniques to mitigate security vulnerabilities such as use-after-free vulnerabilities in the context of cryptographic computing. Generally, cryptographic computing may refer to computer system security solutions that employ cryptographic mechanisms inside processor components as part of its computation. Some cryptographic computing systems may implement the encryption and decryption of pointer addresses (or portions thereof), keys, data, and/or code in a processor core using encrypted memory access instructions. Thus, the microarchitecture pipeline of the processor core may be configured in such a way to support such encryption and decryption operations.

At least some embodiments disclosed in this application are related to pointer based data encryption in which a pointer to a memory location for data is encoded with a tag and/or other metadata and may be used to derive at least a portion of tweak input to data cryptographic (e.g., encryption and decryption) algorithms used to encrypt and decrypt the data. Thus, a cryptographic binding can be created between the cryptographic addressing layer and data/code encryption and decryption. This implicitly enforces bounds since a pointer that strays beyond the end of an object (e.g., data) is likely to use an incorrect tag and/or other metadata value for that adjacent object. In one or more embodiments, a pointer is encoded with a linear address (also referred to herein as "memory address") to a memory location and metadata. A slice or segment of the address in the pointer includes a plurality of bits and may be encrypted (and decrypted) based on a secret address key and an address tweak. The address tweak can include a portion of the encoded pointer and possibly additional metadata. Such encrypted pointer that strays beyond its bounds will likely be decrypted incorrectly due to bit flips in the encrypted portion of the address or in the tweak, hence preventing out-of-bound access.

For purposes of illustrating the several embodiments of techniques for mitigating security vulnerabilities in cryptographic computing systems, it is important to first understand the operations and activities associated with data protection and memory safety. Accordingly, the following foundational information may be viewed as a basis from which the present disclosure may be properly explained.

Cryptographic computing offers a fine-grain protection model with protections that are cryptographic, where processors and accelerators alike utilize secret keys and ciphers to provide access control and separation at increasingly finer granularities. Further, instead of virtual machine and process separation in some systems, with cryptographic computing, individual functions may become the boundary, allowing address spaces to be shared via pointers that are encrypted, with the encrypted pointers and keys providing controlled access down to individual data objects.

Cryptographic computing may leverage the concept of a cryptographic addressing layer where the processor encrypts (and decrypts) at least a portion of software allocated memory addresses (addresses within the linear/virtual address space, also referred to as "pointers" and "indirect addresses") based on implicit and explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can include an encrypted portion (or slice) of the memory address and some bits of metadata (e.g., context information). When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, an incorrectly decrypted address will cause a fault and get caught by the processor.

A cryptographically encoded pointer, or any portion thereof such as cryptographic addresses (or address slices), may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data stored in memory is also referred to herein as a "data tweak".

**Cryptographic computing can use any suitable form of block cipher cryptography for data encryption and for pointer encryption. Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64-bit computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64-bit, 48-bit, 32-bit, 16-bit, etc. using Simon, Speck, tweakable K-cipher, PRINCE or any other block cipher).

Lightweight ciphers suitable for pointer encryption have also emerged recently. The PRINCE cipher, for example, can be implemented in 3 clocks requiring as little as 799 µm$^2$ of area in the 10 nm process, providing half the latency of AES in a tenth the Silicon area. Cryptographic computing may utilize these new ciphers, as well as others, introducing novel computer architecture concepts including, but not limited to: (i) cryptographic addressing, e.g., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the reference data, or any suitable combination thereof as tweaks for the data encryption. A variety of encryption modes that are tweakable can be used for this purpose of including metadata (e.g. counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other logic) with an input block to produce the encrypted or decrypted block. In some block ciphers, the keystream is fed into the next block cipher to perform encryption or decryption. **

In one or more examples, some metadata may be encoded in a pointer to indicate the size of the allocation in memory. For example, some pointers may be encoded with metadata specifying a power-of-two slot size (also referred to herein as power size) in memory containing the object (e.g., code or data). Such an encoding may be particularly useful for smaller pointers (e.g., 64-bit pointers) used in heap and/or stack memory. In another example, some pointers may contain a value representing the actual size of the memory region that is allocated and referenced by the pointer. Such embodiments may be implemented using pointers that include enough bits to accommodate at least a size field and a portion (or slice) of the memory address. Pointers encoded with the actual size of an allocated memory region may be particularly useful for stack allocations. However, in some scenarios, such pointers may also be used for heap allocations.

In cryptographic computing, data may be encrypted and decrypted using counter mode encryption and decryption. Counter mode cryptography used in cryptographic computing utilizes a keystream for data encryption and decryption that is not reused in order to ensure data confidentiality. The keystream can be generated by a tweakable block cipher in an embodiment. Because the keystream depends on the allocated pointer and the size of the allocation (e.g., metadata specifying power-of-two slot size or a value representing the actual size of an allocated memory region), the system may generate an identical keystream if a new memory allocation overlaps with a previously freed allocation that was assigned to the same slot in memory with the same address and the same size. Since this new overlapping memory allocation can have an identical encoded pointer and identical keystream as those of the old allocation, the new pointer can potentially access plaintext data of the previous allocation and/or the old pointer can read plaintext data written through the new pointer (use-after-free).

One existing solution to prevent these possible data leakages involves clearing the memory content each time memory is freed. This technique, however, can result in significant and unacceptable performance overhead, particularly for applications with frequent, large memory allocations. These memory accesses may be inefficient since most memory allocations are not likely to overlap with old memory allocations having the same size. Furthermore, clearing memory involves writing data to each memory region that is deallocated during the execution of an application, which can be expensive. Another existing solution involves keeping track of recently used memory allocations and locking them in quarantine to prevent re-use of the memory region, which may still be populated with old data. Quarantining old allocations, however, requires maintaining state information as well as preventing old memory allocations from being re-allocated. This can result in performance overhead as well as memory usage overhead for the life of an application.

Embodiments disclosed in this application can resolve these issues and more. At least some of the embodiments provide mechanisms for reducing overhead and preventing data leakage in cryptographic computing systems. Markers can be used in some embodiments to indicate the state of memory when memory allocation operations and memory access operations are performed. Markers that indicate the state of memory can include security markers and initialization markers. Security markers prevent data leakage from old and new memory allocations, and initialization markers enable overhead that accompanies clearing memory during memory allocations and deallocations to be reduced without putting the security of the encryption process at risk. Markers can also include bounds markers to prevent buffer overflows and underflows.

Embodiments including security markers provide an efficient mechanism to prevent data leakage without relying on erasing the memory content every time memory is deallocated. In at least one embodiment, when a memory range of a memory allocation is to be deallocated, a security marker is written in a marker region of the allocation. The marker region is defined by a midpoint of a slot of memory to which the memory allocation is assigned. Once the allocated memory is deallocated, the security marker enables detection of potential data leakage from the old allocation when any new memory range is subsequently allocated and assigned to the same slot with the same address and size (for heap) or allocated in the same stack frame (for stack).

A security marker is data of any suitable size (e.g., 8 bytes, 16 bytes, etc.) that represents a value selected for a particular entity (e.g., computing system, operating system, virtual machine, application, memory allocation) to indicate the state of memory in a new memory allocation (e.g., during the memory allocation process). The presence of the selected security marker in a new memory allocation indicates that the new memory allocation overlaps with an old memory allocation and that old data written in the old allocation and any potential new data to be written in the new allocation are at risk of unauthorized accesses.

In one embodiment implementing security marker checks, a selected security marker is saved as a reference. During memory deallocation (or free) processes, the reference security marker is written to a marker region defined within the allocated memory before it is deallocated. The security marker, along with other contents in the allocated memory range, are encrypted to prevent an adversary from ascertaining the security marker and other contents after the allocated memory range is deallocated. On every new allocation, current data is obtained from a marker region defined in the new allocation. The ciphertext (encrypted data) read from the marker region is decrypted to produce current data of that marker region. The current data is compared to the reference security marker. If the current data of the marker region in the new allocation and the reference security marker match, then this indicates that objects in the new memory allocation will be encrypted and decrypted using the same keystream that was generated and used to encrypt and decrypt objects of an overlapping previous allocation that was assigned to the same slot with the same address and size (for heap) or a previous allocation in the same stack frame (for stack). This scenario could potentially result in inadvertent or intentional leakage of the old content (e.g., data) stored in the old allocation (i.e., deallocated memory range). Furthermore, a dangling (freed) pointer to the old allocation may potentially be used for unauthorized access to new content stored in the new allocation. Thus, appropriate action may be taken to ensure that the old content is protected from the new pointer to the new memory allocation and that the new content is protected from the old (dangling) pointer of the deallocated memory range.

Other embodiments disclosed in this application provide a mechanism to prevent exposure of a keystream generated in a cryptographic computing system for encrypting and decrypting data in a particular memory allocation. In counter mode cryptography, the same keystream used to encrypt data is used to decrypt that same data, where the data has been encrypted by performing a logic operation such as an XOR to the data and the keystream, or applying a combination of logic operations to the data and the keystream. An adversary can exploit this property if memory is first initialized to a known value, such as zero. For example, if a cryptographic computing system encrypts a known value, such as zero, by generating a keystream and applying a logic operation (e.g., XOR) to the zero value and the keystream, and then stores the encrypted result in the memory allocation as an initialization value, then an adversary can use the stored initialization value (encrypted zero), the original known value (zero), and the XOR logic to calculate the keystream. The keystream can then be applied to encrypted data that subsequently overwrites the initialization value (encrypted zero) to reveal the unencrypted data.

To prevent such data stealing, in one or more embodiments, an initialization marker can be defined that indicates memory is uninitialized (as opposed to free). An initialization marker is data of any suitable size (e.g., 8 bytes, 16 bytes, etc.) that represents a value selected for a particular entity (e.g., computing system, operating system, virtual machine, application, memory allocation) to indicate the state of a memory allocation during a memory access request. The presence of the selected initialization marker in a memory allocation indicates that the memory allocation has not been initialized, while the absence of the initialization marker in the memory allocation indicates the memory has been initialized. Other ciphertext markers (e.g., in the chunk headers) may indicate that the initialization value in the marker region is a particular, unencrypted value.

In one embodiment implementing initialization marker checks, an initialization marker can be written to a marker region within an uninitialized memory allocation to indicate to the processor during a subsequent memory access request (e.g., a load) that the requested memory has not yet been initialized with a particular data value. When the processor sees that the initialization marker is present in the targeted memory allocation that is uninitialized, an initialization value (e.g., zero) can be loaded into the register. This avoids having to store an encrypted known value into the memory allocation, from which the keystream could potentially be calculated by an adversary and used to decrypt data that is later stored in that memory allocation.

In some scenarios, the initialization markers can be used with other ciphertext markers that indicate that the memory has been initialized with a particular value. For example, some memory allocation operations may initialize a new allocation by writing a zero value directly to the allocation without encrypting the zero value first. Thus, ciphertext markers indicating such an initialization may be checked in conjunction with initialization markers as disclosed herein.

Yet other embodiments disclosed in this application provide a mechanism to prevent buffer overflow and underflow conditions. Buffer overflow or underflows can occur when a pointer for a memory allocation of a certain size with a beginning location and an ending location tries to read or write before the beginning location or past the ending location. Accordingly, in one or more embodiments, stop and start markers can be defined that indicate where the memory allocation begins and ends, respectively. Start and stop markers can be data of any suitable size (e.g., 8 bytes, 16 bytes, etc.) that represent values selected for a particular entity (e.g., computing system, operating system, virtual machine, application, function, memory allocation) to indicate a beginning and an ending, respectively, of a memory allocation, and which may be checked during a memory access request. In one embodiment, during a memory allocation operation, the size of memory to be allocated can be increased to accommodate the bound markers. The start marker can be stored at the beginning of the allocated memory range and the stop marker can be stored at the end of the allocated memory range.

Turning to FIG. 1, FIG. 1 is a simplified block diagram of an example computing device 100 configured with secure memory access logic implementing a data leakage prevention technique according to at least one embodiment of the present disclosure. In the example shown, the computing device 100 includes a processor 102 having a set of secure memory access logic 150 and a number of registers 110. Secure memory access logic 150 includes memory store logic 162 with data encrypting logic 163 to encrypt data based on various keys and/or tweaks and then store the encrypted data in memory. Secure memory access logic 106 also includes memory load logic 164 with data decrypting logic 165 to read encrypted data from memory and then decrypt the encrypted data based on the keys and/or tweaks.

The secure memory access logic 106 utilizes metadata about an indirect address 114, which is encoded into unused bits of the indirect address 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 114. For example, the metadata encoding and decoding provided by the secure memory access logic 150 can prevent the indirect address 114 from being manipulated to cause a buffer overflow, and/or can prevent program code from accessing memory that it does not have permission to access. Address encoding logic 152 of the secure memory access logic 150 is invoked when memory is allocated (e.g., by an operating system, in the heap or in the stack) and provided to executing programs in any of a number of different ways, including by using a function such as malloc, alloc, or new; or implicitly via the loader, or statically allocating memory by the compiler, etc. As a result, the indirect address 114, which points to the allocated memory, is encoded with the address metadata. Address decoding logic 154 of the secure memory access logic 150 may be invoked when memory is deallocated (e.g., by an operating system, in the heap or in the stack) and made available for reallocation in any of a number of different ways, including by using a function such as delete or free; or implicitly via the loader, or statically deallocating memory by the compiler, etc. As a result, the deallocated memory (or a portion thereof) may be reallocated and a new indirect address 114 for the new memory allocation can be encoded with the new address metadata.

The address metadata can include valid range metadata. The valid range metadata allows executing programs to manipulate the value of the indirect address 114 within a valid range, but will corrupt the indirect address 114 if the memory is accessed using the indirect address 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the indirect address 114 (e.g., whether the indirect address 114 can be used to write, execute, or read the referenced memory).

In at least some other examples, other metadata (or context information) can be encoded in the unused bits of indirect address 114 such as a size of plaintext address slices (e.g., number of bits in a plaintext slice of a memory address embedded in the indirect address), a memory allocation size (e.g., bytes of allocated memory referenced by the indirect address), a type of the data or code (e.g., class of data or code defined by programming language), permissions (e.g., read, write, and execute permissions of the indirect address), a location of the data or code (e.g., where the data or code is stored), the memory location where the pointer itself is to be stored, an ownership of the data or code, a version of the indirect address (e.g., a sequential number that is incremented each time an indirect address is created for newly allocated memory, determines current ownership of the referenced allocated memory in time), a tag of randomized bits (e.g., generated for association with the indirect address), a privilege level (e.g., user or supervisor), a cryptographic context identifier (or crypto context ID) (e.g., randomized or deterministically unique value for each indirect address), etc. For example, in one embodiment, the address metadata can include power size metadata that encodes the size of a plaintext address slice in the indirect address. The power size metadata may specify a number of lowest order bits in the indirect address that can be modified by the executing program. The power size metadata is dependent on the amount of memory requested by a program. Accordingly, if 16 bytes are requested, then power size metadata is encoded as 4 (or 00100 in five upper bits of the pointer) and the 4 lowest bits of the pointer are designated as modifiable bits to allow addressing to the requested 16 bytes of memory.

In some examples, the address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Address decoding logic 154 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory at which the destination address for the control transfer is stored. The example secure memory access logic 150 can be embodied as part of processor instructions (e.g., as part of the processor instruction set architecture), or microcode (e.g., instructions that are stored in read-only memory and executed directly by the processor 102). In other embodiments, portions of the secure memory access logic 150 may be embodied as hardware, firmware, software, or a combination thereof (e.g., as programming code executed by a privileged system component 142 of the computing device 100). For example, the secure memory access logic 150 may be embodied in software as an instruction set emulator (e.g., a binary instrumentation tool such as a PIN Tool) that emulates the instruction logic utilizing the encoded addresses as disclosed herein.

The secure memory access logic 150 is executable by the computing device 100 to provide security for indirect addresses "inline," e.g., during execution of a program (such as a user space software application) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the indirect address 114 may be embodied as, for example, a data pointer (which refers to a location of data), a code pointer (which refers to a location of executable code), an instruction pointer, or a stack pointer. Indirect addresses may be referred to by other terminology, such as "pointer," "address pointer," or "pointer address." As used herein, "metadata" may refer to, among other things, information about or relating to an indirect address 114, such as a valid data range, a valid code range, pointer access permissions, a size of plaintext address slice (e.g., encoded as a power in bits), a memory allocation size, a type of the data or code, a location of the data or code, an ownership of the data or code, a version of the indirect address, a tag of randomized bits, version, a privilege level of software, a cryptographic context identifier, etc.

As used herein, "memory load logic" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory store logic" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory.

The example secure memory access logic 150 includes address encoding logic 152 (which includes address encrypting logic 153), address decoding logic 154 (which includes address decrypting logic 155), memory store logic 162 (which includes data encrypting logic 163), and memory load logic 164 (which includes data decrypting logic 165). Illustratively, the address decoding logic 154 may be embodied in memory store logic 162 and memory load logic 164, and may be embodied in other processor instructions, or as a separate instruction or series of instructions, or as higher-level code executed by a privileged system component such as an operating system kernel or virtual machine monitor, or as an instruction set emulator. The address encoding logic 152 uses at least some metadata (e.g., one or more of valid range, permission metadata, size (power), memory allocation size, type, location, ownership, version, tag value, privilege level (e.g., user or supervisor), crypto context ID, etc.) and a secret key (e.g., secret key 116(1)), in order to secure the indirect address 114 at the memory allocation/access level. Also as described in more detail below, the data encrypting logic 163 and data decrypting logic 165 each operate on data (referenced by indirect address 114) using at least a portion of the indirect address and a secret key (e.g., secret key 116(1)-116(N)), in order to secure the data at the memory location referenced by the indirect address 114 by binding the data encryption to the indirect address.

The example indirect address 114 is embodied as a register 110 (e.g., a general-purpose register of the processor 102). The example secret keys 116(1)-116(N) may be generated by a key creation module 148 of a privileged system component 142, and stored in one of the registers 110 (e.g., a special purpose register or machine specific register (MSR)), or another memory location that is readable by the processor 102. In some embodiments, the secret keys 116(1)-116(N) may be stored in a location that is readable only by the processor. In other embodiments, the secret keys 116(1)-116(N) used to secure indirect addresses, data, and code can be stored in another memory location, such as in firmware, in a secure portion of the data storage device 126 or another data storage device, in external memory, or another form of memory suitable for performing the functions described herein. In some embodiments, tweaks for encrypting addresses, data, or code may be computed in real time for the encryption or decryption. Tweaks may be stored in registers 110, another memory location that is readable by the processor 102 (e.g., firmware, a secure portion of a data storage device 126, etc.), in external memory, or another form of memory suitable for performing the functions described herein.

It should be noted that embodiments described herein allow for any number of secret keys to be used for a particular program. Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, embodiments further described herein may refer to "secret address key" or "address key" to refer to the use of a secret key in encryption and decryption operations of memory addresses and "secret data key" or "data key" to refer to the use of a secret key in operations to encrypt and decrypt data or code.

On (or during) a memory allocation operation (e.g., a "malloc"), memory allocation logic 146 allocates a range of memory for a buffer and returns the indirect address 114 and the metadata (e.g., one or more of range, permission metadata, power size, memory allocation size, type, location, ownership, version, tag, privilege level, crypto context ID, etc.). For example, the memory allocation logic 146 may encode plaintext range information in the indirect address 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 is embodied in a memory manager module 144 of the privileged system component 142. The memory allocation logic 146 initiates the address encoding logic 152. The address encoding logic 152 encodes the indirect address 114 with the metadata (e.g., range, permission metadata, power size, memory allocation size, type, location, ownership, version, tag value, privilege level, crypto context ID, some suitable combination thereof, etc.) and potentially an "adjustment," for example if range metadata is encoded, as described below. The address encoding logic 152 stores the metadata in an unused portion of the indirect address 114 (e.g., non-canonical bits of a 64-bit address). For some metadata or combinations of metadata, the indirect address 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the indirect address 114. Address adjustment logic adjusts the valid range metadata as needed so that the upper address bits (e.g., most significant bits) of the addresses in the address range do not change as long as the indirect address 114 refers to a memory location that is within the valid range indicated by the range metadata. This enables the indirect address 114 to be manipulated (e.g., by software performing arithmetic operations, etc.) but only so long as the manipulations do not cause the indirect address 114 to go outside the valid range (e.g., overflow the buffer).

In an embodiment, address encoding logic 152 uses the valid range metadata to select a portion (or slice) of the indirect address 114 to be encrypted. In other embodiments, the slice of the indirect address 114 to be encrypted may be known a priori (e.g., upper 32 bits, lower 32 bits, etc.). The address encrypting logic 153 encrypts the selected slice of the indirect address 114 (and the adjustment, in some embodiments), using the secret address key 116(1) and optionally, an address tweak, as described further below. On a memory access operation (e.g., a read, write, or execute operation), the address decoding logic 154 decodes the previously-encoded indirect address 114. To do this, the address decrypting logic 155 decrypts the encrypted slice of the indirect address 114 (and in some embodiments, the encrypted adjustment) using the secret key (e.g., keys 116(1)-116(N)) and an address tweak, as described further below.

The indirect address 114 is returned to its original (e.g., canonical) form, based on appropriate operations in order to restore the original value of the indirect address 114 (e.g., the true, original linear memory address). To do this in at least one possible embodiment, the address metadata encoded in the unused bits of the indirect address 114 is removed (e.g., return the unused bits to their original form). If the indirect address 114 decodes successfully, the memory access operation completes successfully. However, if the encoded indirect address 114 has been manipulated (e.g., by software, inadvertently or by an attacker) so that its value falls outside the valid range indicated by the range metadata (e.g., overflows the buffer), the indirect address 114 will be corrupted as a result of the decrypting process performed by the address decrypting logic 155. A corrupted indirect address will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides security against buffer overflow attacks and similar exploits.

On (or during) a memory deallocation or free operation, memory deal location logic 147 deallocates or releases the range of memory addresses allocated in memory. Once a memory range is deallocated, the memory range or any portion thereof can be reallocated and the contents can be overwritten with new objects (e.g., data). In one or more embodiments to prevent data leakage, memory deallocation logic 147 initiates security marker write logic 170 to store a security marker in a predefined location within the allocated memory range that is being deallocated, and memory allocation logic 146 initiates security marker verify logic 172 to determine whether a security marker is present in a newly allocated memory range.

In one or more embodiments, security marker write logic 170 can store a security marker in a predefined location of a memory range that is to be deallocated. Once the memory allocation for the memory range is deallocated, as long as the security marker remains readable (e.g., has not been overwritten by other allocations) then the deallocated memory range may still contain old data that could be exposed by a new allocation that is assigned to the same slot (for heap) or that has the same return address location (for stack). In one or more embodiments, security marker verify logic 172 is configured to check a marker region in the memory range of the new memory allocation to determine whether the security marker is present. If the security marker is present, this indicates a potential use-after-free vulnerability. In particular, the presence of the security marker indicates that the new allocation will have an encoded pointer (or encoded indirect address) with the same base address and size as the old allocation and that the contents of the new allocation will be encrypted and decrypted with the same keystream as the old allocation. Consequently, the new encoded pointer could be used to read old data that is still stored in the memory range of the old allocation. In addition, the old encoded pointer (or encoded indirect address) may be used to access and decrypt new data stored in the new memory allocation. Accordingly, the security marker verify logic 172 may take appropriate action to prevent these possibilities. In one example, when the security marker is determined to be present in a particular memory range being allocated, the memory range may be cleared (e.g., with all zeros, all ones, random bits, or any other value that cannot be easily ascertained by an adverse party. In another example, when the security marker is determined to be present in a particular memory range being allocated, a different memory range that is assigned to a different slot (for heap) or a different stack frame (for stack) may be selected and allocated.

In one or more embodiments to prevent keystream exposure in cryptographic computing, an initialization marker can be used to indicate whether a particular new memory allocation has been initialized. In one example, memory allocation logic 146 initiates security marker write logic 180 to store an initialization marker in a marker region defined in the new allocation. Subsequent memory access operations (e.g., read, load, move, etc.) for data at a memory address within the allocated memory range can initiate initialization marker verify logic 182 to determine whether an initialization marker is present in the allocated memory range. If the initialization marker is present, then an initialization value such as zeroes is loaded into the register for the memory access request.

In one or more embodiments to prevent buffer overflow and underflow conditions in cryptographic computing, bound markers (e.g., start and stop markers) can be used to indicate whether a particular memory access request has gone beyond the end of its allocated bounds. In one example, memory allocation logic 146 initiates bounds marker write logic 190 to store start and stop markers at the beginning and end of a memory range of a new allocation. Subsequent memory access operations (e.g., read, load, move, write, etc.) using an indirect address (or encoded pointer) for the allocated memory range can initiate bounds marker verify logic 192 to determine whether the memory access request has exceeded the bounds of the allocated memory range. A fault can be raised if the bounds are exceeded and thus, data that is outside the bounds of the allocated memory range is corrupted or exposed.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 150.

The computing device 100 also includes memory 120, an input/output subsystem 124, a data storage device 126, a display device 128, a user interface (UI) subsystem 130, a communication subsystem 132, a user space application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single-core or multi-core central processing unit (CPU), a multiple-CPU processor or processing/controlling circuit, or multiple diverse processing units or circuits (e.g., CPU and Graphics Processing Unit (GPU), etc.). The processor 102 has a number of registers 110, which include general purpose registers and special purpose registers. The indirect address 114 and the secret keys 116(1)-116(N) are stored in registers 110. The memory 120 of the computing device 100 may be embodied as any type of volatile or non-volatile memory or data storage capable of performing the functions described herein. In operation, the memory 120 may store various data and software used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to affect such communication. The communication subsystem 132 may be embodied as a network adapter, including a wireless network adapter.

The example computing device 100 also includes a number of computer program components, such as one or more user space applications (e.g., user space application 134) and the privileged system component 142. The user space applications may be embodied as any computer applications (e.g., software, firmware, hardware, or a combination thereof) that interact directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space applications (e.g., user space application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes a number of computer program components, such as the memory manager module 144 and the key creation module 148. Each of the components of the privileged system component 142 may be embodied as software, firmware, or hardware, or any combination thereof. For example, the components of the privileged system component 142 may be embodied as modules of an operating system kernel, a virtual machine monitor, or a hypervisor. Furthermore, privileged system component 142 may be part of a trusted execution environment (TEE), virtual machine, processor 102, a co-processor (not shown), or any other suitable hardware, firmware, or software in computing device 100 or securely connected to computing device 100.

The memory allocation logic 146 of memory manager module 144 can allocate portions of memory 120 to the various processes running on the computing device 100 (e.g., as ranges of virtual memory addresses). The memory deallocation logic 147 of memory manager module 144 can release/deallocate portions of memory 120 that are allocated to the various processes running on the computing device 100. The memory manager module 144 is embodied as, for example, a loader, a memory manager service, or a heap management service.

The key creation module 148 creates the secret keys 116(1)-116(N) (e.g., secret address keys and secret data keys) and writes them to a register or registers to which the processor 102 has read access (e.g., a special purpose register). To create a secret key, the key creation module 148 may execute, for example, a random number generator or another algorithm capable of generating a secret key that can perform the functions described herein. It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
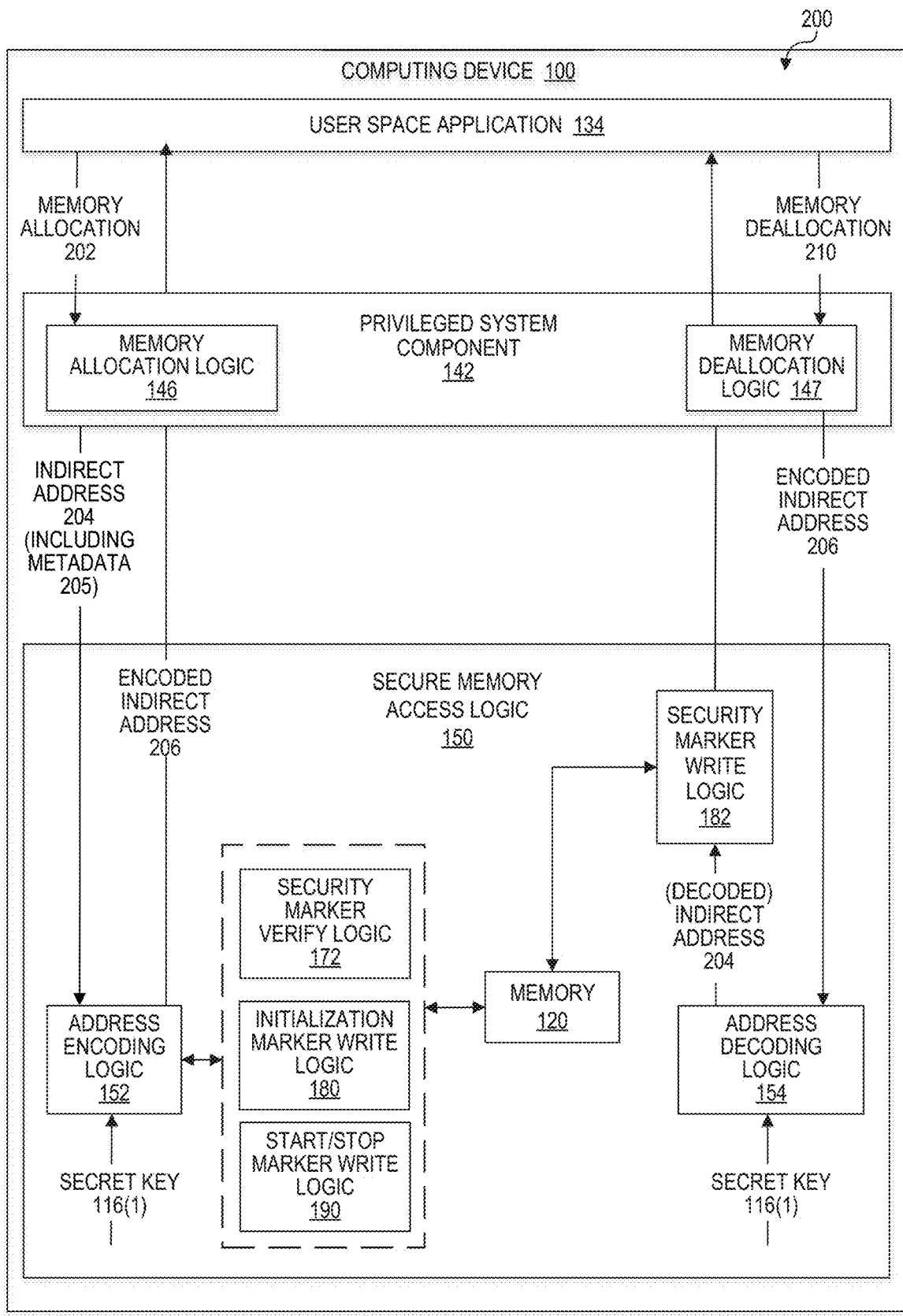
FIGS. 2A and 2B show a simplified environment diagram illustrating applications of the secure memory access logic of FIG. 1 according to an embodiment.
Figure 2B:
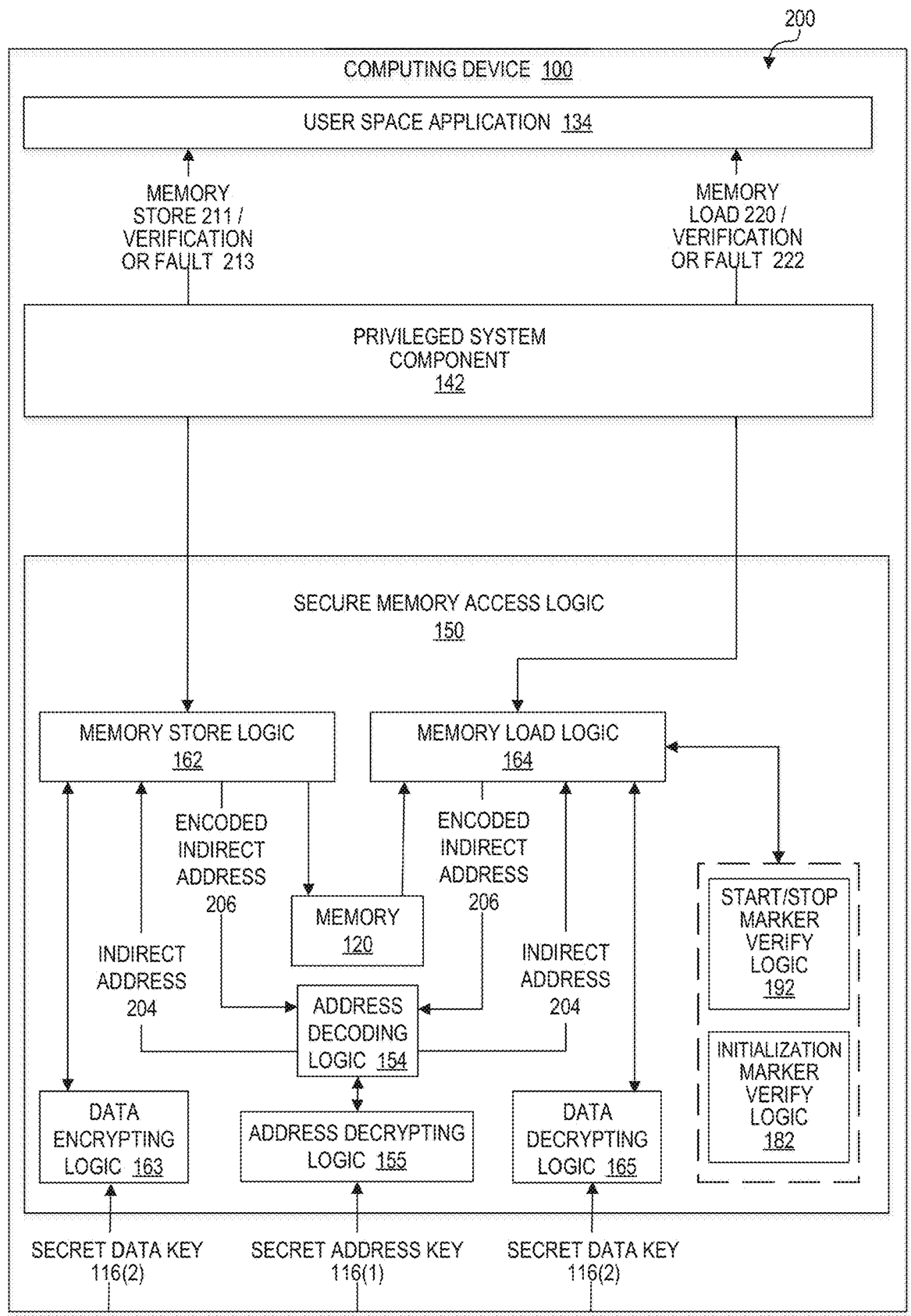

FIGS. 2A-2C are a simplified environment diagrams illustrating different applications of the secure memory access logic of FIG. 1 according to at least one embodiment of the present disclosure. In some embodiments, the computing device 100 may establish an environment 200 during operation (e.g., native and/or virtual runtime or "execution" environments). The various modules depicted in the example environment 200 may be embodied as hardware, firmware, software, or a combination thereof.

With reference to FIG. 2A, in the environment 200, the user space application 134 (or the privileged system component 142, e.g., in loading a user space application 134) may, from time to time, during the operation of the computing device 100, issue a memory allocation 202. The memory allocation 202 may be translated (e.g., compiled or interpreted), as needed, by the memory allocation logic 146 of the privileged system component 142 before being passed on to the processor 102. In other scenarios, the memory allocation may be an implicit request for memory by certain instructions in a program. For example, calling a function that needs stack memory for local variables, passing parameters to a function, or declaring local variables may be implicit requests for memory to be allocated in stack for the particular object(s) or data element(s) and other related information needing to be stored (e.g., return address for a calling function, passed parameter, local variable data).

In the processor 102, the address encoding logic 152 is executed in response to the memory allocation 202 (e.g., in place of a conventional "malloc" instruction/function call for dynamic memory allocation, or in place implicit memory allocation operations for stack). Whereas a conventional malloc instruction or implicit memory allocation operation simply allocates memory and returns an (unsecured) pointer, the address encoding logic 152 encodes an indirect address 204 (e.g., a pointer containing a memory address), including metadata 205 (e.g., the range permission information, power size, memory allocation size, type, location, ownership, version, tag, privilege level, crypto context ID or key, or any combination thereof, etc.), as described herein, and returns an encoded indirect address 206. The metadata may be embedded in the indirect address or pointer (e.g., a standard 64-bit register or enlarged register such as 128 bits or 256 bits to fit more metadata) in a plaintext format, embedded within another operand that is provided to the pointer encryption/decryption instructions and data access instructions, stored in a control register, stored in a table in memory, or provided via any combination thereof. For example, the power size metadata may be embedded in the pointer and the crypto context ID may be stored in a control register.

In addition to address encoding logic 152, one or more other operations may be performed in one or more embodiments to prevent data leakage resulting from the new allocation, prevent exposure of the keystream to be generated for encrypting/decrypting data to be stored in the new allocation, and/or preventing buffer overflow and underflow conditions when accessing the new allocation. Such operations may be performed by security marker verify logic 172, initialization marker write logic 180, and bounds marker write logic 190. Once an indirect address is encoded for a new memory allocation, security marker verify logic 172 may be performed to determine whether the new memory allocation overlaps with a prior memory allocation. If a security marker is present in a marker region in the memory range of the new memory allocation, this indicates that the new allocation will have the same encoded indirect address (or encoded pointer) and keystream as the old allocation. Consequently, the new encoded indirect address could be used to read old data that is still stored in the old allocation, which overlaps with the new allocation. Accordingly, appropriate action to prevent this possibility. In one example, the new memory allocation may be cleared (e.g., with all zeros, all ones, random bits, or any other value that cannot be easily ascertained by an adverse party). In another example, a different memory range that is assigned to a different slot (for heap) or a different stack frame (for stack) may be selected and allocated, and the address encoding logic 152 can encode a different indirect address.

Additional operations may be performed during memory allocation 202 to prevent later exposure of the keystream that would be generated during encryption and decryption operations using the encoded indirect address. The initialization marker write logic 180 can perform such operations to store an initialization marker in a marker region defined in the new allocation. The initialization marker indicates that the new allocation has not been initialized with zeros or any other data. In one embodiment, the initialization marker may be stored at a midpoint defined by a slot in memory to which the new memory allocation is assigned, as will be further described herein. In some embodiments, the initialization marker can indicate that a particular value is to be loaded into the register. For example, one initialization marker may indicate that all ones are to be loaded into the register, while another initialization marker may indicate that a random value is to be loaded into the register. By indicating a particular value, the value can be used to initialize memory without actually encrypting the initialization value. Without the initialization value being known a priori and being encrypted and stored in the memory allocation, an adversary would be unable to derive the counter mode keystream used to encrypt data stored in the memory allocation.

In one or more embodiments, other operations may be performed during memory allocation 202 to prevent buffer overflow and underflow conditions on the new memory allocation. The bounds marker write logic 190 can perform such operations to store a start marker at the beginning of the new memory allocation and a stop marker at the end of the new memory allocation. The size of the memory allocation may be increased before the indirect address is encoded to allow room for bound markers in the allocation. Start and stop markers may be any value selected to indicate that an attempted memory access that includes either marker exceeds the upper or lower bounds of the memory allocation.

The user space application 134 (or the privileged system component 142, e.g., in loading a user space application 134) may also, from time to time, during the operation of the computing device 100, issue a memory deallocation 210 to deallocate or free memory that is currently allocated. The memory deallocation 210 may be translated (e.g., compiled or interpreted), as needed, by the memory deallocation logic 147 of the privileged system component 142 before being passed on to the processor 102. In other scenarios, the memory deallocation may be an implicit request to deallocate memory by certain instructions in a program. For example, returning from an executing function that uses stack memory to a calling function or program may be an implicit request to deallocate memory such as a stack frame allocated for the executing function.

In the processor 102, address decoding logic 154 may be executed in response to the memory deallocation 210 (e.g., in place of a conventional "free" instruction/function call). Whereas a conventional free instruction simply deallocates memory, the address decoding logic 154 may be executed if the memory manager operates on legacy pointers and unencrypted data. In this case, encoded pointers are decoded by address decoding logic 154 prior to freeing them so that the memory manager can user the decoded pointer as a reference point to access the region header of the memory that is deallocated.

In addition to address decoding logic 154, one or more other operations may be performed in one or more embodiments to prevent data leakage resulting from the deallocation. Security marker write logic 170 can perform such operations to write a security marker in a predefined location of the memory range that is being deallocated by the memory deallocation 210. For heap memory, the predefined location can be determined based on a memory slot assigned to the memory range that is being deallocated. In one example, the predefined location can be a marker region defined at the midpoint of the slot assigned to the memory range that is being deallocated. The security marker may have an evenly divisible number of bytes (e.g., 4B, 8B, 16B, 32B, etc.) centered on the midpoint of the slot. For stack memory, security marker write logic 170 can store a security marker in a predefined location of a stack memory allocation that is being deallocated (e.g., when a function ends and returns to a calling function or program). In one example, the predefined location can be the memory location where a return address of the calling function or program is stored.

FIG. 2B illustrates further applications of the secure memory access logic of FIG. 1 in the environment 200 established by computing device 100 during operation. In the environment 200, the user space application 134 or the privileged system component 142 may issue a memory store 211 from time to time, which may be handled by the processor 102 as a processor instruction that reads from a register 110 (or other storage unit) and writes to memory 120 or cache using indirect address 114 (e.g. a STORE, MOV instruction). Using a STORE instruction as an example, the memory store logic 162 stores data after successfully executing address decoding logic 154 to decode the encoded indirect address 206 and also successfully executing data encrypting logic 163 based on a data tweak and secret data key 116(2) to encrypt the data to be stored at a memory location pointed to by the indirect address 204. Successful execution of address decoding logic 154 is based on successful execution of address decrypting logic 155, which uses an address tweak and secret address key 116(1) to decrypt the encrypted address slice of the encoded indirect address 206.

Similarly, the user space application 134 or the privileged system component 142 may issue a memory load 220 from time to time, which may be handled by the processor 102 as a processor instruction that reads from memory 120 and writes to a register 110 using an indirect address, such as indirect address 114 (e.g. a LOAD, MOV instruction). Using the LOAD instruction as an example, the memory load logic 164 performs the memory access only after successfully executing the address decoding logic 154 to decode the encoded indirect address 206. Successful execution of address decoding logic 154 is based on successful execution of address decrypting logic 155, which uses an address tweak and secret address key 116(1) to decrypt the encrypted address slice of the encoded indirect address 206. Once the indirect address 204 is returned and memory 120 is accessed to load data from the memory location pointed to by the indirect address 204, the loaded data may be decrypted by executing the data decrypting logic 165 based on a data tweak and secret data key 116(2). Successful execution of data decrypting logic 165 depends on whether the portions of the indirect address used to create a data tweak to decrypt the data, and the additional metadata (if any) used to create the data tweak, correspond to the original allocation of the memory location pointed to by the indirect address.

While the address decoding logic 154 is shown as a separate module from memory store logic 162 and memory load logic 164 in FIG. 2B, it should be understood that the address decoding logic 154 can be incorporated into the store and load logic 162 and/or 164 or can be embodied as a separate set of instructions. Further, it should be understood that the address decoding logic 154 can be incorporated into or referenced by other types of instructions, alternatively or in addition to the LOAD, STORE, and MOV instructions (e.g., arithmetic instructions with memory operands, call, JMP, etc.).

If the address decoding logic 154 successfully decodes the encoded indirect address 206, which includes the address decrypting logic 155 successfully decrypting the encrypted address slice in the encoded indirect address, the original indirect address 204 is returned to the privileged system component 142 and the memory access is completed, or program execution begins at the new program counter location (in the case of control flow changes). If the encoded indirect address 206 does not successfully decode, a fault is raised. Based on the successful completion or failure of memory store 211, an appropriate verification or fault signal 213 is returned to the user space application 134. Similarly, based on the successful completion or failure of memory load 220, an appropriate verification or fault signal 222 is returned to the user space application 134.

In one or more embodiments to prevent keystream exposure in cryptographic computing, the memory load logic 164 may be modified to include, call, or otherwise cause execution of initialization marker verify logic 182 to check a marker region in the memory allocation in which the data referenced by the indirect address 204 is stored. The marker region may be computed based on a midpoint of a slot in memory to which the memory allocation is assigned (as will be further described herein). If the marker region for the memory allocation contains an initialization marker, then this indicates that the memory allocation is in an uninitialized state. In this case, an initialization value (e.g., zero) can be loaded into the register rather than data from the memory location pointed to by the indirect address 204. If the marker region does not contain an initialization marker, then this indicates memory allocation is in an initialized state, and the data in the memory location pointed to by the indirect address 204 can be loaded and decrypted by data decrypting logic 165.

In one or more embodiments to prevent buffer overflow and underflow conditions in cryptographic computing, the memory load logic 164 may be modified to include, call, or otherwise cause execution of bounds marker verify logic 192 to determine whether the memory access request exceeds the bounds of the memory allocation. Once the data in the memory location pointed to by indirect address 204 is loaded, it can be checked to determine whether it contains boundary markers, such as a start marker or a stop marker. If either a start marker or a stop marker is present, then this indicates the memory access has gone beyond the bounds of the memory allocation, and a fault can be raised. If neither a start marker nor a stop marker is present, however, then the data can be decrypted and normal processing can continue. In other embodiments, the start and stop bound markers may be encrypted and can be checked after the data is loaded and decrypted.

Figure 3:
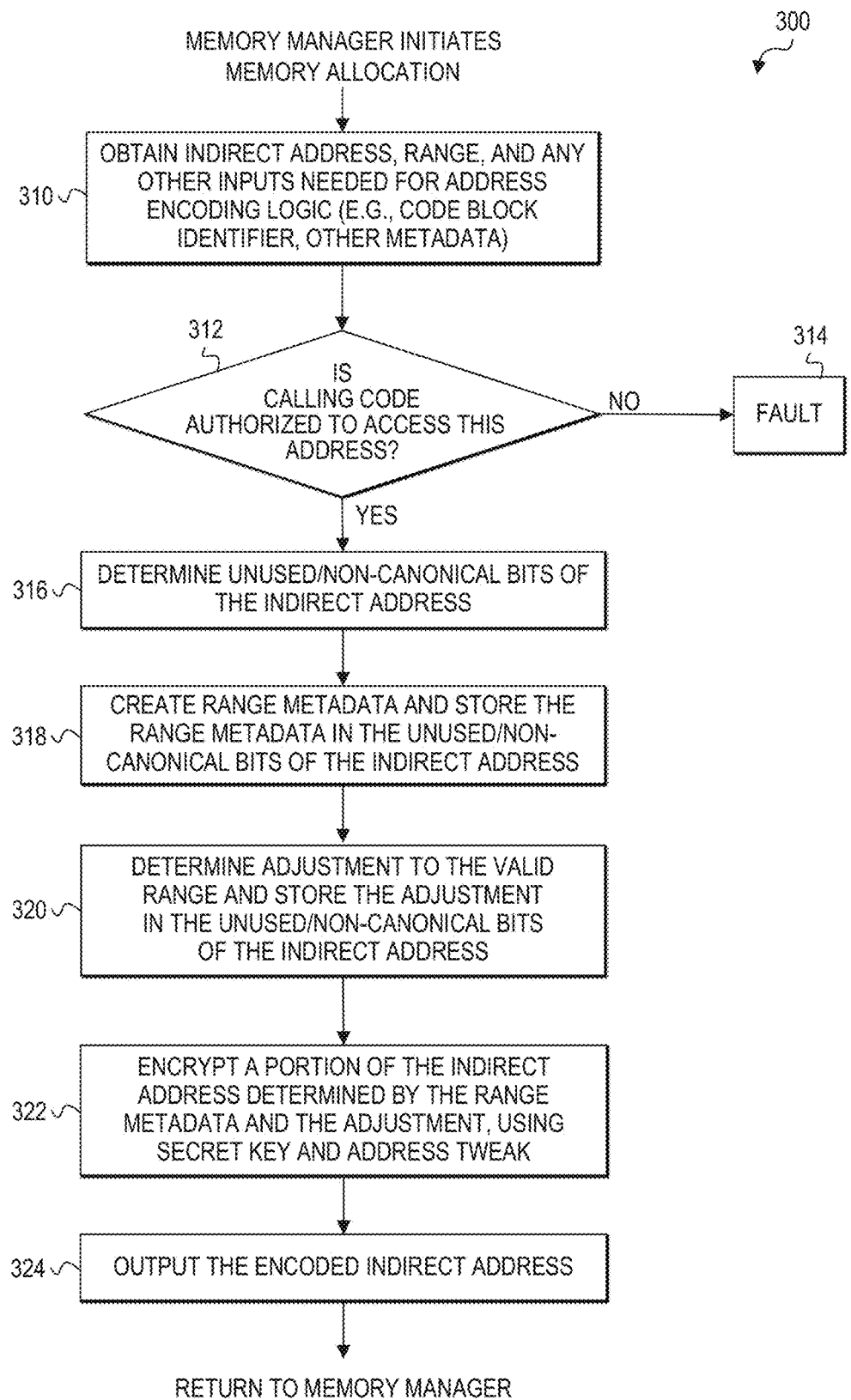
FIG. 3 is a simplified flow diagram of at least one embodiment of a process for providing security for an indirect address as disclosed herein, which may be executed by the computing device of FIG. 1.

Referring now to FIG. 3, an example process 300 for securing an indirect address is shown. Portions of the process 300 may be executed by hardware, firmware, and/or software of the computing device 100 (e.g., by the processor 102 executing the address encoding logic 152). The process 300 begins in response to a memory allocation (e.g., by a memory manager module). In block 310, the computing device 100 obtains the indirect address, address range, and other inputs needed to encode the indirect address (e.g., a code block identifier, instruction pointer, and/or metadata for tweaks, as described herein). In block 312, the computing device 100 determines whether the calling code (e.g., the code initiating the memory allocation) is authorized to access the indirect address received in block 310 (e.g., indirect address 204). To do this, the computing device 100 may perform an access control check by verifying the instruction pointer or caller privilege level information for the calling code, which may be obtained from, for example, a heap manager of the memory manager module 144. If the computing device 100 determines that the calling code is not authorized to access the indirect address, a fault is raised (314). If the computing device 100 determines that the calling code is authorized to access the indirect address, the computing device 100 proceeds to block 316. In block 316, the computing device 100 determines the unused (e.g., non-canonical) address bits of the indirect address to perform the address range encoding or other metadata encoding (e.g., size (power) metadata, tag value, etc.). To do this, the computing device 100 may simply use the higher (e.g., most significant) unused/non-canonical bits of the indirect address. It should be noted that the encoded addresses do not need to be architecturally non-canonical. Rather, the unused/non-canonical addresses can simply be a range of memory set aside by, for example, the privileged system component 142, to enable the address encoding as disclosed herein.

In block 318, the computing device 100 creates the metadata (e.g., valid range and/or permission data) and stores the metadata in the unused/non-canonical bits of the indirect address selected in block 316. Illustratively, the metadata indicates an upper limit on the size of the buffer pointed to by the indirect address. To create the metadata, the computing device 100 converts the indirect address values to a center location in which the most significant canonical address bits do not change for the valid memory range. In some embodiments, the range metadata includes an "exponent" to determine the 2's power of the memory range size (effectively determining the number of mutable and immutable address bits). In some cases, an "adjustment" is used to force values to the end of the 2's power range as described below. In other embodiments, the adjustment may be used to force the buffer to the beginning of the 2's power range when buffer "underflow" needs to be addressed (as opposed to buffer "overflow"). Using the exponent metadata, any 2's power memory range can be defined (e.g., 2, 4, 8, 16 . . . 2^64).

The following is a simple example of range metadata encoding. The addresses 0000b-0011b fit the range 0-3 where the upper two bits do not change. However, if a pointer is modified to go to the index 4, one of the upper bits will change. Accordingly, the valid range metadata can be encoded as [2] (for the upper two bits to encode a range of 4) and the valid range metadata can be stored in the higher non-canonical bits, e.g., "[2] 00xxb." In this example, the exponent would be 2 bits in size (e.g., values [1-4]), to cover the 4 bit addresses used in the example. Table 1 below illustrates a number of additional, simplified examples.

TABLE 1

Address encoding examples

| Real address range | Size | Encoded address | Comment |
|---|---|---|---|
| 1001b-1100b | 4 bytes | [2] {3} 11xx | Adjust + 3 to fit all in 11xxb |
| 1001b-1101b | 5 bytes | [3] {1} 1xxx | Adjust + 1 to end of range |

TABLE 1-continued

Address encoding examples

| Real address range | Size | Encoded address | Comment |
|---|---|---|---|
| 1110b-1111b | 2 bytes | [1] {0} 111x | Fits in lowest power of 2 |
| 1101b-1110b | 2 bytes | [1] {1} 111x | Adjust + 1 to fit all in 111xb |
| 0000b-1111b | 16 bytes | [4] {0} xxxx | Full range |
| 1010b-1010b | 1 byte | [0] {0} 1010 | Exact match |
| 1011b-1101b | 3 bytes | [2] {2} 11xx | Adjust + 2 to end of range |

In Table 1, the encoded address is represented using a format that is similar to a floating point format. In the encoded addresses in the third column of Table 1, the number in brackets, e.g., [2], is the exponent or valid range metadata; the number in braces, e.g., {3}, is the adjustment value, and the address to the right of the adjustment value indicates the unused/non-canonical bits in which the valid range metadata and adjustment value are stored. In block 320, optionally, the computing device 100 determines the adjustment (or "offset") to be applied to the valid range, and stores the adjustment value in the unused/non-canonical bits of the indirect address. In some embodiments, the adjustment is used to force the encoded range to the end of a 2's power boundary. This sets a very specific upper bound on the buffer size. In this way, an encoded version of the original (not encoded) valid address range can be created. The encoded version can be designed such that the least number of upper bits will change over the valid range (e.g., so that encryption of the upper bits will detect/amplify modifications to the encoded address on decryption). The encoding is reversible, such that the original intended valid address range is returned as long as it is modified within the range. In the example above, the range 0-3 decimal (0000b-0011b binary) can be encoded as [2] {0} 00xxb (where "xx" means those bits can take any value for the range: 00, 01, 10, 11). In another example, the range 1-4 decimal (0001b-0100b) can be encoded as [2] {-1} 00xxb (where the adjustment is subtracted in order to keep the upper bits constant). Alternatively, the same range 1-4 decimal (0001b-0100b), can be encoded as [2] {3} 01xxb (this time adding an adjustment of 3 in order to keep the upper bits constant). With either representation, the encoded version decodes back to the original address range 1-4. In still another example, if the buffer size is 4 KB, a 10-bit adjustment value with a resolution of 4 bytes can be used.

Other embodiments may use a signed adjustment value (e.g., 2's compliment) where the buffer may be either adjusted to the beginning or end of the 2's power boundary depending on the sign (+/−) of the adjustment. Such embodiments can provide protection from either buffer overflow or underflow situations depending on the adjustment sign. In cases where 16 bits are available in unused/non-canonical addresses (e.g., in current 64-bit processors), 10 of the available bits can be used for the adjustment and the remaining 6 bits can be used for the valid range metadata (e.g., exponent value/2's power). If the exponent value reaches a range beyond a 4 KB page, the adjustment can expand by a 2's multiplier to allow adjustments of large buffers within even larger power of 2 ranges (noting that in some embodiments, 4096 bytes are fully covered with a 10-bit adjustment value allowing the adjustment to "adjust" a buffer to end with the very last 4-byte word in a 4 KB page before the upper (2's power) bits will change). Such an adjustment (e.g., incremented by 1) will adjust the buffer location 4 bytes at a time. Any other choice of initial adjustment size and word size is possible in other embodiments. In another example, if the exponent has a value of 13, then the adjustment value can be multiplied by 2 so that the adjustment can still encompass the full 2's power range (in this case, two 4 KB pages, if adjusting by 8 bytes at a time), and so on (e.g. an exponent value of 14 means the adjustment value is multiplied by 4, and an exponent value of 15 means the adjustment value is multiplied by 8 and so on, allowing the adjustment to encompass the full 2 powers range).

In block 322, the computing device 100 encrypts a portion of the indirect address, where the portion of the indirect address to be encrypted is determined by the valid range metadata (e.g., exponent/2's power) and the adjustment value. The valid range metadata determines the number of the most significant address bits of the encoded address that are to be encrypted (e.g., down to a minimum number so some address bits will always be encrypted). In some embodiments, the adjustment value is encrypted as well (e.g., to create a reasonable block size for a block cipher). In some embodiments, the most significant bits of the used bits/canonical address identified in the valid range metadata are encrypted with a secret address key (e.g., the secret address key 116(1)), using the valid range metadata (which may or may not include the adjustment value) as an address tweak. In the illustrated embodiments, the valid range metadata (e.g., exponent/2's power) would not be encrypted because the processor uses the valid range metadata plaintext to determine the number of bits to decrypt. However, the valid range metadata (e.g., exponent/two's power) can be used as a tweak in the case of a tweakable block cipher (and thereby affect the encrypted bits). Other data values that may be used as tweaks include, but are not necessarily limited to: data stored in the unused bits of the indirect address, the upper limit on the buffer size, an exponent of a two's power boundary selected as the upper limit on the buffer size, an adjustment value applied to the two's power boundary, a code block identifier, instruction pointer data, permission information encoded in the metadata, version number (useful when reassigning/revoking pointers that were previously assigned to a program, version may be maintained by the processor in a register), and/or other metadata described herein (e.g., plaintext address slice size, memory allocation size, type, location, ownership, tag, privilege level, crypto context ID, or any suitable combination thereof).

As used herein, a "tweak" may refer to, among other things, a second input to a block cipher, in addition to the usual plaintext or ciphertext input and the key (e.g., the secret key 116(1)-116(N)). In at least some embodiments, a tweak may compose all or part of an initialization vector (IV) for a block cipher. Encrypting the upper two canonical bits enables the computing device 100 to detect when the indirect address has been illegally changed, because the encryption algorithm will cause the illegally-changed upper bits to produce a random sequence of bits that are non-deterministic to an adversary, which likely results in a fault when the illegally-changed indirect address is used.

The portion of the indirect address to be encrypted (e.g., the upper used/canonical bits) is encrypted using a cipher mode encryption algorithm, such as a tweakable block cipher, using the valid range metadata and adjustment (e.g., [2] {-1}, in the above example) as a tweak. Some examples of tweakable block ciphers include: XOR-encrypt-XOR (XEX), Liskov, Rivest, and Wagner (LRW), and XEX-based tweaked-codebook mode with ciphertext stealing (XTS). Other bit diffusion methods in which any single bit change in the cipher text results in changes across the entire decrypted plaintext can be used. If desired, alternative embodiments can trade off security for performance by using non-cryptographic methods that still achieve reasonable bit diffusion analogous to a block cipher.

The cipher selected for the encryption can be implemented in hardware, using an algorithm that has a bit-selectable or otherwise variable block size (e.g. any block cipher or similar diffusion algorithm with appropriate block sizes that may constructed to utilize a tweak), or an algorithm that allows a fixed block size with a tweak using the remaining unencrypted bits (e.g., the extra bits outside the fixed block size). A cipher that has a bit-selectable block size may accept as an input (in some cases, along with the plaintext to be encrypted) a bit-length parameter that specifies how many bits of the plaintext are to be encrypted. In some cases, the bit-length parameter specifies the same number of bits that are in the plaintext, and in other cases, the bit-length parameter specifies a number of bits in the plaintext less than the length of the entire plaintext. The cipher encrypts the plaintext bits using an encryption key (which may be of the same or different length from the bit-length parameter). In cases where the encryption key is longer than the bit-length parameter, a subset of the bits of the key equal to the bit-length parameter may be used in the cipher. The cipher encrypts as many bits from the plaintext as specified by the bit-length parameter using a sequence of logical operations that include at least two logical AND operations and two logical XOR operations. Each of the operations is performed both on the bits of the plaintext and on the bits of the key; that is, each of the operations is performed on at least one plaintext bit and at least one key bit. In this manner, both confusion and diffusion between the plaintext and the ciphertext may be achieved. This bit-length parameterizable cipher according to the present disclosure may be referred to as a K-cipher.

A K-cipher may also be configured to receive a tweak input so that encryption (and decryption) is based on the encryption key and the tweak input. For example, the tweak input may be added to a certain number of round keys in a key schedule generated by the K-cipher. The tweak input may have the same length as the round keys and may be configured in any suitable manner, including tweak inputs that are described herein with reference to various embodiments.

In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., the exponent or adjustment values, or the encrypted most significant bits) the resulting decoded address will be corrupted. In the 64-bit address space, address corruption will result in a fault with high probability, thus allowing the address corruption (and pointer access or bounds violation) to be caught by the privileged system component 142 (e.g., an operating system/executive/VMM/alternative mode/debug trace/management processor/subsystem, etc.).

In the example above, if the indirect address/pointer value is incremented beyond 3, modifying the indirect address/pointer in this way will corrupt the upper canonical bits and cause a non-deterministic memory access that cannot be controlled by an adversary. For instance, going beyond a buffer size by one byte will result in a random memory access that will page fault with high probability. This is due to the bit diffusion properties of the cipher to ensure that even one-bit changes will diffuse through all of the most significant bits. As a result of the adjustment, which forces values to the end of the 2's power range, buffer overflows cause corruption of the encrypted address bits.

The cipher tweak can be extended to include a code block identifier to provide access controls over which code blocks (e.g., blocks of the calling code) are permitted to use an indirect address/pointer to access memory. Additionally, instruction pointer (which may be referred to as the "program counter") information or ranges can be encoded as part of the pointer encryption tweak (also referred to herein as "address tweak"). The instruction pointer information can be used to limit the scope of what code can access what data. For example, all code can be arranged within fixed blocks of memory within the 64-bit address space. Code with similar access permissions can be grouped together in the same block or range. The address tweak can include the identifier for the block of memory from which an instruction is executing. In this way, code and data can be associated, and access controlled, such that an adversary coming from a different code block will not be able to access data of the protected block using the encrypted pointers, because the encrypted pointers will not decode properly if the wrong code block identifier is used as an address tweak. Further, when a block of code calls, e.g., malloc, to allocate memory to itself, malloc can return the encrypted address using the calling code's memory block to ensure private access to the allocated memory (so long as the allocated memory isn't freed and then reallocated to another code block). Alternatively, other methods of identifying the calling code can be used in the address tweak, such as protection keys. Still further, the metadata for read/write/execute access that is used by the processor 102 to control access to memory can be used as part of the address tweak for the encrypted address bits. Additionally, the instruction pointer may itself be represented as an encoded pointer (e.g., range-based). In this case, the metadata and encrypted address bits can be used as part of the "tweak" identifying the code block accessing a data pointer or requesting a memory allocation/assignment. At 324, the encoded indirect address may be output and control returned to memory manager module 144.

Figure 4:
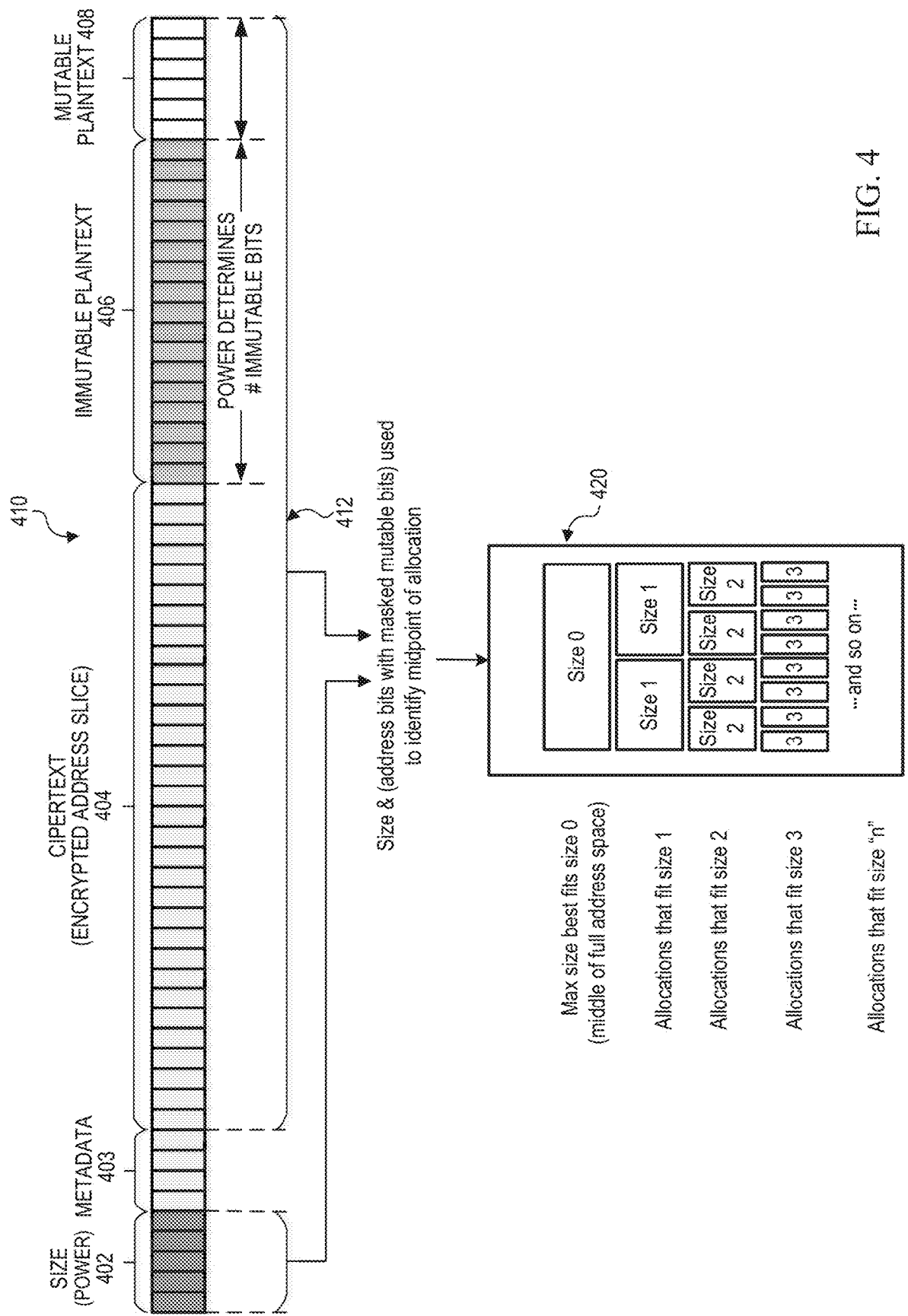
FIG. 4 is a diagram of an example cryptographically encoded pointer according to an embodiment.

FIG. 4 is a diagram of an example encoded pointer 410 according to at least one embodiment of the present disclosure. The encoded pointer 410 may include any size pointer, such as, for example, a 64-bit pointer (as shown in FIG. 4), or a 128-bit pointer, or a pointer that is larger than 128-bits. The encoded pointer, in one embodiment, may include a x86 architecture pointer. The encoded pointer 410 may include a greater (e.g., 128-bits), or lesser (e.g., 16-bits, 32-bits) number of bits. In FIG. 4, the example encoded pointer 410 shows a cryptographically encoded 64-bit pointer (address) in its base format, using exponent (power) metadata but not an offset. The encoded pointer 410 may be the output of the process 300 of FIG. 3, in some instances.

In the example shown, the encoded pointer includes a size (exponent) metadata portion 402 (e.g., 5 bits in the example shown) indicating a size of a mutable plaintext portion 408 (e.g. 6 bits in the example shown) of the encoded pointer 410 (e.g., a number of low order address bits that comprise the mutable plaintext portion 408 of the encoded pointer 410, these bits may be manipulated freely by software for pointer arithmetic). In some embodiments, the size metadata portion 402 may include power (exponent) metadata bits that indicate a size based on a power of 2. An optional metadata portion 603 (e.g., tag or version metadata) may also be provided in some embodiments.

As shown in FIG. 4, the size metadata portion 402 may indicate the number of bits that compose the immutable plaintext portion 406 and the mutable plaintext portion 408. In certain embodiments, the total number of bits that make up the immutable plaintext portion 406 and the mutable plaintext portion 408 may be constant, with the sizes of the respective portions being dictated by the size metadata portion 402. For example, if the power metadata value is 0, there are no mutable plaintext bits and all 27 remaining address bits (i.e., immutable plaintext portion 406) are used as a tweak to generate ciphertext portion 404 from an address slice (i.e., a subset of the linear address bits), where the ciphertext portion 404 is adjacent to and more significant than the immutable plaintext portion 406. As a further example, if the power metadata value is 1, then there is one bit of mutable plaintext, if the power metadata value is 2, then there are 2 bits of mutable plaintext, up to 27 bits of mutable plaintext resulting in no immutable plaintext bits (in immutable plaintext portion 406). The mutable plaintext portion 408 may be manipulated by software, e.g. for pointer arithmetic or other operations. The ciphertext portion 404 (e.g., 32 bits in the example shown) of the encoded pointer 410 may be encrypted with a small tweakable block cipher (e.g., a SIMON, SPECK, or tweakable K-cipher at a 32-bit block size, or other variable bit size tweakable block cipher). The remaining address bits compose immutable plaintext portion 406 (e.g. 21 bits in the example shown) and are used as part of the tweak for the tweakable block cipher used to encrypt the ciphertext portion 404. While these bits are also a plaintext (non-encrypted) portion of the address, they cannot be modified by software (e.g. pointer arithmetic) like the bits of mutable plaintext portion 408 without causing the ciphertext portion 404 to decrypt incorrectly. The base pointer format shown in FIG. 4 allows for cryptographically describing object sizes and their location in memory. In some cases, the exponent/power/size metadata portion 402 could be provided as a separate parameter in addition to the pointer; however, in some cases (e.g., as shown) the bits of the size metadata portion 402 may be integrated with the encoded pointer 410 to provide legacy compatibility in certain cases.

It should also be noted that in an alternative embodiments, the size metadata portion 402 may indicate the number of bits that compose the immutable plaintext portion 406, and thus dictate the number of bits remaining to make up the mutable plaintext portion 408. For example, if the power metadata value is 0, there are no immutable plaintext bits (in immutable plaintext portion 406) and all 27 remaining address bits (i.e., mutable plaintext portion 408) may be manipulated by software. As a further example, if the power metadata value is 1, then there is one bit of immutable plaintext, if the power metadata value is 2, then there are 2 bits of immutable plaintext, up to 27 bits of immutable plaintext resulting in no mutable plaintext bits (in mutable plaintext portion 408), and thus, no bits that can be manipulated by software.

Also, although encoded pointer 410 is illustrated and described based on using 32 bits for the ciphertext portion 404, the pointer format is not intended to be so limited. The address slice to be encrypted may be selected based on readily available 32-bit block encryption ciphers. However, an encryption cipher using any other block size (e.g., 27, 16, variable, etc.), may be used instead. If the number of ciphertext bits is adjusted (upward or downward), the remaining address bits to be encoded (e.g., immutable and mutable portions) may be adjusted accordingly. For example, if the ciphertext portion is adjusted to be 16 bits, then the combined immutable and mutable plaintext portions (406 and 408) could be encoded in 43 bits. In this scenario, however, an additional bit may be added to the size metadata portion 402, with the combined immutable and mutable portions being reduced to 42 bits, so that the size metadata portion 402 can indicate any possible number of bits (e.g., 0-42 bits) to compose the immutable plaintext portion 406 and the mutable plaintext portion 408.

When a processor is running in a cryptographic mode and accessing memory using an encoded pointer such as encoded pointer 410, to get the actual linear/virtual address memory location, the processor takes the encoded address format and decrypts the ciphertext portion (e.g., 404 of FIG. 4). In suitable cryptography may be used, and my optionally include as input a tweak derived from the encoded pointer. In one example, a tweak may include the variable number of immutable plaintext bits (e.g., 406 in FIG. 4) determined by the size/power/exponent metadata bits (e.g., 402 of FIG. 4) and a secret key. In some instances, the size/power/exponent metadata and/or other metadata or context information may be included as part of the tweak for decrypting the ciphertext portion 404 (also referred to herein as "address tweak"). If the address decrypts incorrectly, the processor may cause a general protection fault (#GP) or page fault due to the attempted memory access with corrupted linear/virtual address.

A graphical representation of a memory space 420 illustrates possible memory slots to which memory allocations for various encodings in the size metadata portion 402 of encoded pointer 410 can be assigned. Each address space portion of memory, covered by a given value of the plaintext corresponding to the encrypted address slice 404, contains a certain number of allocation slots (e.g., one Size 0 slot, two Size 1 slots, four Size 2 slots, etc.) depending on the width of the size metadata portion 402 (e.g., size metadata).

Referring still to FIG. 4, the size metadata portion 402, in combination with the information in the address field 412 (with decrypted ciphertext from ciphertext portion 404 and masked mutable plaintext portion 408), can allow the processor to find the midpoint of a given slot defined in the memory space 420. For a power of two scheme, where the size field includes size exponent information, as the size exponent becomes larger (for larger slots, such as Size 0), fewer address bits are needed to identify a particular slot (since with larger slots, there will be fewer slots to identify). In such a case, more of the bits at the end of the pointer, in the bits of mutable plaintext address portion 408 (e.g., where pointer arithmetic can be performed), can be used to range within a given slot. The latter leads to a shrinking of the address field and an expanding of the pointer arithmetic field.

As noted previously, use of metadata portion 403 and of tag data therein is optional. Tag data in a pointer allows multiple versions of a pointer to be used pointing to the same slot, while still ensuring that the pointer version being used to access the slot is in fact the pointer with the right to access that slot. The use of tag data can be useful for mitigating UAF attacks for example. Where a dangling pointer is involved, but where tag data is used, changing tags with each version of the pointer would result in a mismatch with an allocation sought to be accessed by a dangling pointer, leading to errors and thus protecting the new allocation from unauthorized access by the dangling pointer. However, tag metadata takes up additional bit space in the pointer and may not be used in some embodiments.

Figure 5A:
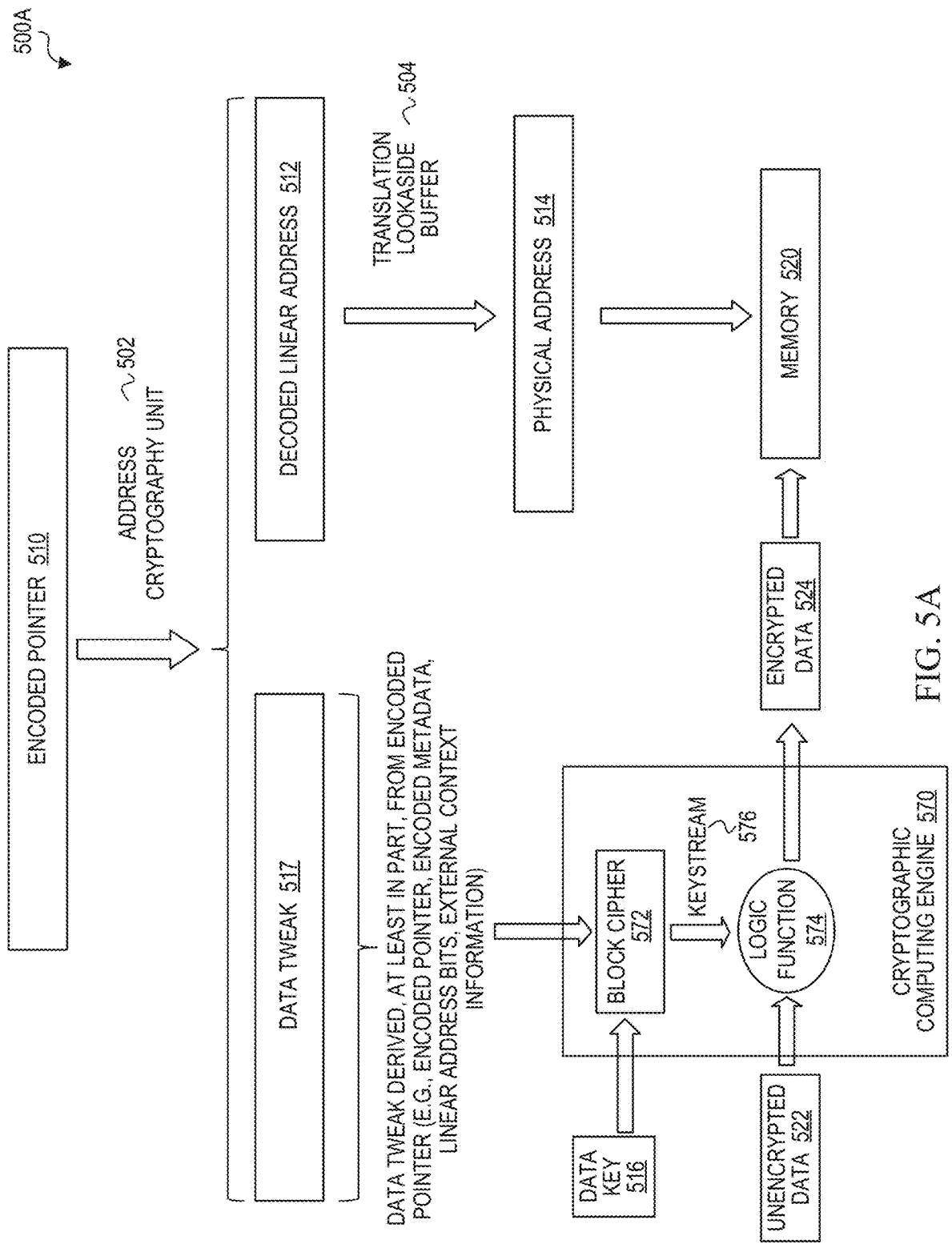
FIG. 5A is flow diagram illustrating a process of binding a generalized encoded pointer to encryption of data referenced by that pointer according to an embodiment.

FIG. 5A is a simplified flow diagram illustrating a general process 500A of cryptographic computing based on embodiments of an encoded pointer 510. Process 500A illustrates storing (e.g., writing) data to a memory region at a memory address indicated by encoded pointer 510, where encryption and decryption of the data is bound to the contents of the pointer according to at least one embodiment. At least some portions of process 500A may be executed by hardware, firmware, and/or software of a computing device, such as the computing device 100. In the example shown, encoded pointer 510 is an example of encoded indirect address 206 (or indirect address 114 once encoded) and may be embodied as an encoded linear address including a metadata portion. The metadata portion includes some type of context information (e.g., size/power metadata, tag, version, etc.) and the linear address may be encoded in any number of possible configurations, at least some of which are described herein.

Encoded pointer 510 may have various configurations according to various embodiments. For example, encoded pointer 510 may be encoded with a plaintext linear address or may be encoded with some plaintext linear address bits and some encrypted linear address bits. Encoded pointer 510 may also be encoded with different metadata depending on the particular embodiment. For example, metadata encoded in encoded pointer 510 may include, but is not necessarily limited to, one or more of size/power metadata, a tag value, or a version number.

Generally, process 500A illustrates a cryptographic computing flow in which the encoded pointer 510 is used to obtain a memory address for a memory region of memory 520 (similar to memory 120 and/or cache 118 of FIG. 1) where data is to be stored, and to encrypt the data to be stored based, at least in part, on a tweak derived from the encoded pointer 510. First, an address cryptography unit 502 decodes the encoded pointer 510 to obtain a decoded linear address 512. The address cryptography unit 502 may include and/or perform operations similar to address encoding logic 152 and address decoding logic 154, including address encrypting logic 153 and address decrypting logic 155 of FIG. 1. The decoded linear address 512 may be used to obtain a physical address 514 in memory 520 using a translation lookaside buffer 504 or page table (not shown). A data tweak 517 is derived, at least in part, from the encoded pointer 510. For example, the data tweak 517 may include the entire encoded pointer, one or more portions of the encoded pointer, a portion of the decoded linear address, the entire decoded linear address, encoded metadata, and/or external context information (e.g., context information that is not encoded in the pointer).

Once the tweak 517 has been derived from encoded pointer 510, a cryptographic computing engine 570 can compute encrypted data 524 by encrypting the decrypted (or unencrypted) data 522 based on a data key 516 and the data tweak 517. In at least one embodiment, the cryptographic computing engine 570 includes an encryption algorithm such as a keystream generator, which may be embodied as a block cipher 572 such as, for example, an AES-CTR mode block cipher, at a particular size granularity (any suitable size). The cryptographic computing engine 570 may include and/or perform operations similar to memory store logic 162 and memory load logic 164, including data encrypting logic 163 and data decrypting logic 165 of FIG. 1. In this embodiment, the data tweak 517 may be used as an initialization vector (IV) and a plaintext offset of the encoded pointer 510 may be used as the counter value (CTR). The keystream generator can encrypt the data tweak 517 to produce a keystream 576 and then a cryptographic operation (e.g., a logic function 574 such as an exclusive-or (XOR), or other more complex operations) can be performed on the decrypted (or unencrypted) data 522 and the keystream 576 in order to generate encrypted data 524. It should be noted that the generation of the keystream 576 may commence while the physical address 514 is being obtained from the encoded pointer 510. Thus, the parallel operations may increase the efficiency of encrypting the unencrypted data. It should be noted that the encrypted data may be stored to cache (e.g., 118) before or, in some instances instead of, being stored to memory 520.

Figure 5B:
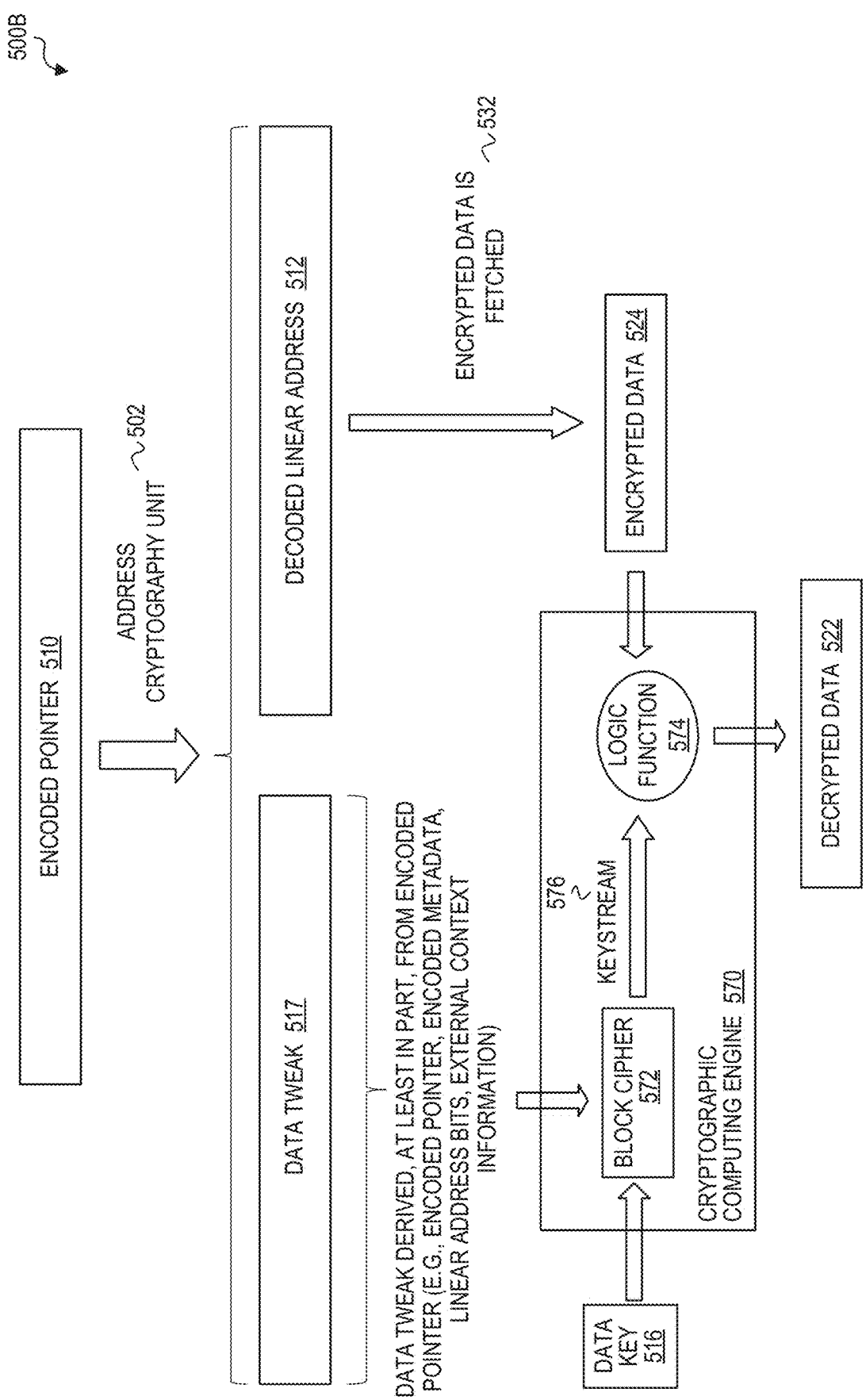
FIG. 5B is flow diagram illustrating a process of decrypting data bound to a generalized encoded pointer according to an embodiment.

FIG. 5B is a simplified flow diagram illustrating a general process 500B of cryptographic computing based on embodiments of encoded pointer 510. Process 500B illustrates obtaining (e.g., reading, loading, fetching) data stored in a memory region at a memory address that is referenced by encoded pointer 510, where encryption and decryption of the data is bound to the contents of the pointer according to at least one embodiment. At least some portions of process 500B may be executed by hardware, firmware, and/or software of a computing device, such as the computing device 100.

Generally, process 500B illustrates a cryptographic computing flow in which the encoded pointer 510 is used to obtain a memory address for a memory region of memory 520 (similar to memory 120, cache 118) where encrypted data is stored and, once the encrypted data is fetched from the memory region, to decrypt the encrypted data based, at least in part, on a tweak derived from the encoded pointer 510. First, address cryptography unit 502 decodes the encoded pointer 510 to obtain the decoded linear address 512, which is used to fetch the encrypted data 524 from memory, as indicated at 532. Data tweak 517 is derived, at least in part, from the encoded pointer 510. In this process 500B for loading/reading data from memory, the data tweak 517 is derived in the same manner as in the converse process 500A for storing/writing data to memory.

Once the tweak 517 has been derived from encoded pointer 510, the cryptographic computing engine 570 can compute decrypted (or unencrypted) data 522 by decrypting encrypted data 524 based on the data key 516 and the data tweak 517. As previously described, in this example, the cryptographic computing engine 570 includes an encryption algorithm such as a keystream generator, which may be embodied as block cipher 572 (e.g., AES-CTR mode block cipher at a particular size granularity (any suitable size)). In this embodiment, the data tweak 517 may be used as an initialization vector (IV) and a plaintext offset of the encoded pointer 510 may be used as the counter value (CTR). The keystream generator can encrypt the data tweak 517 to produce keystream 576 and then a cryptographic operation (e.g., the logic function 574 such as an exclusive-or (XOR), or other more complex operations) can be performed on the encrypted data 524 and the keystream 576 in order to generate decrypted (or unencrypted) data 522. It should be noted that the generation of the keystream may commence while the encrypted data is being fetched at 532. Thus, the parallel operations may increase the efficiency of decrypting the encrypted data.

Figure 6:
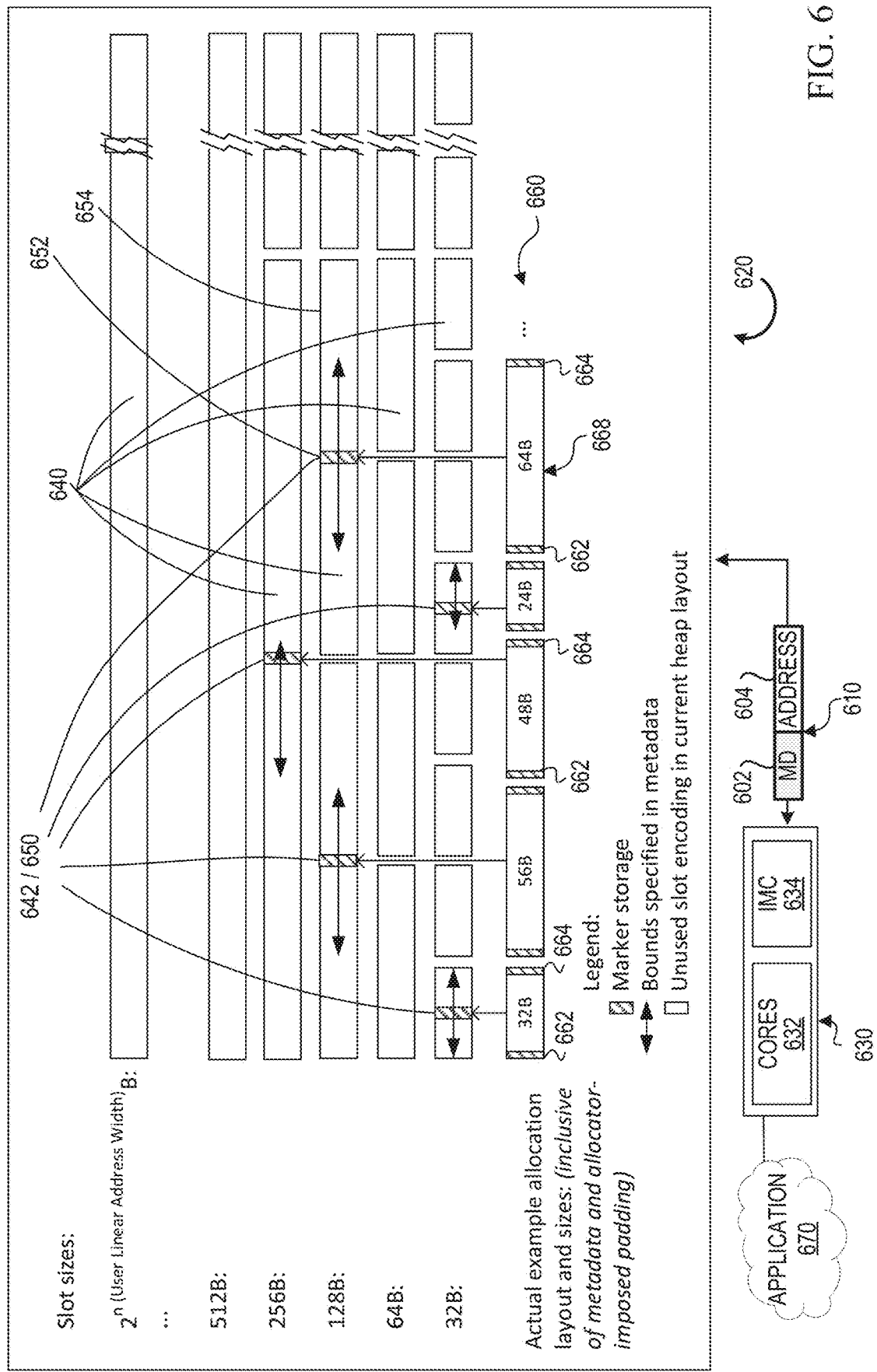
FIG. 6 is a schematic illustration of a memory allocation system using markers according to an embodiment.

FIG. 6 is a schematic diagram of an illustrative memory/cache 620 (e.g., similar to memory 120 and/or cache 118 of FIG. 1) to allow marker checks on memory allocations accessed by encoded pointers (e.g., encoded indirect address 206, encoded pointers 410, 510), some of which are described herein. The schematic diagram also shows processor circuitry 630 (e.g., similar to processor 102 of FIG. 1) including cores 632 and memory controller circuitry 634 (e.g., memory controller (MC), integrated memory controller (IMC), memory management unit (MMU)), which are communicatively coupled to memory/cache 620. Although embodiments are not so limited, in the shown embodiment of FIG. 6 the memory/cache 620 may be apportioned into one or more power of two (i.e., $2^0$ to $2^n$) slots 640 in which the respective midpoint addresses 642 includes respective, unique, marker regions 650 that are associated with respective memory allocations 660 within slots 640, in accordance with at least one embodiment described herein. Additionally, "allocation" and "memory allocation" are intended to refer to an addressable portion of memory in which an object, such as data or code, is stored. As used herein, "slot" is intended to refer to a unit of memory in a cacheline.

In some embodiments, an instruction that causes the processor circuitry 630 to allocate memory causes an encoded pointer 610 (which may be similar to encoded indirect address 206, encoded pointer 410, 510) to be generated. The encoded pointer may include at least data representative of the linear address associated with the targeted memory allocation 660 and metadata 602 (such as size 402 and optionally tag 403) associated with the respective memory allocation 660 corresponding to memory address 604. Also, an instruction that causes the processor circuitry 630 to perform a memory operation (e.g., LOAD, MOV) that targets a particular memory allocation (e.g., 668) causes the memory controller circuitry 634 to access that memory allocation, which is assigned to a particular slot (e.g., 654) in memory/cache 620 using the encoded pointer 610.

In the embodiments of the memory/cache 620 of FIG. 6, each memory allocation 660 is fully assigned to a given slot (i.e. one memory allocation per slot and one slot per memory allocation), in this way ensuring that the marker region 650 at the midpoint can be easily associated with the memory allocation to which it pertains. Embodiments, however, are not so limited, and include within their scope the provision of a marker (e.g., security marker or initialization marker) within a slot that includes none, some, or all of the memory allocation to which the marker pertains. The memory allocations 660 are shown in FIG. 6 once at the bottom of the figure and represented correspondingly by double pointed arrows within the respective slots 640 to which the memory allocations are assigned. Even though the memory allocations 660 may be assigned to slots larger than the allocations themselves, the allocations may, according to one embodiment, not need padding in order to be placed within the larger slots.

According to some embodiments, a memory allocation may be assigned to a slot that most tightly fits the allocation, given the set of available slots and allocations. In the shown embodiment of FIG. 6, for example, the 32B allocation is assigned to a 32B slot, the 56B allocation to a 128B slot, the 48B allocation to a 256B slot, the 24B allocation to a 32B slot and the 64B allocation to a 128B slot. In the shown example of FIG. 6, because the 48B allocation would have crossed an alignment boundary within two slots, it is assigned to the larger 128B slot. Although the example of FIG. 6 shows the memory allocations as spanning through the slots in a contiguous fashion (tightly packed), clearly, embodiments are not so limited, and include within their scope a scheme of memory allocations to respective, dedicated memory slots as long as a midpoint address of the slot is crossed by the allocation, where some slots may be free, especially for example in UAF scenario where a dangling pointer is involved. According to some embodiments, memory allocation sizes may be no smaller than half the width of a smallest slot in order for them to cross (i.e., to at least partially cover) the midpoint when assigned to a slot.

Based on the above allocation scheme, where each memory allocation is uniquely assigned to a dedicated slot, and crosses the slot midpoint, the marker region 650 may be located at the midpoint address of the slot so that the processor is able to find the marker region for a particular slot quickly and it is ensured to be at least partially contained within each memory allocation that is assigned to that particular slot, without having to go to a separate table or memory location to determine the metadata. Current approaches sometimes put the metadata before each allocation, typically in a non-power-of-two scheme, and within each pointer, specify a distance of the pointer address from the beginning of the allocation. However, the pointer has a limited number of bits, and the need to specify the latter distance may overrun the extent of the pointer where the distance is larger than what the pointer can accommodate, that is, where an allocation is larger than one that the bits in the pointer can accommodate. The power-of-two (Po2) approach, used according to one embodiment, allows a unique mapping of each memory allocation to a Po2 slot, where the slot is used to provide the possibility to uniquely encode and encrypt each object stored in the memory allocations. According to some embodiments, markers (e.g., security markers, initialization markers, bounds markers) in marker regions 650 may be encrypted as well. In some embodiments, one or more of the types of markers in marker regions 650 may not be encrypted.

At least some encoded pointers specify the size of the slot, such as the Po2 size of the slot as a size exponent in the metadata field of the pointer, that the allocation to be addressed fits into. The size determines the specific address bits to be referred to by the processor in order to determine the slot being referred to. Having identified the specific slot, the processor can go directly to the address of the marker region of the identified slot in order to write a marker value in the marker region (e.g., during memory deallocation operations for security markers, during memory allocation operations for initialization markers or bounds markers) or read out the current data at the marker region (e.g., during memory allocation operations for security markers, during read operations for initialization markers or bounds markers). Embodiments are, however, not limited to Po2 schemes for the slots, and may include a scheme where the availability of slots of successively increasing sizes may be based on a power of an integer other than two, or based on any other scheme.

Although the memory controller circuitry 634 is depicted in FIG. 6 as a separate box from the cores 632, the cores 632 may include all or a portion of the memory controller circuitry 634. Also, although the memory controller circuitry 634 is depicted in FIG. 6 as part of processor circuitry 630, in some embodiments, the processor circuitry 630 may be include all, a portion, or none of the memory controller circuitry 634.

In response to execution of a memory access instruction, the processor circuitry 630 uses an encoded pointer 610 that includes at least data representative of the memory address 604 involved in the operation and data representative of the metadata 602 associated with the memory allocation 660 corresponding to the memory address 604. The encoded pointer 610 may include additional information, such as data representative of a tag or version of the memory allocation 660 and pointer arithmetic bits (e.g., mutable plaintext portion 408) to identify the particular address being accessed within the memory allocation.

In some embodiments, security markers and initialization markers can both be stored in the same marker regions 650. This is possible because, in at least one embodiment of security marker checks and initialization marker checks, a security marker for an allocation assigned to a particular slot is stored in the security marker region for that particular slot at a different time than when an initialization marker for the same allocation is stored. In other embodiments, either security markers or initialization markers may be implemented, but not both. In yet other embodiments, the marker region at the midpoint may be defined to accommodate both a security marker and an initialization marker without overlapping. The memory address for a security marker in a marker region may be the same as or different than the memory address of the initialization marker in the same marker region depending on whether the size of the security marker is the same or different than the size of the initialization marker. For any given memory allocation, however, the address of a marker for any given allocation can be calculated based on the slot midpoint of the slot to which the assigned to the given allocation is assigned, as will be further described herein.

In some embodiments, a marker (e.g., security marker, initialization marker, bounds markers) may be selected for use in a marker check (e.g., security marker check, initialization marker check, or bounds marker check) during the initialization of a computing device, a virtual machine, an application, or from time to time during the execution of an application 670. The selected marker may be stored as a reference marker in any suitable location such as the state of the memory manager (e.g., memory manager module 144), which may be a shared library that is loaded and mapped into the application's space. Other storage locations could include, for example, a register, cache, designated secure memory, separate storage, cloud storage, or any other suitable location. A copy of the reference marker(s) may be written to appropriate marker regions at appropriate times during the execution of an application (e.g., 670), and the reference marker may be subsequently compared to current data that is obtained from a marker region when performing a marker check (e.g., security, initialization, or bounds) during the execution of the application.

In security marker checks, during deallocation operations of a memory allocation the processor circuitry 630 determines the address of the marker region defined by a slot to which the memory allocation is assigned. For example, during the deallocation of a 64B allocation 668 assigned to a 128B slot 654, the address of a marker region 652, which is defined by the 128B slot 654 and is in the 64B allocation 668, is determined. Once the address of the marker region is determined, the processor circuitry 630 stores a copy of the selected security marker in the marker region and then deallocates the 64B allocation 668. During memory allocations, the processor circuitry 630 determines the address of the marker region of the slot to which the memory allocation is assigned, reads the current data at the determined address of the marker region, and compares the current data of the marker region to the selected security marker. If the current data of the marker region (e.g., 652) matches the selected security marker that is stored in memory or some other location, then this indicates that old data is still present in a previous allocation that overlaps with the new allocation. Accordingly, action may be taken to zero out the new memory allocation or to find a new memory range in memory for the new allocation.

It is to be noted that when a comparison of current data in a marker region to the corresponding selected security marker is described herein, the comparison is not meant to be viewed in a restrictive manner. Rather, it is meant to encompass comparison of all or part of the current data of the marker region (such as a portion on one side of the slot midpoint or another portion on the other side of the slot midpoint, etc.) with the security marker that was selected for "marking" (i.e., being stored in) marker regions of memory being deallocated.

In some embodiments, an initialization marker stored in a marker region 650 is an indication that the memory allocation containing the initialization marker has not been initialized and therefore, does not contain a known value (e.g., zeros) that has been encrypted. Accordingly, a particular value (e.g., all ones, all zeros, a random value, a deterministic value, etc.) may be loaded into a register in response to a memory access request to the uninitialized memory allocation. In other embodiments, a selected initialization marker may indicate a particular value (e.g., all ones, all zeros, etc.) or type of value (e.g., random, deterministic, etc.) to be used to load a register in response to a memory access request to the uninitialized memory allocation.

In initialization marker checks, during memory allocation operations of a memory allocation, the processor circuitry 630 determines the address of the marker region defined by a slot to which the memory allocation is assigned, and stores a copy of the selected initialization marker at the determined marker region. The marker region is subsequently checked during a memory access operation. If the initialization marker is present (meaning the allocation is not initialized), then a predetermined value is loaded in the register rather than contents of the memory allocation. For example, during the allocation of the 64B allocation 668 assigned to the 128B slot 654, the address of marker region 652 of the 128B slot 654 is determined. Once the address of the marker region is determined, the processor circuitry 630 stores a copy of the selected initialization marker in the marker region. When a memory access request (e.g., LOAD, MOV, etc.) is made to an address within the 64B allocation 668, the processor circuitry 530 determines the address of the marker region 652 of the 128B slot 654 to which the 64B allocation 668 is assigned, reads the current data at the determined address of the marker region 652, and compares the current data to the selected initialization marker, which may be stored in the state of a memory manager module (e.g., 144), for example. If the current data of the marker region 652 matches the selected initialization marker, then this indicates that the memory allocation is not initialized. Accordingly, a predetermined value (e.g., all zeros, all ones, etc.) may be loaded into the register, rather than the contents from the 64B allocation 668.

Other types of markers may be stored in different areas of a memory allocation. In one example, bounds markers may be used to delineate the upper bound and lower bound of a memory allocation. Although embodiments are not so limited, as shown in FIG. 6, the memory allocations may each contain boundary marker locations, such as a start marker location 662 and a stop marker location 664, in which a start marker and a stop marker can be stored, respectively. The bounds markers stored in the bound marker locations 662/664 may be encrypted with the data to be special ciphertext values to indicate to the processor circuitry 630 that an attempted memory access has gone beyond the end of its bounds. This may occur, for example, when pointer arithmetic is used on an array and attempts to access data beyond the end of the array. In this example, processor circuitry 630 can see the special start or stop marker in the ciphertext in a cacheline so the bounds check fails to return a match, and the core 632 returns an exception to the processor circuitry 630. This prevents buffer overflow and underflow conditions.

In the case of a collision, where encrypted data happens to accidentally match the upper and/or lower bound marker value, the actual bounds can be consulted by the processor circuitry 630 from the midpoint location. For example, metadata 602 carried by the encoded pointer 610 may indicate the bounds of the memory allocation. In addition, metadata indicating upper and lower bounds of an allocation may be stored at the midpoint of a slot in the same location or a different location from the marker regions. Accordingly, the metadata 602 in encoded pointer 610 may be compared with metadata 602 stored in an area at the slot midpoint to which the memory allocation 660 is assigned. The core 632 may further perform bounds checks and potentially other checks using the metadata 602 stored at the slot midpoint. If the metadata 602 carried by the encoded pointer 610 matches the metadata 602 stored at the slot midpoint of slot 640, and further if bounds checks comparing the memory address 604 against the bounds information, the core 632 completes the requested operation. If the metadata 602 carried by the encoded pointer 610 fails to match the metadata 602 stored at the slot midpoint of slot 640, and/or if bounds checks on the address check fails to return a match, the core 632 returns an exception to the processor circuitry 630.

The memory/cache 620 may include any number and/or combination of electrical components, semiconductor devices, optical storage devices, quantum storage devices, molecular storage devices, atomic storage devices, and/or logic elements capable of storing information and/or data. All or a portion of the memory/cache 620 may include transitory memory circuitry, such as RAM, DRAM, SRAM, or similar. All or a portion of the memory/cache 620 may include non-transitory memory circuitry, such as: optical storage media; magnetic storage media; NAND memory; and similar. The memory/cache 620 may include one or more storage devices having any storage capacity. For example, the memory/cache 620 may include one or more storage devices having a storage capacity of about: 512 kiloBytes or greater; 1 megaByte (MB) or greater; 100 MB or greater; 1 gigaByte (GB) or greater; 100 GB or greater; 1 teraByte (TB) or greater; or about 100 TB or greater.

In the shown embodiment of FIG. 6, the IMC 634 apportions the memory/cache 620 into any power of two number of slots 640. In some embodiments, the IMC 634 may apportion the memory/cache 620 into a single memory slot 640 (i.e., a power of two=$2^m$, for a value of m that results in the entire system memory being covered). In other embodiments, the IMC 634 may apportion the memory/cache 620 into two memory slots 640 (i.e., a power of two=$2^{m-1}$). In other embodiments, the IMC 634 may apportion the memory/cache 620 into four memory slots 640 (i.e., a power of two=$2^{m-2}$). In other embodiments, the IMC 634 may apportion the memory/cache 620 into "n" memory allocations 640 (i.e., a power of two=$2^k$ for a value k that results in dividing the memory space into "n" slots). Importantly, note that the midpoint address 642 in each of the memory slots 640 does not align with the midpoint address in other memory slots, thereby permitting the storage of metadata (in a marker region 650) that is unique to the respective memory slot 640s. In some embodiments, the metadata may include any number of bits. For example, the metadata may include 2 bits or more, 4-bits or more, 6-bits or more; 8-bits or more, 16-bits or more, or 32-bits or more.

The encoded pointer 610 is created for one of the memory allocations 660 (e.g., 32B allocation, 56B allocation, 48B allocation, 24B allocation, or 64B allocation) and includes memory address 604 for an address within the memory range of that memory allocation. When memory is initially allocated, the memory address may point to the lower bounds of the memory allocation (just after a start marker, if bounds markers are used). The memory address may be adjusted during execution of the application 670 using pointer arithmetic to reference a desired memory address within the memory allocation to perform a memory operation (fetch, store, etc.). The memory address 604 may include any number of bits. For example, the memory address 604 may include: 8-bits or more; 16-bits or more, 32-bits or more; 48-bits or more; or 64-bits or more; 128-bits or more; 256-bits or more, 512-bits for more, up to 2 to the power of the linear address width for the current operating mode, e.g., the user linear address width-bits in terms of slot sizes being addressed. In embodiments, the metadata 602 carried by the encoded pointer 610 may include any number of bits. For example, the metadata 602 may include 4-bits or more, 8-bits or more, 16-bits or more, or 32-bits or more. In embodiments, all or a portion of the address and/or tag/version metadata (which may or may not be included depending on the embodiment) carried by the encoded pointer 610 may be encrypted.

In embodiments, the contents of marker regions 650 and bound marker locations 662, 664 may be loaded as a cache line (e.g., a 32-byte block, 64-byte block, or 128-byte block, 256-byte block or more, 512-byte block, or a block size equal to a power of two-bytes) into the cache of processor circuitry 630. In performing memory operations on contents of a marker region stored in the cache of processor circuitry 630, the memory controller circuitry 634 or other logic, e.g., in processor circuitry 630, can decrypt the contents (if the contents were stored in an encrypted form), compare the appropriate reference marker (e.g., security marker, initialization marker, start marker, stop marker) with the contents from the marker region 650 and bound marker locations 662, 664 stored on the cache line containing the requested memory address, and take appropriate action based on the results of the comparison.

Figure 7:
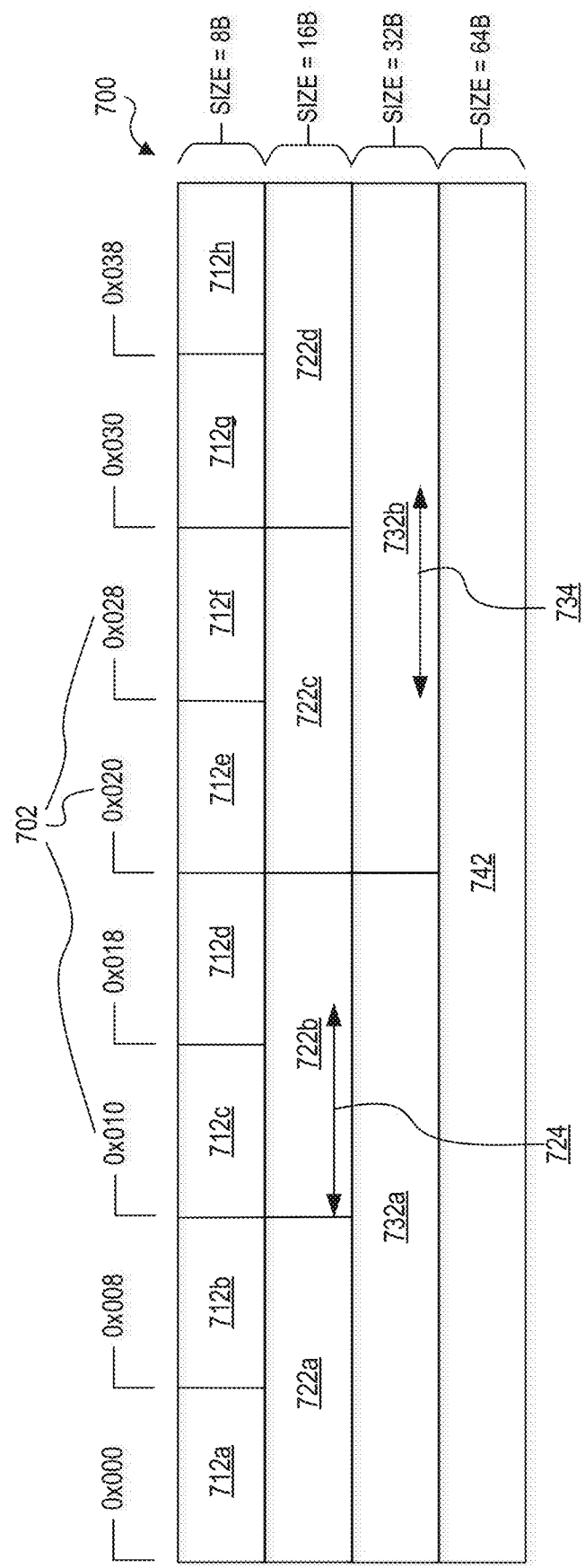
FIG. 7 is a schematic illustration of an example memory space divided into slots having power of two sizes.

FIG. 7 is a block diagram illustrating possible divisions of a memory space 700 into aligned slots with sizes of power of two. As previously described, such divisions may be apportioned in cryptographic computing implementations where encoded pointers to memory embed an encoding of size and where each size encoding is a power of two. The divisions of memory space 700 represent an example of possible divisions in memory 120 of computing device 100.

Although embodiments are not so limited, in the example shown in FIG. 7, memory space 700 illustrates apportionments of 64 bytes (64B) of memory into one or more aligned slots with power of two sizes. For illustration purposes, apportionments in memory space 700 are shown as eight $2^3$ byte (8B) slots 712a through 712h, four $2^4$ byte (16B) slots 722a through 722d, two $2^5$ byte (32B) slots 732a and 732b, and one $2^6$ byte (64B) slot 742. Each slot is aligned with a linear address 702 on a power of two (2") boundary. Slots having a particular power of two size may be aligned on consecutive linear addresses without overlapping other slots having the same power of two size. For example, 8B slot 712a is aligned with linear address 0x000, 8B slot 712b is aligned with linear address 0x008, 8B slot 712c is aligned with linear address 0x010, 8B slot 712d is aligned with linear address 0x018, 8B slot 712e is aligned with linear address 0x020, 8B slot 712f is aligned with linear address 0x028, 8B slot 712g is aligned with linear address 0x030, and 8B slot 712h is aligned with linear address 0x038. Each of the 8B slots are consecutively apportioned and none of the 8B slots overlap each other. For 16B slots apportioned in the same 64 byte memory space, 16B slot 722a is aligned with linear address 0x000, 16B slot 722b is aligned with linear address 0x010, 16B slot 722c is aligned with linear address 0x020, and 16B slot 722d is aligned with linear address 0x030. Each of the 16B slots are consecutively apportioned and none of the 16B slots overlap each other. For 32B slots apportioned in the same 64 byte memory space, 32B slot 732a is aligned with linear address 0x000, and 32B slot 732b is aligned with linear address 0x020. Each of the 32B slots are consecutively apportioned and none of the 32B slots overlap each other. The single 64B slot 742 is aligned with linear address 0x000 and takes up the entire 64B memory space.

As previously described herein, each memory allocation is assigned the smallest slot into which it fits based on a linear address where the allocation is aligned. For instance, a 10-byte allocation 724 at linear address 0x010 fits into slot 722b aligned at linear address 0x010, the slot 722b having a size of 16 Bytes. In another example, the smallest slot for a 10-byte allocation 734 at linear address 0x028 is the 32B slot 732b aligned at linear address 0x020. The pointer can be encoded using the base address and the slot size. For example, the pointer for the 10-byte allocation 724 can be encoded using the base address 0x010 and slot size $2^4$ bytes (16B), and the pointer for the 10-byte allocation 734 can be encoded using the base address 0x020 and slot size $2^5$ bytes (32B).

Figure 8:
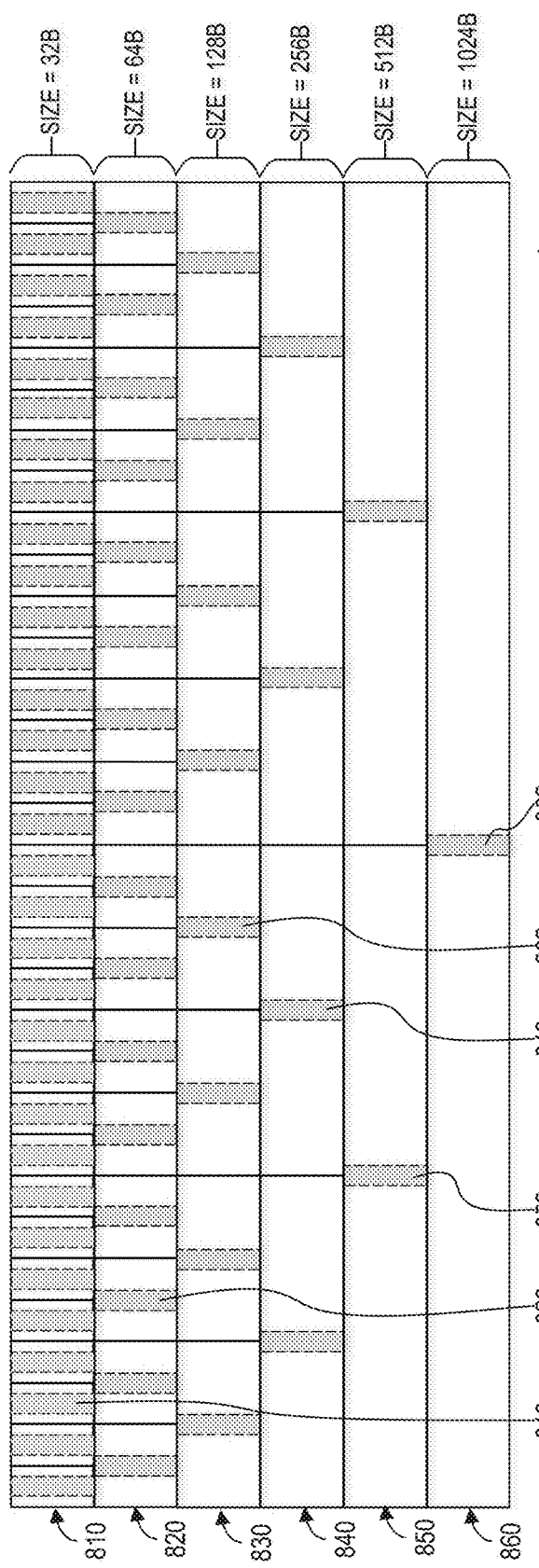
FIG. 8 is a schematic illustration of another example memory space divided into slots shown with marker regions at the slot midpoints.

FIG. 8 is a block diagram illustrating possible divisions of a memory space 800 into aligned slots with sizes of power of two and showing respective marker regions for storing security and/or initialization markers in memory allocations that could be assigned to the slots. In the example shown in FIG. 8, memory space 800 illustrates apportionments of 1024 bytes (1024B) of memory into one or more aligned slots with power of two sizes. Apportionments are shown in memory space 800 as thirty-two 32-byte slots 810, sixteen 64-byte slots 820, eight 128-byte slots 830, four 256-byte slots 840, two 512-byte slots 850, and one 1024-byte slot 860. Also in FIG. 8, the middle 16-byte regions of each slot are shaded to indicate marker regions in one embodiment. For example, marker region 812 is the middle 16-byte region of a 32-byte slot (of 32-byte slots 810), marker region 822 is the middle 16-byte region of a 64-byte slot (of 64-byte slots 820), marker region 832 is the middle 16-byte region of a 128-byte slot (of 128-byte slots 830), marker region 842 is the middle 16-byte region of a 256-byte slot (of 256-byte slots 840), marker region 852 is the middle 16-byte region of a 512-byte slot (of 512-byte slots 850), and marker region 862 is the middle 16-byte region of a 1024-byte slot (of 1024-byte slots 860).

Each arbitrarily allocated memory range of a memory allocation crosses the middle of the slot to which it is assigned. Thus, memory allocations assigned to the same slot, which are alive at different times during a program execution, each include the same middle region in memory defined by the slot. The size of the middle region depends upon the byte granularity and the minimum allocation size of the system. In one example, assuming an 8-byte allocation granularity and a 32-byte minimum allocation size, the middle 16 bytes of each slot are always included in each memory allocation assigned to that slot. If a memory allocation did not include the middle 16 bytes of the slot to which it was assigned, it means a smaller slot exists that would fit that allocation. Thus, assigning a memory allocation to the smallest slot into which it will fit ensures that the middle 16 bytes are always included in the allocation.

Figure 9:
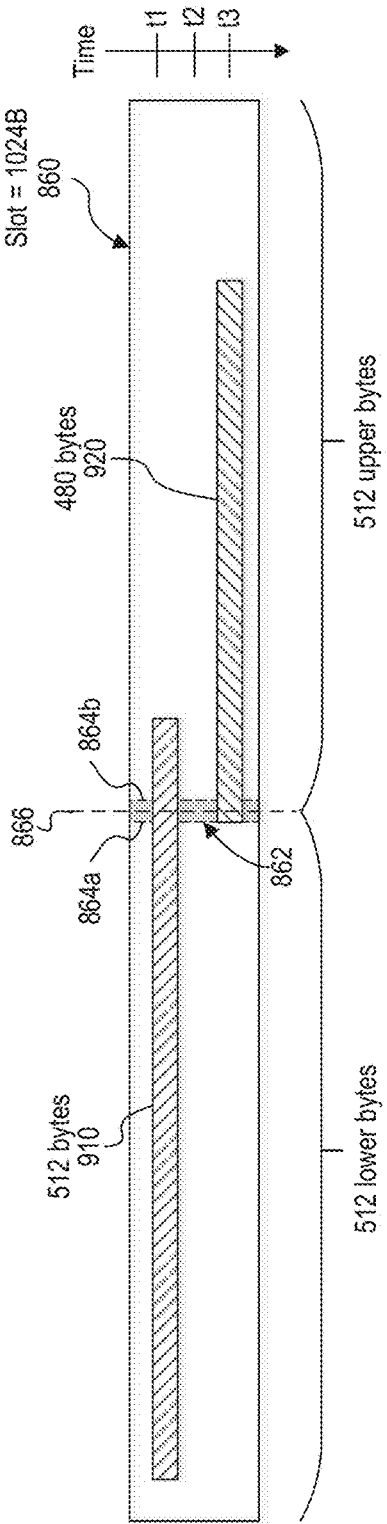
FIG. 9 is an expanded view of example memory allocations assigned to the same slot in memory over time.

FIG. 9 is an expanded view of the 1024-byte slot 860 illustrating an example scenario of being assigned to different memory allocations over time. In this example, a 1024-byte slot 860 has a midpoint 866. The midpoint 866 is located in the middle of the slot between 512 lower bytes and 512 upper bytes. At time t1 during the execution of an application (e.g., user application 134, application 670), a first memory range is allocated as a first memory allocation 910 of 512 bytes that is assigned to slot 860. At time t2, the first memory allocation 910 is deallocated or freed. At time t3, a second memory range is allocated as a second memory allocation 920 of 480 bytes that is also assigned to slot 860.

If a subsequent allocation of a new memory range is assigned to the same slot (where the assigned slot has the same address and the same size), then the encoded pointer to the new allocation will have the same base address and size encoding. Consequently, the same keystream that was generated to encrypt and decrypt objects in the old (presently deallocated) memory allocation, would be generated to encrypt and decrypt objects in the new (presently allocated) memory allocation, since size is implicitly used as a tweak to generate the keystream. Therefore, unless the contents of the old memory allocation have been overwritten by an intervening allocation(s) including the same memory range (or portions thereof) and assigned to different slots, the encoded pointer to the new memory allocation could potentially be used, inadvertently or maliciously, to access and successfully decrypt objects that were previously stored and are still present in the memory range of the old allocation. In the example of FIG. 9, if the memory range of the first memory allocation 910 was not overwritten between time t2 (deallocation of first memory range) and time t3 (allocation of second memory range), then the encoded pointer to the second memory allocation 920 could potentially be used to access and successfully decrypt objects that are still present in the first memory range of the first memory allocation 910, where the encryption of the objects is bound to the encoded pointer of the first memory allocation 910.

Memory allocations for overlapping memory ranges (either entirely or partially overlapping) that are assigned to the same slot each include the same middle region defined by assigned slot. The size of the middle region depends upon the byte granularity and the minimum allocation size of the system. In this example, with an 8-byte allocation granularity and a 32-byte minimum allocation size, a middle region that is contained in all memory allocations assigned to the same slot is 16 bytes. Accordingly, a middle region, such as marker region 862, is shown in FIG. 9 at the midpoint 866 of slot 860. The marker region 862 is evenly divided in the lower half of the slot and in the upper half of the slot. A first half 864*a* of the marker region 862 (e.g., lower 8 bytes) is located in the 512 lower bytes of the slot, and a second half 864*b* (e.g., upper 8 bytes) of the marker region 862 is located in the 512 upper bytes of the slot. As illustrated in FIG. 9, each allocation assigned to slot 860 contains the marker region 862 in memory defined by slot 860 during its respective allocation time (after being allocated and before being deallocated or freed). It should be noted that other systems may have different minimum allocation sizes (e.g., larger or smaller than 32 bytes) and/or different allocation granularity (e.g., larger or smaller than 8 bytes) and therefore, the middle region may be larger or smaller than 16 bytes according to the particular minimum allocation size and allocation granularity in such systems.

Since all memory allocations include a middle region (e.g., 862) defined by the slot to which the memory allocation is assigned, the middle region can be used as a common location to store markers. Markers can include, for example, security markers, initialization markers, or other metadata. Moreover, different markers can be stored in the middle region at different times of a program execution when memory is being allocated and deallocated. For example, a security marker may be stored in a middle region when a memory allocation is deallocated or freed, and may remain stored in memory until it is overwritten by some other memory allocation. An initialization marker may be stored in the middle region when a memory range is first allocated. The initialization marker may remain stored in memory until a memory access request is initiated for the memory allocation. Other metadata may be stored in a middle region of a memory allocation after the memory allocation has been initialized and until the memory allocation has been deallocated (or a security marker has overwritten the metadata during deallocation operations). Accordingly, the middle region defined by a particular slot may be generally referred to as the "marker region" of a memory allocation assigned to that slot, and more specifically referred to as the "security marker location" or "initialization marker location" of a memory allocation assigned to that slot.

In one or more embodiments, security markers may be used to prevent intentional or inadvertent leakage of data from memory ranges that are no longer allocated, for example, when the memory allocation for the memory range has been freed/deallocated. With reference to FIG. 9 for illustration purposes, in an embodiment, upon deallocating/freeing a memory allocation (e.g., 910), a security marker may be encrypted and stored in a marker region (e.g., 862) defined by a slot (e.g., 860) to which the memory allocation (e.g., 910) is assigned. The security marker may be encrypted using a keystream generated based on an encoded pointer for the memory allocation (e.g., 910), using the slot size as a tweak, as previously described herein. A subsequent (or new) memory allocation (e.g., 920) assigned to the same slot (e.g., 860), having the same slot address and slot size, includes the same marker region (e.g., 862) as the old (deallocated) memory allocation (e.g., 910). Additionally, using the encoded pointer of the new allocation (e.g., 920), the same keystream is generated to decrypt data stored in the new allocation (e.g., 920). Thus, the encoded pointer for the new allocation can be used to successfully decrypt the contents of the marker region (e.g., 862) of the new allocation (e.g., 920) to obtain the security marker that was stored as part of the old allocation (e.g., 910), provided it was not overwritten as part of another intervening allocation (e.g., between time t2 and time t3).

If the memory range of the old allocation is included in an intervening allocation (between the old allocation and the new allocation) that is assigned to a slot of a different size, however, the old content is likely to be overwritten, including the encrypted security marker stored in the marker region. If the memory range of the old allocation is then re-allocated and assigned to the same slot that was assigned to the old allocation, the security marker will not be detected, as it was overwritten by accesses to the intervening allocation. In this case, any other old data that was stored as part of the old allocation can also not be obtained by accesses to the new allocation.

If the contents of the marker region in the new allocation are successfully decrypted to produce the security marker, this implies that this new allocation matches one of the previous allocations (same slot address and slot size) and that old data is still intact, since the security marker has not been overwritten. This indicates that the old data can potentially be exposed through the new allocation. In order to prevent this, the contents of the new allocation can be either zeroed out in memory (without encrypting it with the new keystream to prevent keystream reuse), or the memory manager (e.g., 144) can attempt to reallocate a new range of memory that does not overlap with one of the older allocations of the same size. The memory manager may continue to try to reallocate the desired allocation size of memory until it finds an allocation with a marker region that does not contain a matching security marker. If the new memory allocation is zeroed out, a zero value may be stored in the new allocation without encryption to prevent the keystream from being reused. The approach of clearing memory (e.g., storing memory with zeros), which may be used in a new allocation when the security marker is present, still prevents a significant amount of overhead that would otherwise be required to routinely clear all memory during deallocation operations. In one or more embodiments, new allocations are cleared if the same memory range and size assigned to the same slot are reallocated (freed and allocated) in a sequential manner without being reused for an allocation of a different size.

Figure 10:
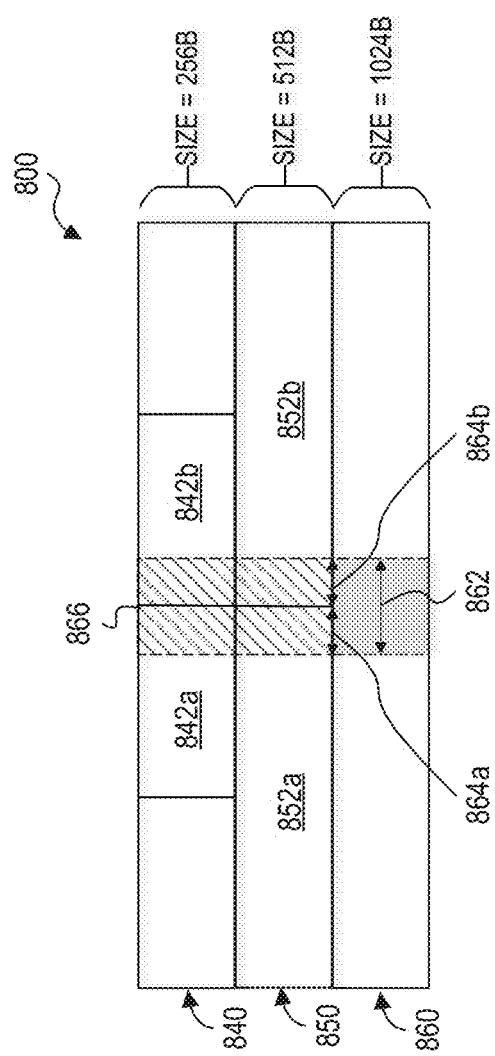
FIG. 10 is an expanded view of one example marker region of FIG. 8.

FIG. 10 is an expanded partial view of divided memory space 800 showing more details of the marker region 862 of the 1024-byte slot 860. Marker region 862 is representative of the other marker regions of memory space 800, shown in FIG. 8, and is shown and described for illustration purposes. In the example memory space 800, the marker regions, such as marker region 862, are defined in the middle 16 bytes of each slot. The marker region of a slot of size N overlaps with two smaller slots (size N/2, N/4, etc.) that are adjacent to the midpoint of that slot. For example, marker region 862 of slot 860, having a size of 1024 bytes (N), overlaps with slots 852*a* and 852*b*, each having a size of 512 bytes (N/2) and each being adjacent to the midpoint 866 of slot 860. Similarly, marker region 862 of slot 860, having a size of 1024 bytes (N), overlaps with slots 842*a* and 842*b*, each having a size of 256 bytes (N/4) and each being adjacent to the midpoint 866 of slot 860.

The first 8 bytes of the marker region overlap with the highest 8 bytes of a smaller slot below the midpoint of the marker region, and the second 8 bytes overlap with the lowest 8 bytes of a smaller slot above the midpoint of the marker region. For example, as shown in FIG. 10, a first (lower) half 864*a* of the marker region 862, having a size of 8 bytes, overlaps with the highest 8 bytes of smaller slot 852*a* below the midpoint 866, and a second (upper) half 864*b* of the marker region 862, which has a size of 8 bytes, overlaps with the lowest 8 bytes of smaller slot 852*b* above the midpoint 866. Even if only one-half of a freed block of size N is re-used for a smaller allocation and the other half is intact, the 8 bytes of the marker region on the intact side of the midpoint will remain untouched and can be identified if the entire slot of size N is re-allocated later in time. Hence, a potential use-after-free (UAF) scenario can be detected if at least one half of the value read from the marker region (either the lower half 864*a* or the upper half 864*b*) matches with the corresponding half of the reference security marker.

In extremely rare scenarios, a security marker may be detected even if it is not a use-after-free scenario. This could occur when random data stored in a marker region defined by a slot assigned to a new memory allocation happens to decrypt in a manner such that the resulting value matches the entire reference security marker, the lower half of the reference security marker, or the upper half of the reference security marker. In this case, the mitigating techniques may still be used (e.g., clear the new memory allocation or try to re-allocate). Such processing, however, does not affect the functionality of the concept. Moreover, as this scenario is very improbable ($\sim 2^{-64}$ probability of matching a random 8 bytes), performance would not be measurably affected. Thus, embodiments using security markers as outlined herein, where memory allocations are only cleared when a use-after-free scenario occurs or in the very rare (and improbable) scenarios outlined above, alleviate the performance overhead of clearing every memory allocation when it is freed.

A security marker is data that may be any suitable value and may be obtained using any secure technique. For example, a security marker may be a randomly or deterministically generated value, a value received from an external source, a value that is generated based on a hardware key (e.g., stored in a processor), or any other secure value. In one embodiment, a single security marker may be generated for all programs running on a computing system or virtual machine. In such embodiments, the security marker may be obtained (e.g., generated, selected, received, etc.) during the boot process or during an initialization of the operating system of the computing system or virtual machine. In other embodiments, a unique security marker may be generated for each program running in a computing system or running in a virtual machine. In such embodiments, a security marker may be obtained during the initialization of a program. In yet other embodiments, more security markers may protect memory more granularly and may be generated based on a function of some other data (e.g., the address, metadata, etc.) or based on any other suitable criteria. In this case, the security marker could be unique and unpredictable for each allocation. In such embodiments, security markers may be obtained a priori during initialization of a program or dynamically obtained as a program deallocates memory while executing. Other markers (e.g., initialization markers, bounds markers) may be similarly obtained.

In another embodiment, a version value may be used in conjunction with a security marker to prevent objects in a new allocation from being accessed and successfully decrypted by a dangling pointer in a use-after-free scenario. For example, when a use-after-free scenario is detected based on the presence of a security marker in the marker region, and if zeros are stored in the new memory allocation to prevent old data from being accessed, then the use of a version value in conjunction with a security marker can prevent new data in the new memory allocation from being inadvertently or maliciously accessed and decrypted by the dangling pointer for the old memory allocation.

In this embodiment, a version value can be stored together with the security marker in a marker region defined by a slot assigned to a memory allocation in response to a request to deallocate or free the memory allocation. The version value can also be embedded in the encoded pointer for the memory allocation. For example, the encoded pointer could be included in a metadata portion (e.g., 403) of the encoded pointer. Since the version is part of the pointer, the data in the memory allocation, including the marker region, is encrypted differently for different version values, even when the pointer is otherwise the same. When a new pointer is allocated for a new memory allocation, if a security marker is present in the marker region defined by a slot to which the new memory allocation is assigned, this indicates that the new pointer includes the same version value as the old pointer. In this case, the version value in the new pointer can be incremented in any suitable manner. Accordingly, objects that are stored in the new memory allocation will be encrypted using the encoded pointer with the new version value. Consequently, any inadvertent or malicious attempts to use the old pointer to access data in the new memory allocation will not decrypt the data correctly.

In one or more embodiments using security markers to prevent data in old allocations from being accessed by new pointers to new allocations and to prevent data in new allocations from being accessed by old (dangling) pointers to old (freed) allocations, both the memory allocation operations (e.g., instructions such as malloc, calloc, re-alloc, etc.) and memory deallocation operations (e.g., instructions such as free, etc.) can be enhanced, supplemented, or otherwise changed to implement security markers as described herein. Initially, a security marker is selected. The security marker may be the size of a marker region defined by system (e.g., based on allocation granularity and minimum size allocation). For ease of illustration, the marker region is assumed to be 16 bytes.

Figure 11:
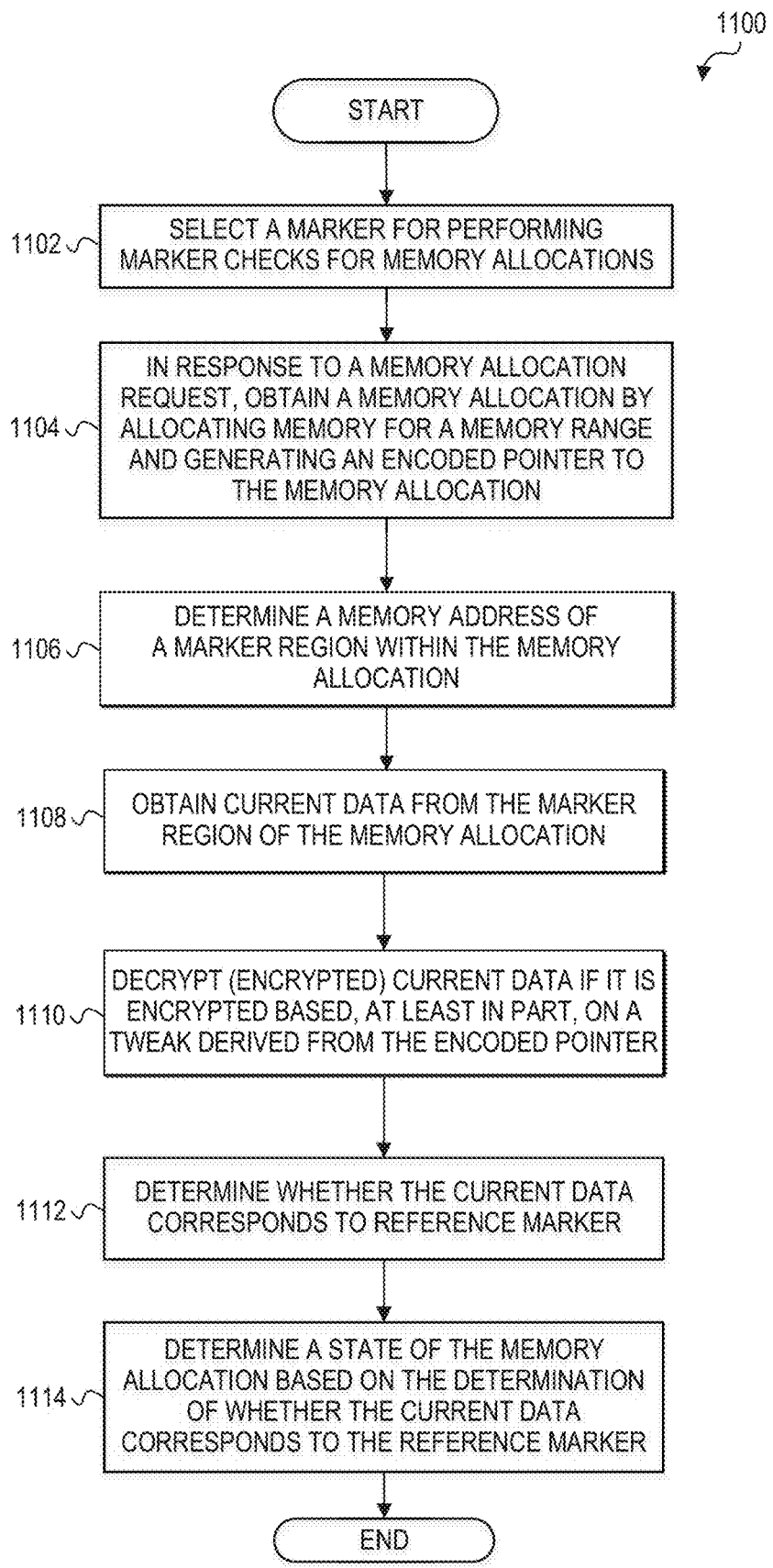
FIG. 11 is a high level flow diagram of an example process for performing various marker checks in a cryptographic computing system according to an embodiment.

Turning to FIG. 11, FIG. 11 is a high level flow diagram of an example process 1100 of performing a marker check in a cryptographic computing system according to at least one embodiment. In FIG. 11, process 1100 may be associated with one or more operations. A computing system (e.g., computing device 100) may comprise means such as one or more processors (e.g., 102, 630), for performing the operations. In one example, one or more of the operations shown in process 1100 may be performed by secure memory access logic 150. Generally, process 1100 illustrates, at a high level, performing a marker check for an executing application, where the markers could include security markers and/or initialization markers in heap or in stack memory.

At 1102, markers (e.g., security markers and/or initialization markers) are selected or otherwise generated to be used for performing marker checks, such as security marker checks or initialization marker checks for memory allocations of an executing application. The markers (e.g., security marker or initialization marker) may be specific to the type of marker check for which it is selected. Thus, markers for security marker checks may be different than markers for initialization marker checks. Markers may be any suitable deterministic or random value that is selected or otherwise generated depending on the granularity of the marker checks. For example, markers may be selected or generated during initialization of an operating system (e.g., during a boot process or startup process) and used for marker checks in any or all applications that run inside the operating system. In another example, markers may be selected or generated during initialization of a virtual machine and used for marker checks in any or all applications that run inside the virtual machine. In yet another example, markers may be selected or generated during initialization of an application (e.g., when an application is loaded) and used for marker checks in that application. In yet another example, markers may be selected during an initialization of variables in a function of the application and used for marker checks in stack frame allocations for that function. In yet a further example, markers for security marker checks may be selected or generated during a memory deallocation request and used for security marker checks in a subsequent memory allocation request that obtains the same slot or stack frame. Accordingly, markers for security marker checks and/or initialization marker checks can be specific to a computing system, a virtual machine, an executing application, a function, each memory deallocation request within a process, or a type of memory deallocation request (e.g., heap, stack, a particular slot size, a particular stack frame, a particular slot, etc.).

Generally, markers may be stored as reference markers that can be copied into marker regions and that can be compared to current data in the marker regions during marker checks that are performed on memory allocations. The reference markers can be stored in any suitable storage that is separate from the memory on which the marker checks are performed. For example, markers may be stored in main memory (e.g., 120), cache memory (e.g., 118), a register (e.g., 110), or a separate remote or local storage unit communicably connected to the processor. In at least some embodiments, a memory manager (e.g., 144) selects a marker and stores the selected marker data in the memory manager's state. The memory manager may be a shared library that is loaded and mapped into the application's space. Accordingly, the marker can be stored as a variable in at least some embodiments.

At 1104, in response to a memory allocation request for an application, a memory allocation is obtained by allocating memory for a memory range and generating an encoded pointer to the memory allocation. The encoded pointer may be configured in a similar manner to other encoded pointers described herein. For example, size metadata (e.g., power size, actual allocation size) and memory address data may be encoded into the pointer, and the size metadata and memory address data may be used as a tweak (or part of a tweak) when encrypting and decrypting contents of the memory allocation, which are accessed by the encoded pointer. It should be noted that the memory allocation could be a memory range in heap memory (e.g., dynamic memory allocation via a software instruction such as 'malloc', 'calloc', or 'realloc' for example), or a stack frame in stack memory (e.g., static memory allocation implicitly via a loader for example).

At 1106, a memory address of a marker region within the memory allocation is determined. For example, in heap memory allocations, the marker region may cross a midpoint of a slot that is defined in the memory and that contains the memory allocation. In this case, the memory address for the marker region may be calculated based on the memory address aligned with the slot, the size of the slot, and the size of the marker data (which corresponds to the size of the marker region), as will be further described herein. In stack allocations, the marker region may coincide with a location in a stack frame that is dedicated for storing particular information. For example, the marker region may coincide with the location for storing a return address of a function for which the stack frame is allocated.

At 1108, current data is obtained from the marker region in the memory allocation, based on the determined memory address of the marker region. For some marker checks (e.g., security marker check), the relevant marker data (e.g., security marker) that is stored in a marker region may be encrypted. For other marker checks (e.g., initialization marker check), the relevant marker data (e.g., initialization marker) that is stored in a marker region may not be encrypted. Accordingly, at 1110, if the marker check uses encrypted markers, then obtaining current data from the marker region includes reading encrypted data from the marker region and generating the current data by decrypting the encrypted data that was read. The decryption can be based, at least in part, on a tweak derived from the encoded pointer (e.g., size metadata, memory address data). If the marker check does not use encrypted markers, then obtaining the current data from the marker region includes reading the current data from the marker region without the need for decryption.

At 1112, a determination is made as to whether the current data corresponds to the reference marker selected for the marker check. At 1114, a state of the memory allocation is determined based on the whether the current data corresponds to the reference marker. If a security marker check is being performed and the current data obtained from the marker region of the memory allocation corresponds to the selected reference marker, then the state of the current memory allocation is that at least a portion of the current memory allocation overlaps with a previous memory allocation and it is vulnerable to a use-after-free attack. In particular, a first keystream to be generated for cryptographic operations on objects to be stored in the current memory allocation would be equivalent to a second keystream previously used for cryptographic operations on objects currently stored in the previous memory allocation, which could allow inadvertent or malicious access to the currently stored objects. For this state, appropriate action may be taken to prevent access to the contents currently stored in the memory allocation. For example, the memory allocation may be overwritten with zeroes or some other value. In another example, an alternate memory allocation may be obtained by allocating a different memory range and generating an alternate encoded pointer for the alternate memory allocation.

If a security marker check is being performed and the current data obtained from the marker region of the memory allocation does not correspond to the selected reference marker, then the state of the current memory allocation is that the current memory allocation is not vulnerable to a use-after-free attack, as either it does not overlap with a previous memory allocation assigned to the same slot in memory, or if it does overlap with a previous memory allocation assigned to the same slot in memory, then the objects stored in the previous memory allocation have likely been overwritten with other objects.

If an initialization marker check is being performed and the current data obtained from the marker region of the memory allocation corresponds to the selected reference marker, then the state of the current memory allocation is that it has not been initialized. For this state, initialization data may be loaded into a register instead of the contents of the memory allocation, in response to a memory access request.

If an initialization marker check is being performed and the current data obtained from the marker region of the memory allocation does not correspond to the selected reference marker, then the state of the current memory allocation is that it has been initialized. For this state, a memory access operation can proceed normally.

Figure 12:
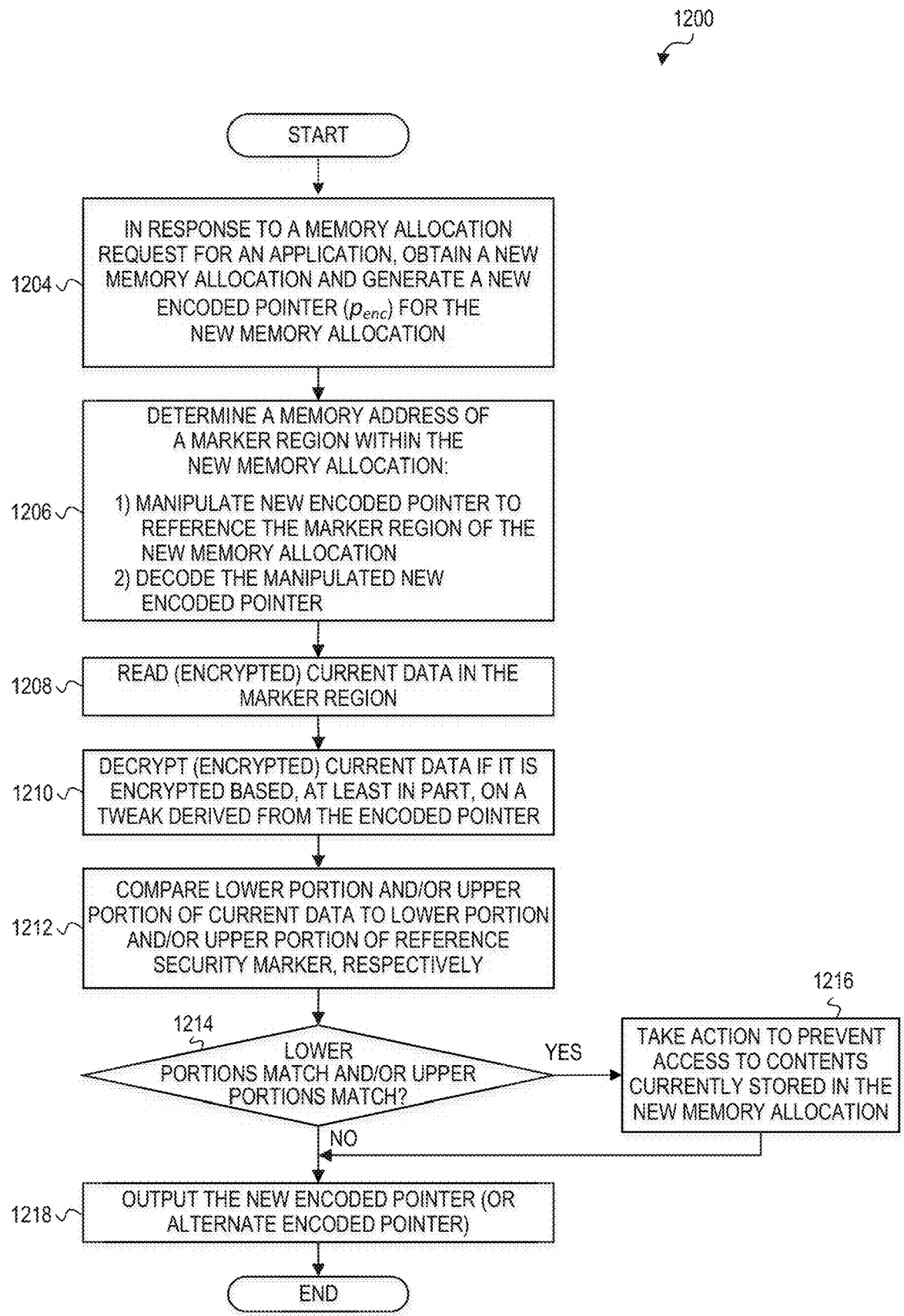
FIG. 12 is a flow diagram of an example process related to security marker checks in a cryptographic computing system according to an embodiment.

FIG. 12 is a flow diagram of an example process 1200 for the portion of a security marker check in a cryptographic computing system that is performed in response to a memory allocation request according to an embodiment. Process 1200 may be associated with one or more operations. A computing system (e.g., computing device 100) may comprise means such as one or more processors (e.g., 102, 630), for performing the operations. In one example, at least some of the operations shown in process 1200 may be performed by address encoding logic 152, address decoding logic 154, and security marker verify logic 172. At least some of the operations of process 1200 may be performed in response to a request for dynamic memory allocation. Such a request could be initiated by an application for a certain size of memory via a software instruction or function such as 'malloc', 'calloc', or 'realloc' in C programming language, or any other dynamic memory allocation instruction in C or another programming language.

It should be noted that a security marker, SM, may be selected and stored as a reference security marker a priori to process 1200, as previously described herein with reference to FIG. 11 at 1102, among other examples.

At 1204, in response to a request by an application to dynamically allocate memory (e.g., heap), a memory allocation operation is performed for the executing application. The memory allocation operation includes obtaining a memory allocation for a memory range that has certain size S (e.g., in bytes) and generating an encoded pointer ($p_{enc}$) to the memory allocation. The encoded pointer may be generated and configured in a similar manner as other encoded pointers described herein (e.g., encoded pointers 410, 610, encoded indirect address 206). For example, the encoded pointer may include memory address data, size metadata (e.g., power size, actual allocation size), and at least a portion of the memory address data may be encrypted. The memory address data corresponds to a slot defined in memory to which the memory allocation is assigned, and the power size metadata determines the number of address bits that are immutable and mutable, where the mutable address bits are used for pointer arithmetic and the number of mutable address bits corresponds to the power of two size of the slot. For example, a resulting 64-bit encoded pointer $p_{enc}$ is in a slot of size $2^n$, where n=number of mutable bits in the pointer). At least a portion of the memory address data and the power size metadata may be used as part of a tweak to bind encryption of the contents of the memory allocation to the encoded pointer of the memory allocation.

At 1206, a memory address of a marker region within the memory allocation is determined. The location of the marker region is defined by the midpoint of the slot to which the memory allocation is assigned. To determine the memory address of the marker region, first, the encoded pointer ($p_{enc}$) is manipulated by using pointer arithmetic in the mutable bits of the pointer to reference the marker region of the memory allocation. In one example, the following approach can be used: First, mask the lowest n bits (where the memory allocation referenced by $p_{enc}$ is in a slot size of $2^n$). Second, add an offset equal to one-half of the size of the slot less the size of the selected reference security marker (or encrypted version thereof) to be stored in marker regions. For illustration purposes, the selected reference security marker, SM, is assumed to have a size of 16 bytes with two 8-byte halves, $SM_{low}$ and $SM_{high}$. This example approach for determining the pointer to the marker region is illustrated as follows:

$p_{enc}$=encoded pointer in slot size $2^n$
n=number of mutable address bits in the encoded pointer
$p_m$=encoded pointer to marker region $$p_m = \left(p_{enc} \ \&11 \ldots 11\underbrace{00 \ldots 00}_{n}\right) + \frac{2^n - 16}{2}$$

Once the encoded pointer has been successfully manipulated to reference the marker region, the encoded pointer may then be decoded to obtain the linear address of the marker region. For example, the encrypted portion of the encoded pointer can be decrypted using as input, an address key and an address tweak derived, at least in part, from the manipulated encoded pointer.

At 1208, the linear address of the marker region (e.g., calculated above) can be used to read current data in the marker region, which may be a particular size, such as 16 bytes in the above example. Depending on the implementation, however, the security marker check may be implemented using other sizes and therefore, the defined marker region may be larger or smaller to accommodate the size of the reference security marker. In some embodiments, during a deallocation process, a copy of the reference security marker may be encrypted and stored in the marker region before the memory allocation is deallocated. In other embodiments the copy of the reference security marker may be stored in the marker region without encryption.

At 1210, if the current data is encrypted, then the encrypted current data may be decrypted to generate the current data. The decryption may be based, at least in part, on a tweak derived from the encoded pointer. In at least one embodiment, the tweak may include the power size metadata and at least a portion of the memory address data in the pointer.

At 1212, the current data (decrypted) from the marker region can be compared to the reference security marker, which was previously selected or generated and stored in a secure location (e.g., 1102). In one example, a lower portion of the current data is compared to a lower portion of the reference security marker, and an upper portion of the current data is compared to an upper portion of the reference security marker. In at least one embodiment, the lower and upper portions of the current data can be halves of the current data, and the lower and upper portions of the reference security marker can also be halves of the reference security marker. For example, if the reference security marker and current data are each 16 bytes, then the lower portions and upper portions of the reference security marker can be 8 bytes each and the lower and upper portions of the current data can be 8 bytes each.

At 1214, a determination is made as to whether the lower portions of the current data and the reference security marker match, whether the upper portions of the current data and the reference security marker match, or whether both portions of the current data match both portions of the reference security marker. If a match is found, then this indicates that a previous allocation was assigned to the same slot and may still have data stored in the previous allocation that could potentially be accessed by the encoded pointer, or that an old pointer to the previous allocation could potentially access new data that is to be stored in the new memory allocation. In this scenario, at 1216, appropriate action may be taken to prevent access to contents (e.g., objects such as data or code) currently stored in the new memory allocation.

At 1214, if no match is found between the upper and lower portions of the current data in the marker region of the memory allocation (either the new memory allocation or an alternative memory allocation obtained at 1216) and the respective upper and lower portions of the reference security marker, or if appropriate action has been taken at 1216, then at 1218, the resulting encoded pointer (either the new encoded pointer or an alternative encoded pointer obtained at 1216) for the memory allocation can be outputted to the application.

Figure 13:
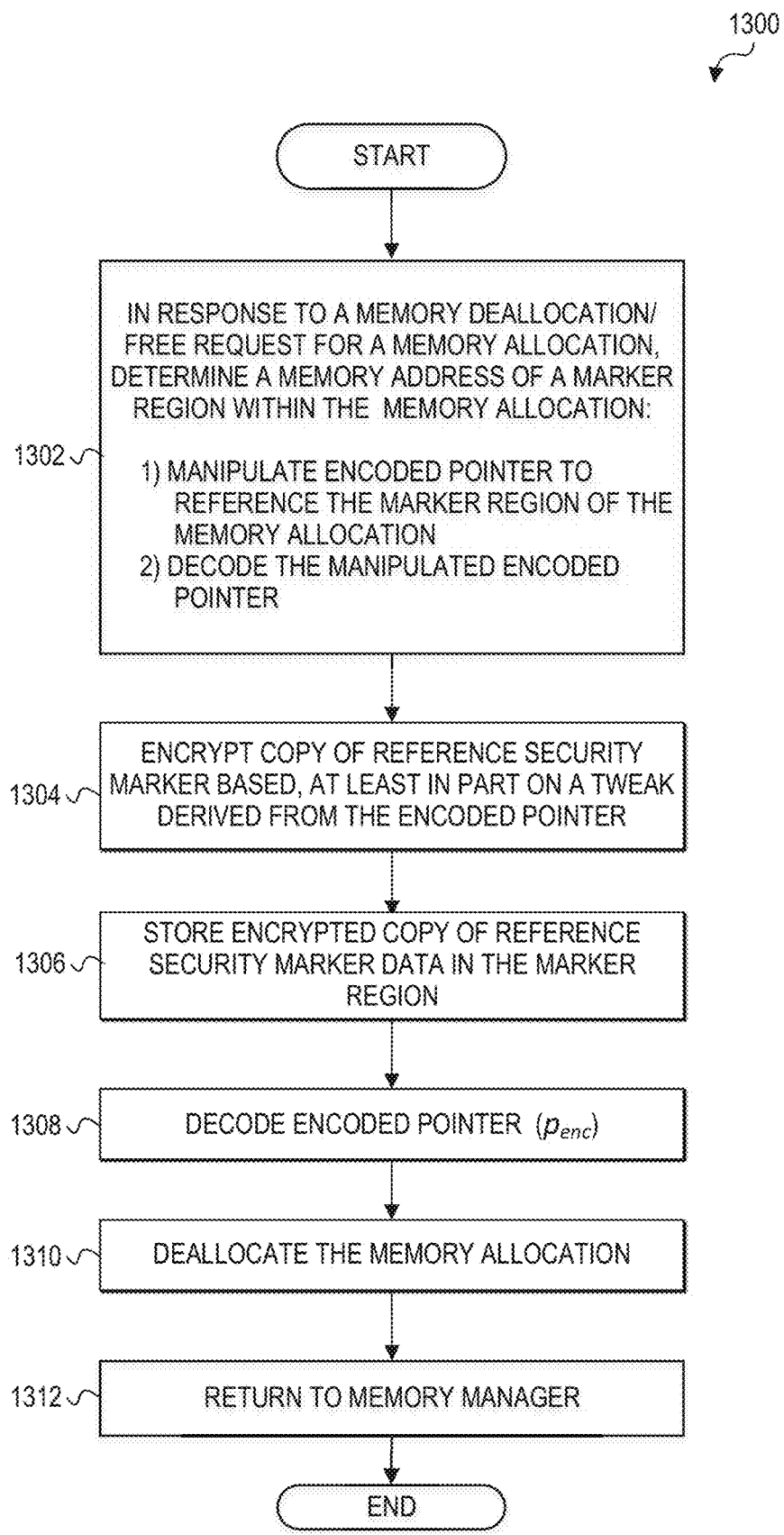
FIG. 13 is a flow diagram of another example process related to security marker checks in a cryptographic computing system according to an embodiment.

FIG. 13 is a flow diagram of an example process 1300 for the portion of a security marker check in a cryptographic computing system that is performed in response to a memory deallocation request according to an embodiment. Process 1300 may be associated with one or more operations. A computing system (e.g., computing device 100) may comprise means such as one or more processors (e.g., 102, 630), for performing the operations. In one example, at least some of the operations shown in process 1300 may be performed by address decoding logic 154 and security marker write logic 170. At least some of the operations of process 1300 may be performed in a response to a request to deallocate memory. Such a request could be initiated by an application for a memory range via a software instruction or function such as 'free' or 'realloc' in C programming language, 'delete' in C++ programming language, or any other dynamic memory allocation instruction or function in C, C++, or another programming language.

It should be noted that a security marker, SM, may be selected and stored as a reference security marker a priori (or during) process 1300 as previously described herein with reference to FIG. 11 at 1102, among other examples.

At 1302, in response to a request to deallocate a memory allocation, a memory address of a marker region within the memory allocation is determined. The location of the marker region is defined by the midpoint of a slot assigned to the memory allocation. To determine the memory address of the marker region, first, the encoded pointer ($p_{enc}$) is manipulated by using pointer arithmetic in the mutable bits of the pointer to reference the marker region of the memory allocation. One example of an approach to manipulate the encoded pointer to reference the marker region is described with reference to 1206 of FIG. 12.

Once the encoded pointer has been successfully manipulated to reference the marker region, the encoded pointer may then be decoded to obtain the linear address of the marker region. For example, the encrypted portion of the encoded pointer can be decrypted using as input, an address key and an address tweak derived, at least in part, from the manipulated encoded pointer.

At 1304, a copy of a reference security marker (which can be selected or generated as described with reference to 1102 of process 1100) can be encrypted based, at least in part, on a tweak derived from the encoded pointer. The tweak can include the power size metadata and at least a portion of the memory address data in the encoded pointer. In other embodiments, an unencrypted copy of a reference security marker may be stored in the marker region.

At 1306, the memory address of the marker region is used to store the encrypted (or unencrypted) copy of the reference security marker in the marker region of the memory allocation. The same marker region can be checked during a subsequent memory allocation operation if the subsequent memory allocation is assigned to the same slot, having the same size.

At 1308, the encoded pointer is decoded. Thus, the encrypted portion of the memory address is decrypted and the other fields are replaced as needed so that the pointer contains the linear address. This may be needed in a legacy system where the memory manager is unaware of pointer encoding. Thus, decoding the encoded pointer prior to freeing the memory allocation enables the memory manager to user the pointer as a reference point to access a chunk header.

At 1310, the memory allocation is deallocated using any appropriate operation. To deallocate a memory allocation is intended to mean that the memory range covered by the memory allocation is free to be allocated again by another memory allocation request.

At 1312, control returns to the memory manager (e.g., 144) for example, in the operating system, which can allow the application to continue its execution.

Figure 14:
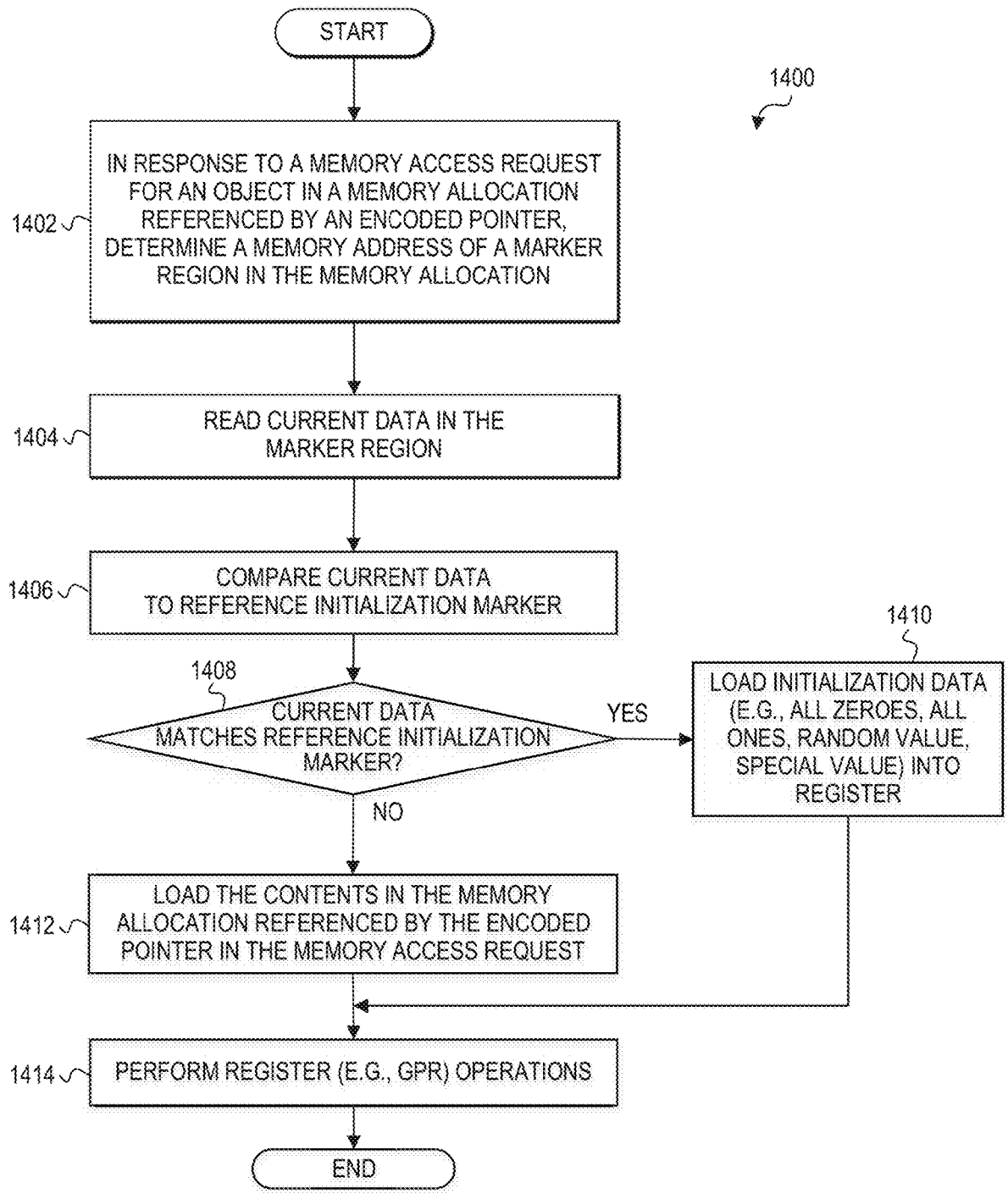
FIG. 14 is a flow diagram of an example process related to initialization marker checks in a cryptographic computing system according to an embodiment.

FIG. 14 is a flow diagram of an example process 1400 for the portion of an initialization marker check in a cryptographic computing system that is performed in response to a memory access request (e.g., read, write, move, etc.) according to an embodiment. Process 1400 may be associated with one or more operations. A computing system (e.g., computing device 100) may comprise means such as one or more processors (e.g., 102, 630), for performing the operations. In one example, at least some of the operations shown in process 1400 may be performed by memory load logic 164, address decoding logic 154, and initialization marker verify logic 182. At least some of the operations of process 1400 may be performed in a response to a memory access request.

It should be noted that initialization marker, IM, may be selected and stored as a reference initialization marker a priori to process 1400 as previously described herein with reference to FIG. 11 at 1102, among other examples.

At 1402, in response to a request by an application to access an object in a memory allocation (e.g., in heap) referenced by an encoded pointer, a memory address of a marker region in the memory allocation is determined. The memory allocation may be a certain size S (e.g., in bytes) and the encoded pointer ($p_{enc}$) to the memory allocation may be generated and configured in a similar manner as other encoded pointers described herein (e.g., encoded pointer 410, 610, encoded indirect address 206). For example, the encoded pointer may include memory address data, size metadata (e.g., power size, actual allocation size), and at least a portion of the memory address data may be encrypted. The memory address data corresponds to a slot assigned to the memory allocation and the power size metadata determines the number of address bits that are immutable and mutable, where the number of mutable address bits corresponds to the power of two size of the assigned slot. For example, a resulting 64-bit encoded pointer $p_{enc}$, is in a slot of size $2^n$, where n=number of mutable bits in the pointer). At least a portion of the memory address data and the power size metadata may be used as part of a tweak to bind encryption of the contents of the memory allocation to the encoded pointer of the memory allocation.

The location of the marker region is defined by the midpoint of a slot assigned to the memory allocation. To determine the memory address of the marker region, first, the encoded pointer ($p_{enc}$) is manipulated by using pointer arithmetic in the mutable bits of the pointer to reference the marker region of the memory allocation. In one example, the following approach can be used: First, mask the lowest n bits (where the memory allocation referenced by $p_{enc}$ is in a slot size of $2^n$). Second, add an offset equal to one-half of the size of the slot less the size of the selected reference initialization marker (or encrypted version thereof) to be stored in marker regions. For illustration purposes, the selected reference initialization marker, IM, is assumed to have a size of 16 bytes, although it may be configured with more or less bytes in different implementations. Moreover, if security marker checks and initialization marker checks are implemented together, the reference security marker and the reference initialization marker may have the same size or different sizes depending on the particular implementation. This example approach for determining the pointer to the marker region is illustrated as follows:

$p_{enc}$=encoded pointer in slot size $2^n$
n=number of mutable address bits in the encoded pointer
$p_m$=encoded pointer to marker region $$p_m = \left( p_{enc} \ \&11\ ...\ 11\underbrace{00\ ...\ 00}_{n} \right) + \frac{2^n - 16}{2}$$

Once the encoded pointer has been successfully manipulated to reference the marker region, the encoded pointer may then be decoded to obtain the linear address of the marker region. For example, the encrypted portion of the encoded pointer can be decrypted using as input, an address key and an address tweak derived, at least in part, from the manipulated encoded pointer.

At 1404, the linear address of the marker region (e.g., calculated above) can be used to read current data in the marker region, which may be a particular size, such as 16 bytes in the above example. Depending on the implementation, however, the initialization marker check may be implemented using other sizes and therefore, the defined marker region may be larger or smaller to accommodate the size of the reference initialization marker. In some embodiments, a copy of the reference initialization marker is stored in the marker region without being encrypted.

It should be noted that other ciphertext markers may also be checked to determine whether a particular unencrypted value has been used to initialize the memory allocation. For example, a 'calloc' instruction can allocate memory and write zeros to it without encrypting the zeros. In this scenario, the marker region may not be read or checked for an initialization marker and an initialization value (e.g., zero) can be loaded into the register without performing decryption.

At 1406, the current data read from the marker region can be compared to the selected reference initialization marker, which was previously selected or generated and stored in a secure location (e.g., 1102).

At 1408, a determination is made as to whether the current data read from the marker region matches the selected reference initialization marker. If they match, then this indicates that the state of the memory allocation is that it is not initialized. In this case, at 1410, the processor may load initialization data into a register instead of reading the contents of the memory allocation that are referenced by the encoded pointer provided in the memory access request. Initialization data can include any suitable value including, for example, all zeroes, all ones, a random value, a special value, or any other suitable value.

If it is determined at 1408 that the current data read from the marker region does not match the selected reference initialization marker, then at 1412, the contents from the memory allocation referenced by the encoded pointer in the memory access request are loaded into the register.

At 1414, once the initialization data (e.g., 1410) or the contents from the memory allocation requested in the memory access request (e.g., 1412) are loaded into the register, then normal general processor register operations may be performed. Eventually, the data in the register may be encrypted using the encoded pointer and stored in the memory allocation at the memory address referenced by the encoded pointer.

It should be noted that the selected initialization marker can be expanded based on the memory allocation size to track which data elements have been initialized. To mitigate a scenario in which an actual data element collided with the reference initialization marker, more than one reference initialization marker could be used. Although few would be needed given the unlikely possibility (e.g., approximately one in one billion chances for a 64-bit data value), any number of reference initialization markers could be selected and used. The processor can observe collisions on data writes (stores) when the encrypted data creates a ciphertext matching the reference initialization marker. The processor can find collisions per memory allocation at a marker region defined by the midpoint of a slot to which the memory allocation is assigned.

Figure 15:
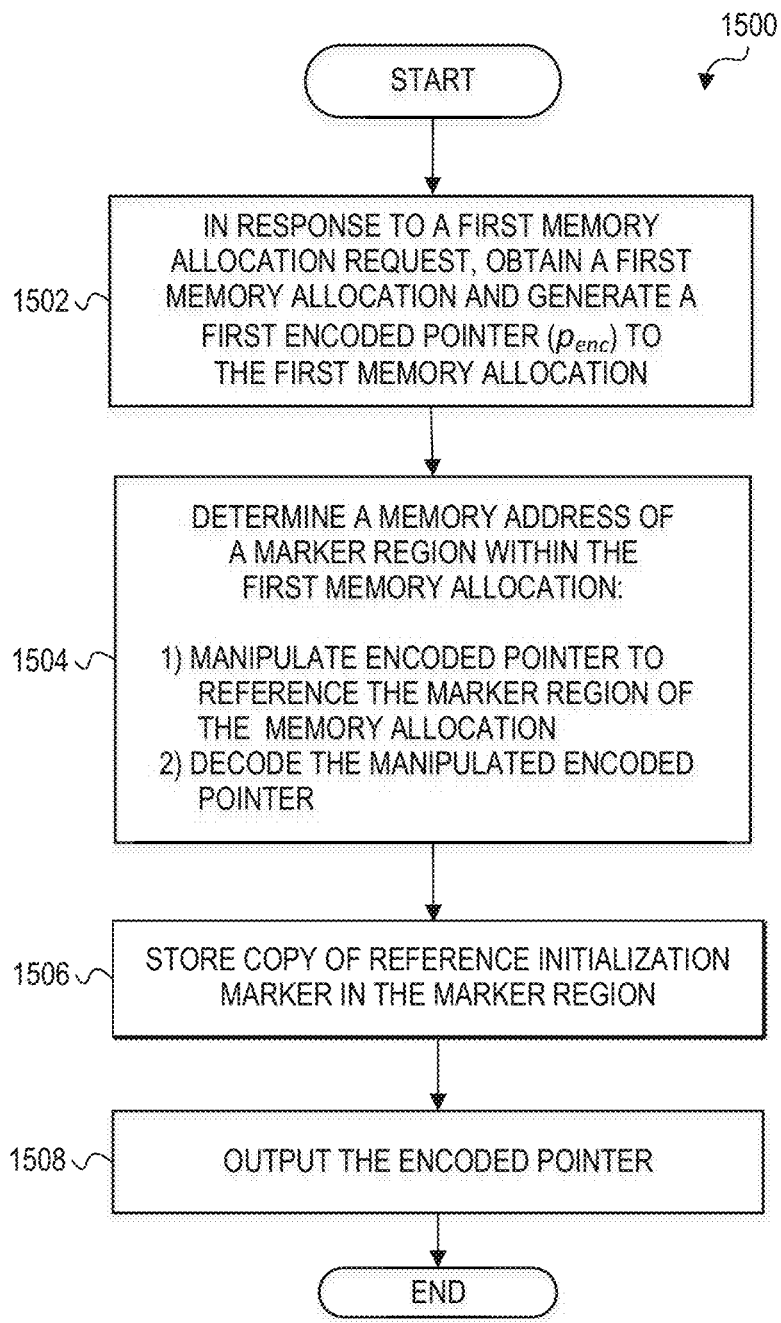
FIG. 15 is a flow diagram of another example process related to initialization marker checks in a cryptographic computing system according to an embodiment.

FIG. 15 is a flow diagram of an example process 1500 for the portion of an initialization marker check in a cryptographic computing system that is performed in response to a memory allocation request according to an embodiment. Process 1500 may be associated with one or more operations. A computing system (e.g., computing device 100) may comprise means such as one or more processors (e.g., 102, 630), for performing the operations. In one example, at least some of the operations shown in process 1500 may be performed by address encoding logic 152, address decoding logic 154, and initialization marker write logic 180. At least some of the operations of process 1500 may be performed in a response to a request for dynamic memory allocation. Such a request could be initiated by an application for a certain size of memory via a software instruction or function such as 'malloc', 'calloc', or 'realloc' in C programming language, or any other dynamic memory allocation instruction in C or another programming language.

It should be noted that an initialization marker, IM, may be selected and stored as a reference initialization marker a priori to process 1500 as previously described herein with reference to FIG. 11 at 1102, among other examples.

At 1502, in response to a request by an application to dynamically allocate memory (e.g., heap), a memory allocation operation is performed for the executing application. The memory allocation operation includes obtaining a memory allocation for a memory range that has certain size S (e.g., in bytes) and generating an encoded pointer ($p_{enc}$) to the memory allocation. The encoded pointer may be generated and configured in a similar manner as other encoded pointers described herein (e.g., encoded pointer 410, encoded indirect address 206). For example, the encoded pointer may include memory address data, size metadata (e.g., power), and at least a portion of the memory address data may be encrypted. The memory address data corresponds to a slot defined in memory to which the memory allocation is assigned, and the power size metadata determines the number of address bits that are immutable and mutable, where the number of mutable address bits corresponds to the power of two size of the slot. For example, a resulting 64-bit encoded pointer $p_{enc}$ is in a slot of size $2^n$, where address data and the power size metadata may be used as part of a tweak to bind encryption of the contents of the memory allocation to the encoded pointer of the memory allocation.

At 1504, a memory address of a marker region within the memory allocation is determined. The location of the marker region is defined by the midpoint of the slot to which the memory allocation is assigned. To determine the memory address of the marker region, first, the encoded pointer ($p_{enc}$) is manipulated by using pointer arithmetic in the mutable bits of the pointer to reference the marker region of the memory allocation. One example of an approach to manipulate the encoded pointer is described with reference to 1402 of FIG. 14.

Once the encoded pointer has been successfully manipulated to reference the marker region, the encoded pointer may then be decoded to obtain the linear address of the marker region. For example, the encrypted portion of the encoded pointer can be decrypted using as input, an address key and an address tweak derived, at least in part, from the manipulated encoded pointer.

At 1506, a copy of the reference initialization marker, which was previously selected or generated and stored in a secure location (e.g., 1102), can be stored in the marker region in the new memory allocation using the linear address (calculated above).

At 1508, the encoded pointer for the new memory allocation can be outputted to the application.

Turning to FIGS. 16-19, embodiments of cryptographic computing achieve frame granular isolation in stack memory. In these cryptographic computing embodiments, each stack frame is encrypted differently than the other stack frames. In one possible scenario, however, if a new allocated stack frame has the same boundary (e.g., starting at the same point in memory) as a previous stack frame, then the data stored in the previous stack frame may be accessible by the pointer to the new allocated stack frame. In one or more embodiments, security markers can resolve this issue and can be used to prevent data leakage from the previous stack frame.

Figure 16:
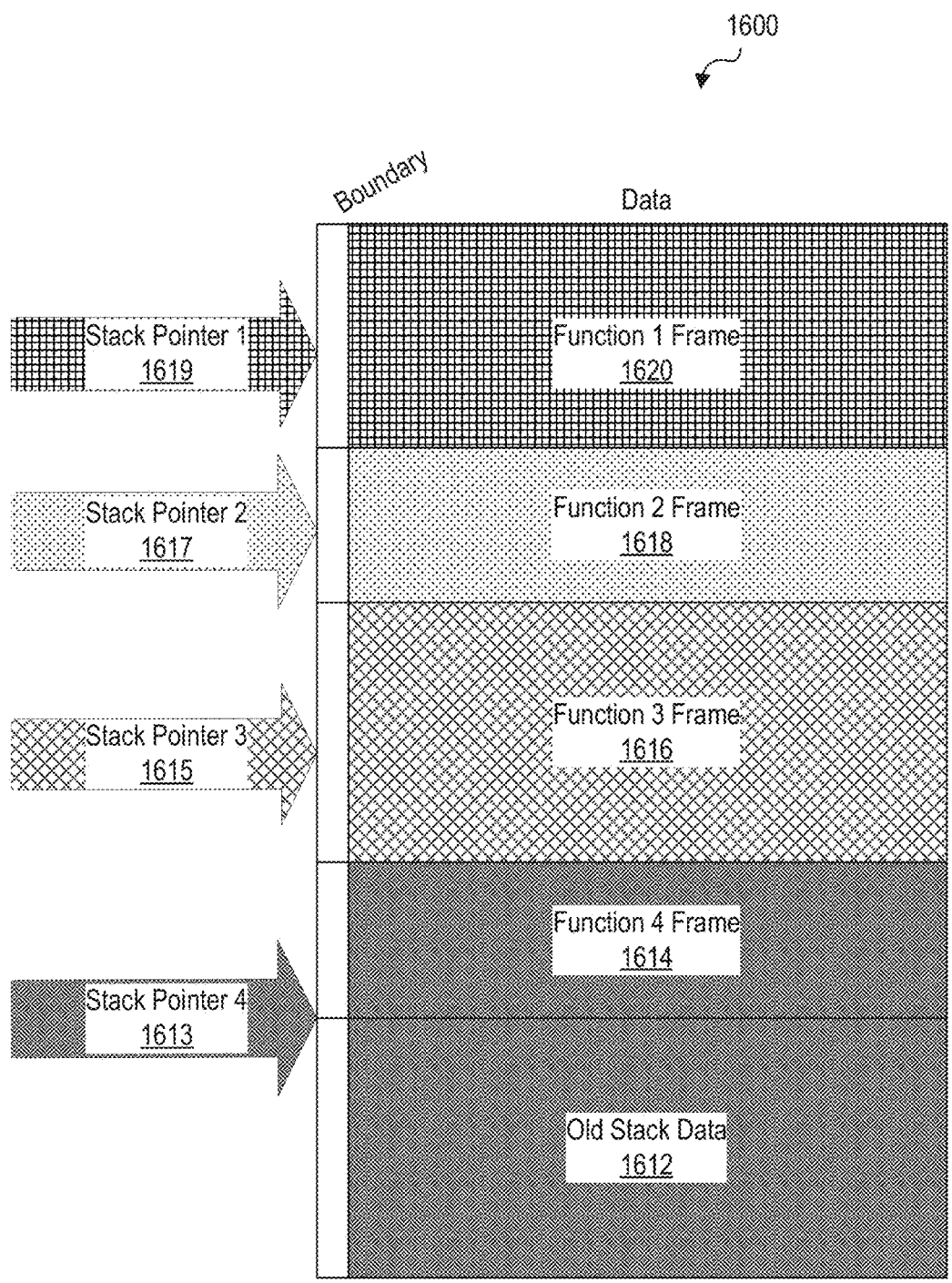
FIG. 16 illustrates example frames on a stack and corresponding encoded stack pointers according to an embodiment.

FIG. 16 illustrates example frames (1614, 1616, 1618, 1620) on a stack 1600 and corresponding encoded stack pointers (1613, 1615, 1617, 1619) in accordance with embodiments of the present disclosure. In the example shown, Function 1 calls Function 2, which calls Function 3, which calls Function 4, and each Function stores its own data on the stack 1600 in respective frames. Each frame has a unique corresponding stack pointer, and the stack pointer is bounded to its corresponding frame. For instance, in the example shown, the stack pointer 1619 corresponds to frame 1620 for Function 1, the stack pointer 1617 corresponds to frame 1618 for Function 2, the stack pointer 1615 corresponds to frame 1616 for Function 1 and the stack pointer 1613 corresponds to frame 1614 for Function 4. There also exists old stack data 1612 from a previous function call.

The stack pointers may be encoded as described herein and may contain boundary information for the frame. In some instances, the encoded stack pointer may be used as an initialization vector (IV) for encryption of the frame data; that is, data in each frame may be uniquely encrypted based on its corresponding encoded stack pointer such that it is only accessible using the frame's corresponding stack pointer. In the example shown in FIG. 16, for instance, the Function 1 may access frame data in frame 1620 using the encoded stack pointer 1619; however, other functions may not access the data in frame 1620 as the pointers 1613, 1615, 1617 will decode in such a way that does not allow access to the data in frame 1620. In the example shown, Function 4 may overwrite the old stack data 1612 as needed, but may not access the old stack data 1612 as the corresponding pointer(s) to the old stack data 1612 is no longer available (e.g., has been destroyed).

In some scenarios, however, if a stack frame is allocated on the same boundary as a previous stack frame (e.g., if Function 4 frame 1614 was allocated with the same boundary of previous stack frame containing old stack data 1612. In this scenario, then the stack pointer 1613 may be able to successfully decrypt old stack data 1612. Accordingly, security markers can be used to prevent this possibility.

Figure 17A:
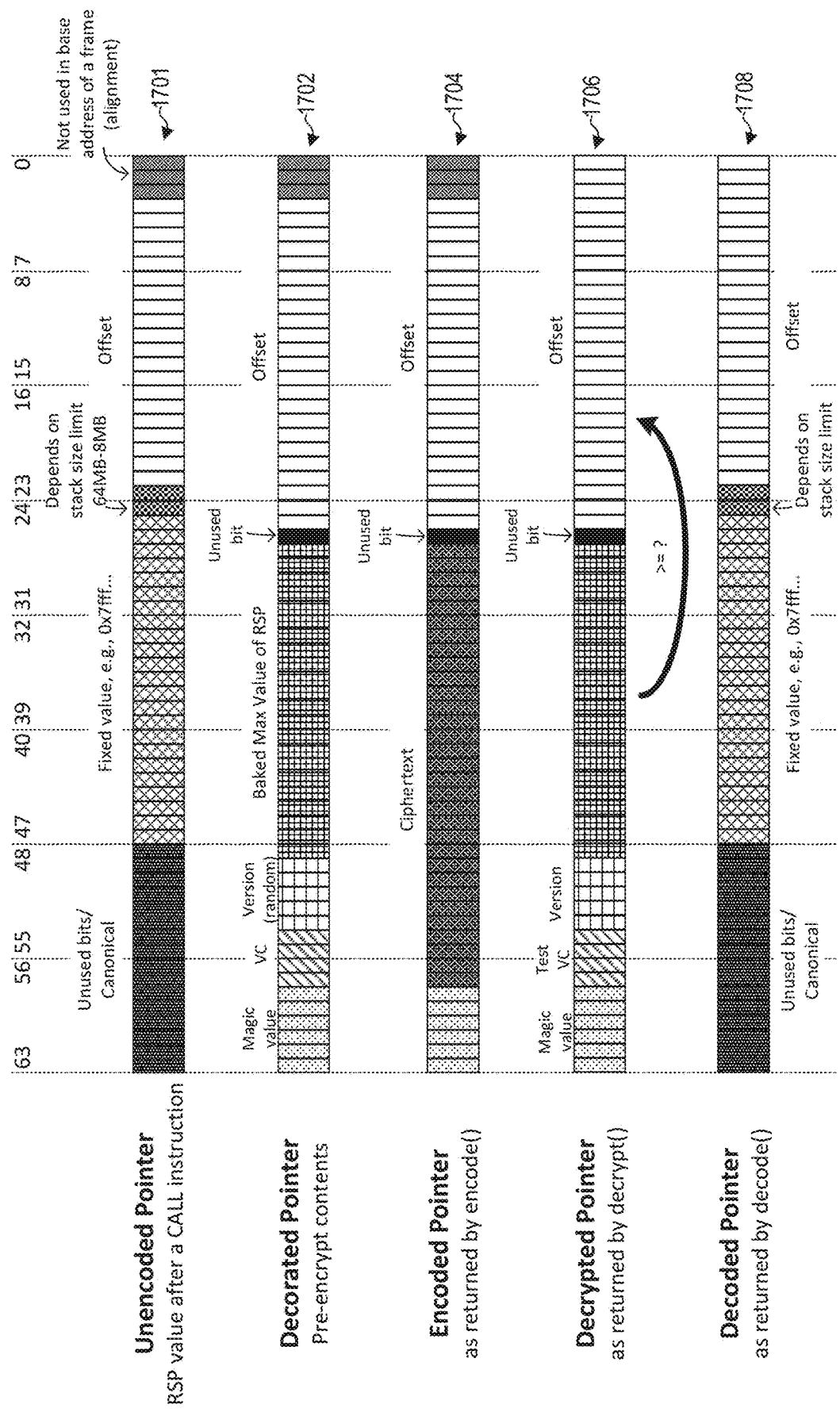
FIGS. 17A-17B illustrate example stack pointer formats that may be used in certain embodiments.

FIG. 17A illustrates example stack pointer formats that may be used in certain embodiments of the present disclosure. In accordance with embodiments of the present disclosure, an encoded or decorated stack pointer (e.g., 1702) may be constructed from an unencoded stack pointer (e.g., 1701). As shown, the canonical/non-canonical reserved range of the pointer, e.g., bits 48-63, can be used in the decorated pointer, as this pointer may only be handled in architectural registers and these changes do not include widening the memory bus.

Accordingly, in certain embodiments (e.g., as shown), the topmost bits of the decorated pointer 1702 may include a magic value (e.g., in 6 bits as shown) that can be used to indicate this pointer is an encoded stack pointer (i.e., identifying the encoded pointer as being distinct from other types of encoded pointers) and may encode other information. In addition to the magic value, depending on the encoding scheme, a fixed or computed Validation Code (VC) may also be encoded in the decorated pointer 1702 (e.g., in the next 4 bits as shown). The VC may be used to detect malicious corruption of the pointer, for example. The VC may also provide resistance from replay in some instances. Further, version information may be incorporated in the decorated pointer as well (e.g., in next 5 bits as shown), for example, to mitigate call trees being extremely repetitive. Because the same base addresses of stack frames will be reused many times in a program, additional entropy may be added by the version information to ensure that the reused stack is encrypted differently than the previous encryption scheme with an older version.

Additionally, a baked maximum offset/max RSP value may be encoded in the decorated pointer 1702 (e.g., in 22 bits as shown). This value may include the address of the top of the frame recorded after the CALL instruction has finished executing. Including this baked value in the encoding of the pointer may prohibit the pointer from accessing a higher address than the top of current frame, preventing stack pointers created in this frame from accessing data in prior frames. As the program executes, this value may be reduced such that the current frame can only access its own space and below; that is, passed pointers from prior frames can only open their frames and below. The base address of the frame may also be used as a source of variance for stack data encryption in some instances.

An encoded pointer can then be generated from the decorated pointer. In some embodiments, for example, the encoded pointer (e.g., 1704) contains the same contents of the decorated pointer (e.g., 1702), but with certain bits of the decorated pointer (e.g., the VC, version information, and baked maximum value of 1702) being encrypted to prevent user software from tampering with the pointer's encoded data. The encryption may be performed using a block cipher, in some embodiments. Generally, a block cipher may refer to an encryption algorithm that uses a symmetric key to encrypt a block of data in a way that provides confidentiality with properties such as bit diffusion and confusion that are important for preventing an adversary from predictably manipulating the decrypted address slice. At least some block cipher embodiments include an initialization vector (IV), which may include a fixed-size input that is random, pseudorandom, or nonrepeating, depending on the particular block cipher requirements. The encryption thus diffuses encrypted information across all bits in the ciphertext portion of the encoded pointer. The encryption can be performed as described above with respect the FIG. 2A, in some embodiments. In some embodiments, the block size may be too small to fit the entirety of the pointer elements that need to be made immutable. The pointer elements or portions thereof that do not fit may be kept as plaintext in the encoded pointer and passed as a tweak to the block cipher.

The encoded pointer may then be loaded into the stack pointer register (RSP). Software may subtract from the offset region of the pointer and perform conventional pointer arithmetic to access data stored on the stack frame.

In some embodiments, the pointer's format can be adjusted so that version information is encoded in the upper bits of the plaintext portion of the pointer. These bits may be incorporated as additional IV bits in the data encryption, or as tweak bits if tweakable encryption is used. In some embodiments, a pointer authentication code (PAC) could be included in the space originally allocated to the version information in the encrypted/ciphertext region of the pointer as shown in FIG. 17A. However, in other embodiments, a PAC may occupy a different set of bits. A pointer authentication code may include a message authentication code (MAC) embedded in a region of the pointer. The pointer authentication code may be computed over the address portion of the pointer and may also incorporate context information.

Figure 17B:
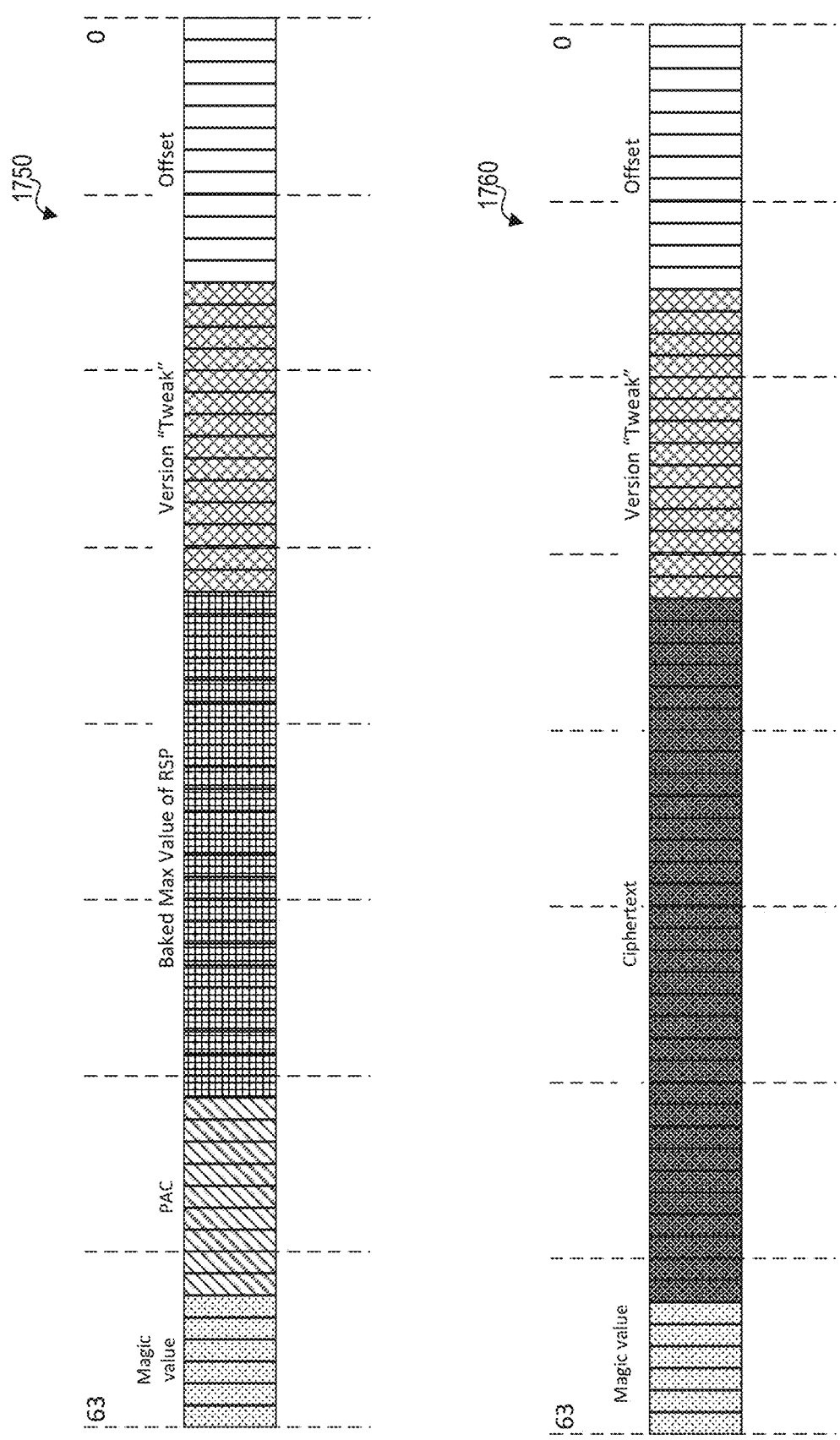

FIG. 17B illustrates another example encoding of a pointer in accordance with embodiments of the present disclosure. In particular, the example pointer 1750 of FIG. 17B includes both the PAC and the version information as described above, but with each having more bits allocated to them, potentially increasing their efficacy. Further in the example shown, the PAC occupies the upper region of the ciphertext portion of the encrypted pointer 1760 while the version information occupies the upper bits of the plaintext portion of the encrypted pointer 1760.

In some scenarios, certain of the lower bits of the pointer may be duplicated in the upper bits. Accordingly, in some embodiments, the baked maximum offset portion may be used to store bits that do not change in the offset portion of the pointer.

Figure 18A:
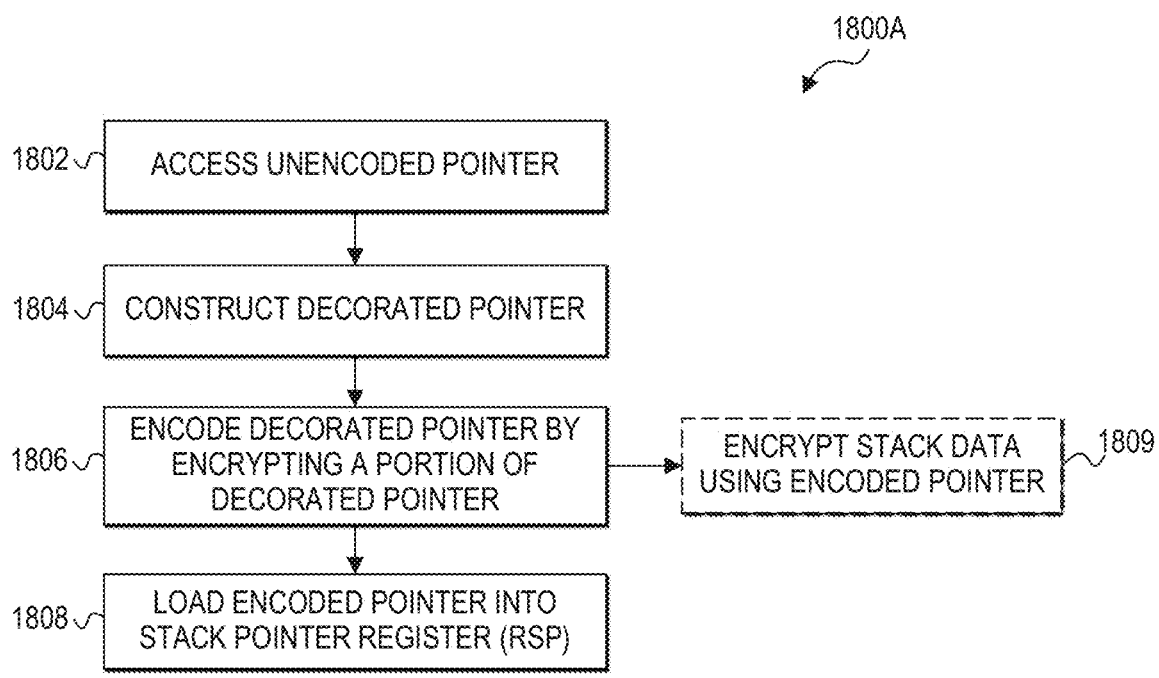
FIGS. 18A-18B illustrate flow diagrams of example processes for using stack pointers (e.g., those in FIGS. 17A-17B) according to an embodiment.
Figure 18B:
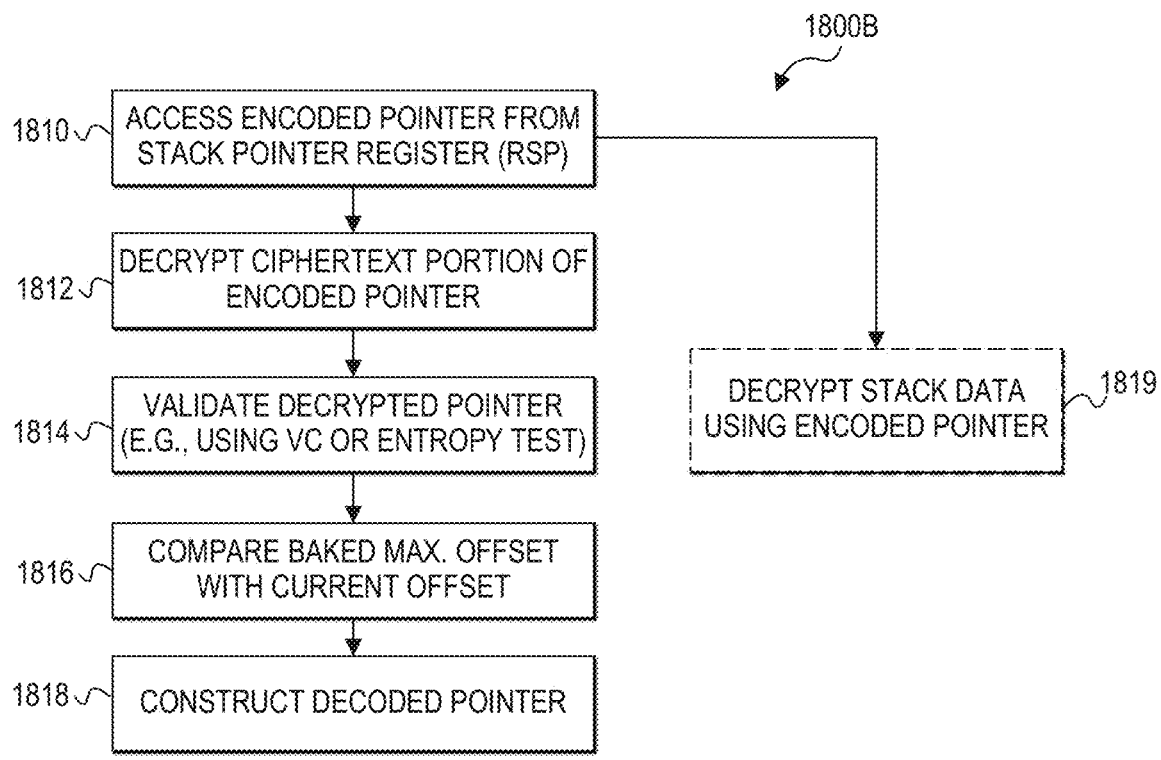

FIGS. 18A-18B illustrate example processes 1800A, 1800B for using stack pointers (e.g., those in FIGS. 17A-17B) in accordance with embodiments of the present disclosure. One or more aspects or operations of the example processes may be implemented by processor circuitry, such as execution circuitry (e.g., in processor 102, cores 632, etc.). The example processes may include additional or different operations, and the operations may be performed in the order shown or in another order. In some cases, one or more of the operations shown in FIGS. 18A-18B are implemented as processes that include multiple operations, subprocesses, or other types of routines. In some cases, operations can be combined, performed in another order, performed in parallel, iterated, or otherwise repeated or performed another manner.

When data is to be stored in a stack frame, e.g., based on a CALL instruction, a stack pointer may be generated and encoded according to the example process 1800A. At 1802, an unencoded pointer (e.g., the unencoded pointer 1701 of FIG. 17A) is accessed or otherwise obtained after generation. At 1804, a decorated pointer (e.g., the decorated pointer 1702 of FIG. 17A) is constructed. The contents of the decorated pointer may be as described above with respect to FIGS. 17A-17B, in some embodiments. For example, the decorated pointer may include a magic value, VC, PAC, version information, and/or baked maximum value of the RSP as described above. At 1806, the decorated pointer is encoded by encrypting at least a portion of the decorated pointer, resulting in an encoded pointer (e.g., the encoded pointer 1704 of FIG. 17A). The encryption may be performed using a block cipher, such as an AES-based block cipher, in some embodiments. At 1808, the encoded pointer is loaded into the stack pointer register (RSP).

In some embodiments, data may be encrypted using all or part of an encoded pointer at 1809. The encryption can be performed in a similar manner as described above with respect the FIG. 2A, in some embodiments. For example, a portion of the encoded pointer may be used as a tweak or initialization vector (IV) for encryption of the data to be stored in the corresponding frame of the stack. The portion may include the upper portion of the pointer, including the ciphertext portion. The data encryption may ensure confidentiality and pseudo-integrity in the cases where boundary checking cannot be used to verify the validity of a reference. Confidentiality may be provided by the data encryption, whereas integrity may be provided because invalid writes will write data with the incorrect IV, thereby uncontrollably corrupting data. Lacking control will reduce an adversary's ability of obtaining desirable results and increase the chance of crashing a program. The encoding of the pointer, using the address and version as a tweak, may ensure unique confidentiality properties for each stack frame.

Later, the encoded stack pointer may be used to access stack data, and the example process 1800B may be used to decode the encoded stack pointer. At 1810, the encoded pointer (e.g., the encoded pointer 1704 of FIG. 17A) is accessed from a stack pointer register. At 1812, the ciphertext portion of the encoded pointer is decrypted to yield a decoded pointer (e.g., the decrypted pointer 1706 of FIG. 17A). The decryption process can be performed in a similar manner as described above with respect to FIG. 2B, in some embodiments.

At 1814, the decrypted pointer is validated. For example, VC or PAC information in the decrypted pointer may be validated. For instance, in some implementations, the Validation Code (VC) or PAC of the decrypted pointer may be tested to ensure mutation has not occurred. This is because an attacker flipping bits of the ciphertext of the encoded pointer without knowledge of the key will cause decryption of the pointer ciphertext to be uncontrollably garbled. That is, if the encrypted portion of the pointer is mutated in any way (e.g., by an adversary), the decrypted data should be uncontrollably random and thus, the validation step will fail. In some cases, the VC may be set to all zeroes, and if any decoded VC value includes a one then it may be determined that the pointer was altered and should be deemed invalid. In some cases, the VC or PAC may include a MAC. In such cases, a hash or sum of the other fields in the encrypted slice of the pointer may be generated (e.g., the version and Max RSP fields). The same calculation is performed when decorating and decrypted the pointer. If the MAC does not match when decrypting the pointer, then this pointer must have been altered and should be deemed invalid.

In some embodiments, an entropy test may also be used to determine if some bits with expected low entropy have been garbled. While the above approaches for validation involve bits taken from the pointer to authenticate the pointer, there is a way to leave those bits available for other use and still detect corruption. For instance, the pointer can be examined to determine if the encrypted fields (after decryption) seem like they are garbled. Again, if an attacker tried to modify the ciphertext, all of the fields would be uncontrollably random when decrypted. Algorithms that measure randomness, or "entropy" can be used to determine if the decrypted ciphertext has too high of an entropy. If so, then it could be an indication the pointer was altered and may be determined to be invalid.

At 1816, the baked maximum offset in the decrypted pointer may be compared to the offset of the decrypted pointer. If the current offset is higher than the maximum, an exception may be generated for invalid access, implying the stack pointer is trying to access beyond the upper bounds of the current stack frame.

In some embodiments, the amount of data being accessed by the current instruction may be added to the current offset in the decrypted pointer prior to comparing it to the baked maximum offset. Some embodiments may allow read-only access to the return address of a frame referenced by a pointer to that frame for software compatibility purposes. Some embodiments may detect read accesses to return address storage locations and actually load the unencoded return addresses even if those storage locations contain encoded forms of the return addresses or non-address metadata. Some embodiments may use a particular type of memory load instruction or a prefix applied to an existing type of memory load instruction to indicate that the unencoded return address should be loaded from the return address storage location, and ordinary memory load instructions could read the encoded return address from that location. For example, an exception handler routine may use an unencoded return address to look up information in a table indexed by code locations, whereas a setjmp routine may load an encoded return address to be stored in a buffer for later use by a longjmp routine. Some embodiments may generate a fault if a decorated pointer 1702 is dereferenced that has a baked maximum offset lower than the baked maximum offset in the current RSP value, since that may indicate use of a stale pointer referencing a stack frame that is no longer valid.

If no faults are generated by 1814 or 1816, then a decoded pointer (e.g., the decoded pointer 1708 of FIG. 17A) is constructed at 1818. This may include restoring a fixed value portion of the pointer. For example, the fixed value portion of the stack pointer may be restored from the shared register. The decoded pointer may then be passed to the memory pipeline as the address for handling the memory access event, e.g., for accessing stack data. On a RET instruction, the caller's value of the stack pointer may be popped from the stack.

In some embodiments, the stack frame data may be encrypted using the encoded stack pointer as described above. In such embodiments, the stack frame data may be decrypted at 1819 using the encoded stack pointer. For example, the portion of the encoded pointer used in encrypting the data may be used as an IV for decrypting the data as well. The decryption process can be performed in a similar manner as described above with respect the FIG. 2B, in some embodiments.

Some embodiments may check for a pointer in the format of an encoded pointer (e.g., similar to 1704) being passed as the destination of an indirect jump instruction, e.g., as may occur in a longjmp software routine, and adjust its operation to match the effects of pushing the provided encoded pointer onto the stack and executing a return instruction. In alternative embodiments, software routines that may pass an encoded pointer 1704 to indirect jump instructions may be modified to instead push the encoded pointer 1704 onto the stack and execute a return instruction.

Return Pointer Encoded Unwind Information

The above suggests pushing the caller's value of the stack pointer onto the stack during the CALL instruction and popping on the RET instruction. This can consume space on the stack that legacy compilers are not expecting, potentially introducing compatibility issues. Accordingly, in some embodiments, the size of the caller's frame (e.g., absolute or relative to the bottom of the stack) can be encoded in the upper bits of the return address (RA) pointer. This does not consume additional stack resources and hence, does not alter the layout of the stack.

In some embodiments, the distance to a previous stack frame base recorded in the return vector on a CALL as the distance to the previous (caller's) frame's base (2^16 bytes) may be a smaller number than the base encoding itself, whose size is dependent on the entire stack size. Only the caller's frame distance may need to be stored because the next frame will have a different base and the data encryption provides confidentiality as the next frame will be encrypted differently, given its data will be encrypted with a different encoded base frame in the RSP (confidentiality preserved). Data integrity will also provide detection of tampering in this case too.

Some embodiments that maintain a CET shadow stack pointer, e.g. in a register, regardless of whether they also actually maintain a shadow stack, may unwind a corresponding number of stack frames in a step-by-step fashion with the number specified as an operand in an INCSSP instruction that increments the shadow stack pointer. For example, this may be beneficial for software compatibility with setjmp/longjmp and exception handling features in various programming languages.

Inline Frame Metadata

The above suggests pushing the caller's value of the stack pointer onto the stack during the CALL instruction and popping on the RET instruction. If this is allowed, then more data about each frame may be pushed onto the stack. This data can be retrieved by using the baked maximum offset stored in any stack pointer originating in each frame, plus fixed offsets for each metadata stored.

If the processor needs to save additional parameters (e.g., metadata) to the stack unbeknownst to the compiler, it is possible to hide those parameters in order to preserve the application binary interface (ABI) of passing arguments on the stack. There, the callee will access the caller's stack frame at specific relative offsets from the caller's base frame. The process will allow this to access the stack arguments for just the adjacent frame boundary. The relative offsets can be maintained by the processor by automatically subtracting the metadata region when moving into the adjacent frame. In this case, the memory load and store operations will again be aligned to those assumed by the compiler without the addition of extra metadata on the stack.

Figure 19:
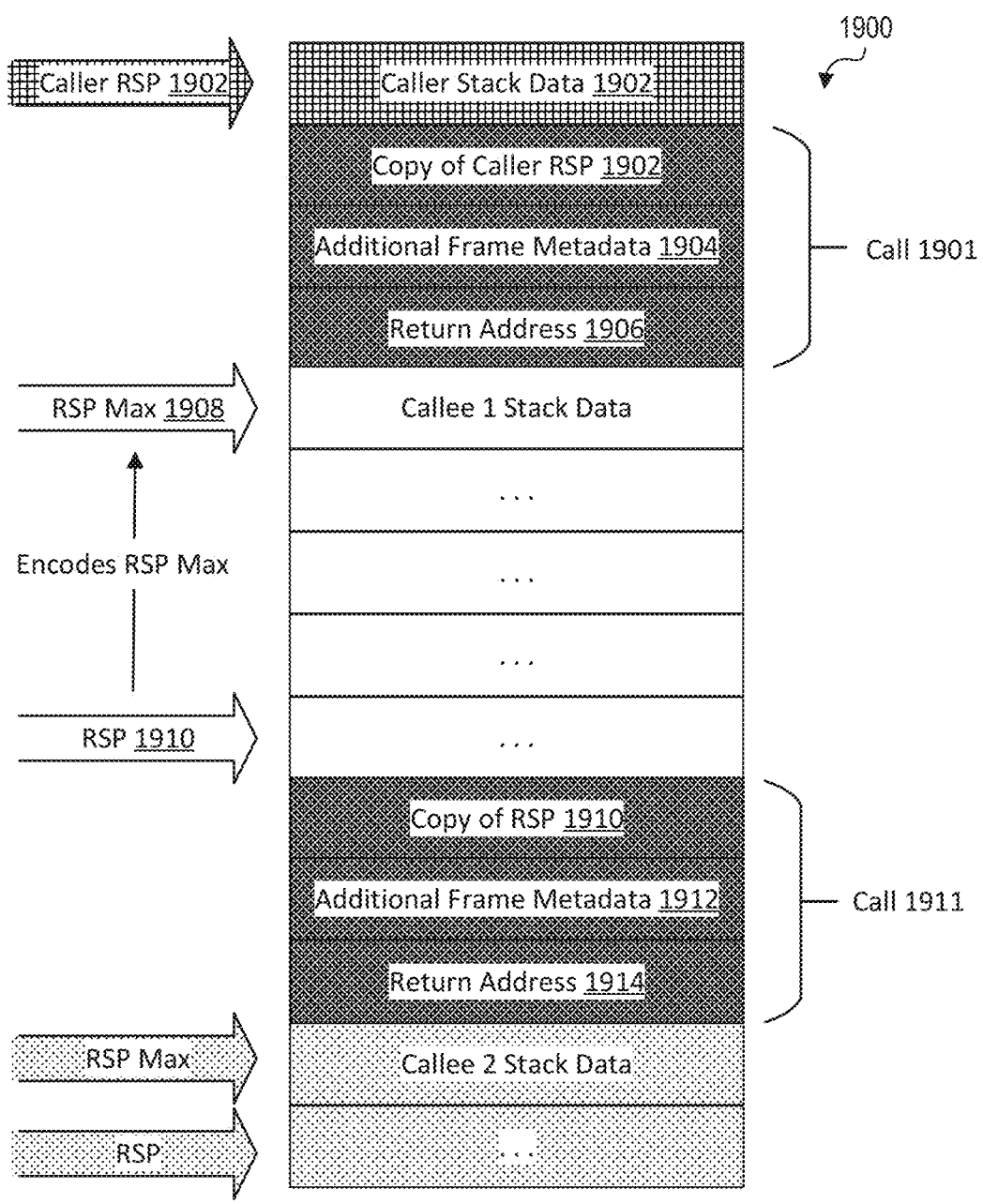
FIG. 19 illustrates an example stack with inline frame metadata according to an embodiment.

FIG. 19 illustrates an example stack 1900 with inline frame metadata in accordance with embodiments of the present disclosure. In the example shown, each frame includes a set of data that is uniquely encrypted based on encoded stack pointers (as indicated by the respective shadings). For instance, the caller stack data is encrypted based on the encoded caller RSP 1902. The encoded stack pointers (e.g., 1902, 1908, 1910) may be encoded as described above, in certain embodiments. For instance, in the example shown, the RSP 1910 encodes the value of RSP Max 1908 as its Baked Max RSP Value.

In some embodiments, call information in a stack can include frame metadata (e.g., a copy of the caller's RSP and/or other frame metadata) along with the return address. For instance, in the example shown, the call information 1901 includes a copy of the last caller RSP 1902 along with additional frame metadata 1904 and the return address 1906. The callee function associated with the call information 1901 (Callee 1) places data on the stack 1900. As shown, the first stack pointer of the callee data (RSP Max 1908) is encoded in subsequent stack pointers (e.g., RSP 1910) as described above (e.g., as the Baked Max Value of RSP).

Another function (Callee 2) is called with call information 1911, and a copy of the RSP value 1910 is stored in the call information 1911 along with additional frame metadata 1912 and the return address 1914. The Callee 2 then stores data on the stack 1900 similar to Callee 1, with subsequent stack pointers encoding the RSP max value.

Lower Bounds Information for Stack Data Passed by Reference

Inline frame metadata can be used, in some embodiments, to prevent underrunning pointers from higher frames. For example, in some instances, a copy of the final RSP of each frame (e.g., 708 for Callee 1's frame) can also be stored in the frame metadata region along with the caller's RSP (e.g., 702) and the return address (e.g., 706). When a stack pointer is passed from a higher frame, it may retain the encoded stack pointer of the originating frame. As the upper portion of this pointer does not match the current RSP, when dereferenced it can be concluded this pointer came from another frame and the frame metadata can be retrieved from the originating frame to determine a lower boundary for that pointer. Thereby, this passed reference can only be used to access memory in the originating given frame; access is bounded on upper and lower boundaries. Some embodiments may use a final RSP that excludes access to the return address of the callee whose activation caused the final RSP to be recorded.

Figure 20:
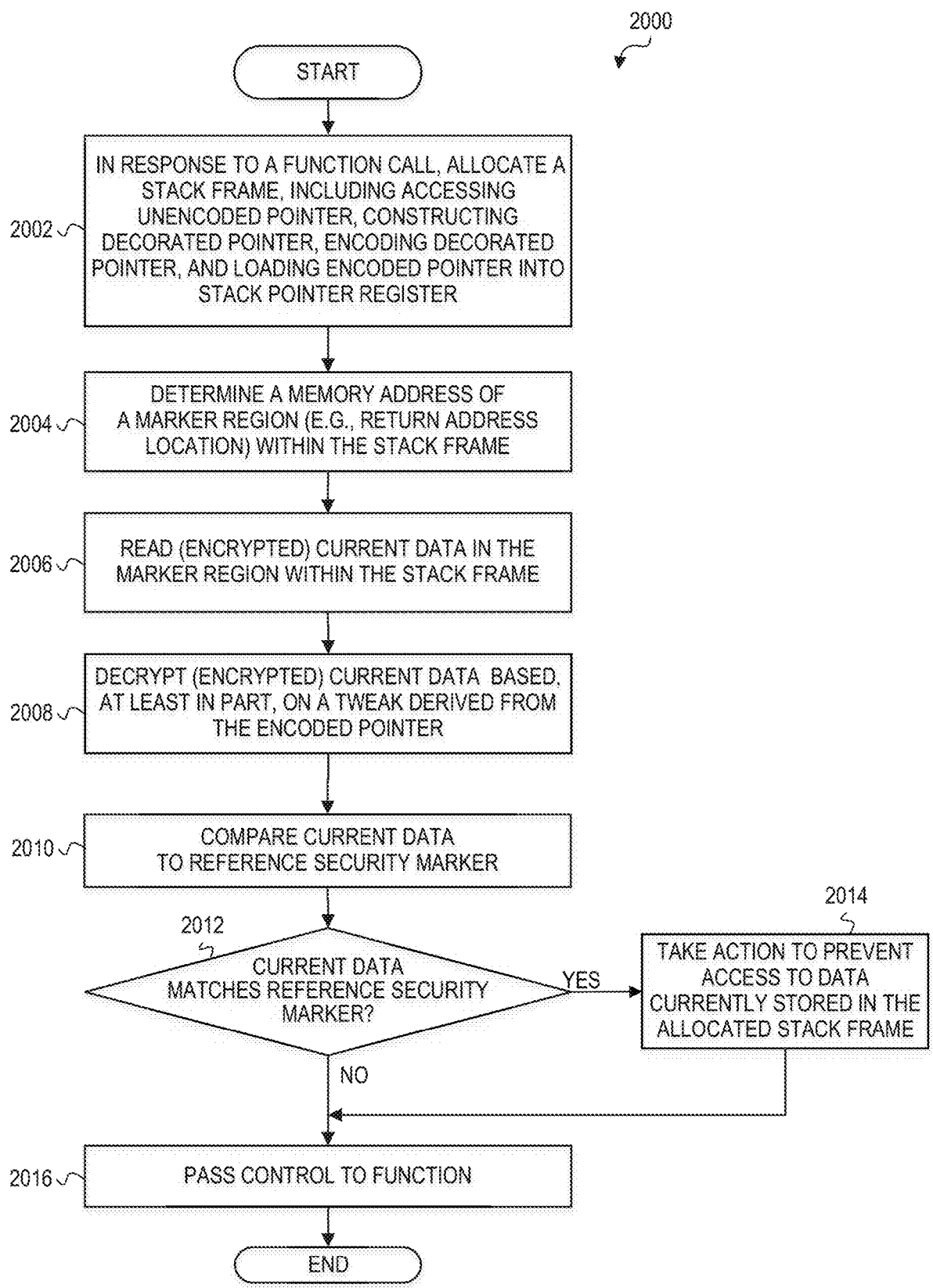
FIG. 20 is a flow diagram of an example process related to security marker checks in stack memory in a cryptographic computing system according to an embodiment.

FIG. 20 is a flow diagram of an example process 2000 for the portion of a security marker check in a cryptographic computing system that is performed in response to a function call according to an embodiment. Process 2000 may be associated with one or more operations. A computing system (e.g., computing device 100) may comprise means such as one or more processors (e.g., 102, 630), for performing the operations. In one example, at least some of the operations shown in process 2000 may be performed by address encoding logic 152, address decoding logic 154, and security marker verify logic 172. At least some of the operations of process 2000 may be performed in response to a function call.

It should be noted that a security marker, SM, may be selected and stored as a reference security marker a priori to process 2000 as previously described herein with reference to FIG. 11 at 1102, among other examples.

At 2002, in response to a function call by an application, the processor automatically allocates a stack frame in stack memory. The stack frame may be allocated to store local variables that are used by the function. In at least one embodiment, allocating the stack frame can include obtaining a memory allocation for the stack frame and generating an encoded pointer ($sp_{enc}$) to the stack frame. The encoded pointer may be generated and configured in a similar manner as other encoded stack pointers described herein (e.g., encoded pointer 1704, 1760, encoded indirect address 206). For example, the encoded pointer may include memory address data, size metadata (e.g., magic value), version metadata, and at least a portion of the memory address data may be encrypted. The memory address data corresponds to the stack frame memory allocation. At least a portion of the memory address data and the version metadata may be used as part of a tweak to bind encryption of the contents of the stack frame allocation to the encoded pointer of the stack frame allocation.

At 2004, a memory address of a marker region within the stack frame allocation is obtained. In one embodiment, the location of the marker region may be a return address location (e.g., 1906, 1914) where the return address to the calling program is stored in the stack frame. Accordingly, pointer arithmetic could be used to cause the encoded pointer to reference the return address location in the stack frame. In other embodiments, a different area of the stack frame may be used as a marker region such as the additional frame metadata location (e.g., 1904), for example.

Once the encoded pointer has been successfully manipulated to reference the marker region (e.g., return address location), the encoded pointer may then be decoded to obtain the linear address of the marker region. For example, the encrypted portion of the encoded pointer can be decrypted using as input, an address key and an address tweak derived, at least in part, from the manipulated encoded pointer.

At 2006, the linear address of the marker region can be used to read current data in the marker region, which may be a particular size, such as the size of the return address location, for example (e.g., 8 bytes). Depending on the implementation, however, the security marker may be implemented using other sizes. In some embodiments, during a deallocation process, a copy of the reference security marker may be encrypted and stored in the marker region before the control returns to the calling program. In other embodiments the copy of the security marker may be stored in the marker region without encryption.

At 2008, if the current data is encrypted, then the encrypted current data may be decrypted to generate the current data. The decryption may be based, at least in part, on a tweak derived from the encoded pointer. In at least one embodiment, the tweak may include the version metadata and at least a portion of the memory address data in the pointer.

At 2010, the current data (decrypted) from the marker region can be compared to the reference security marker, which was previously selected or generated and stored in a secure location (e.g., 1102).

At 2012, a determination is made as to whether the current data matches the reference security marker. If they match, then this indicates that a previous stack frame allocation was allocated at the same high address (bottom boundary) and may still have data stored in the previous stack frame allocation that could potentially be accessed by the encoded pointer, or that an old pointer to the previous stack frame allocation could potentially access new data that is to be stored in the new stack frame allocation.

In this scenario, at 2014, appropriate action may be taken to prevent access to contents (e.g., data) currently stored in the new memory allocation. In one embodiment, if the upper boundary (low memory) of the stack frame is known (e.g., with boundary markers described herein), then the previous stack frame could be cleared with zeros or some other value, for example. If the boundaries of the stack frame allocation are not known, however, then the encoded pointer could be modified to change the version number of the stack frame. Accordingly, this would result in variables in the new stack frame allocation being encrypted and decrypted based on a different tweak (e.g., with a different version number). Thus, the new encoded stack pointer would not be able to decrypt old data in the stack frame.

At 2012, if no match is found between the current data from the marker region and the reference security marker, or if a match is found and appropriate actions are taken at 2014, then at 2016, the return address to the calling program is stored in the return address location of the new stack frame allocation and control is passed to the function.

Figure 21:
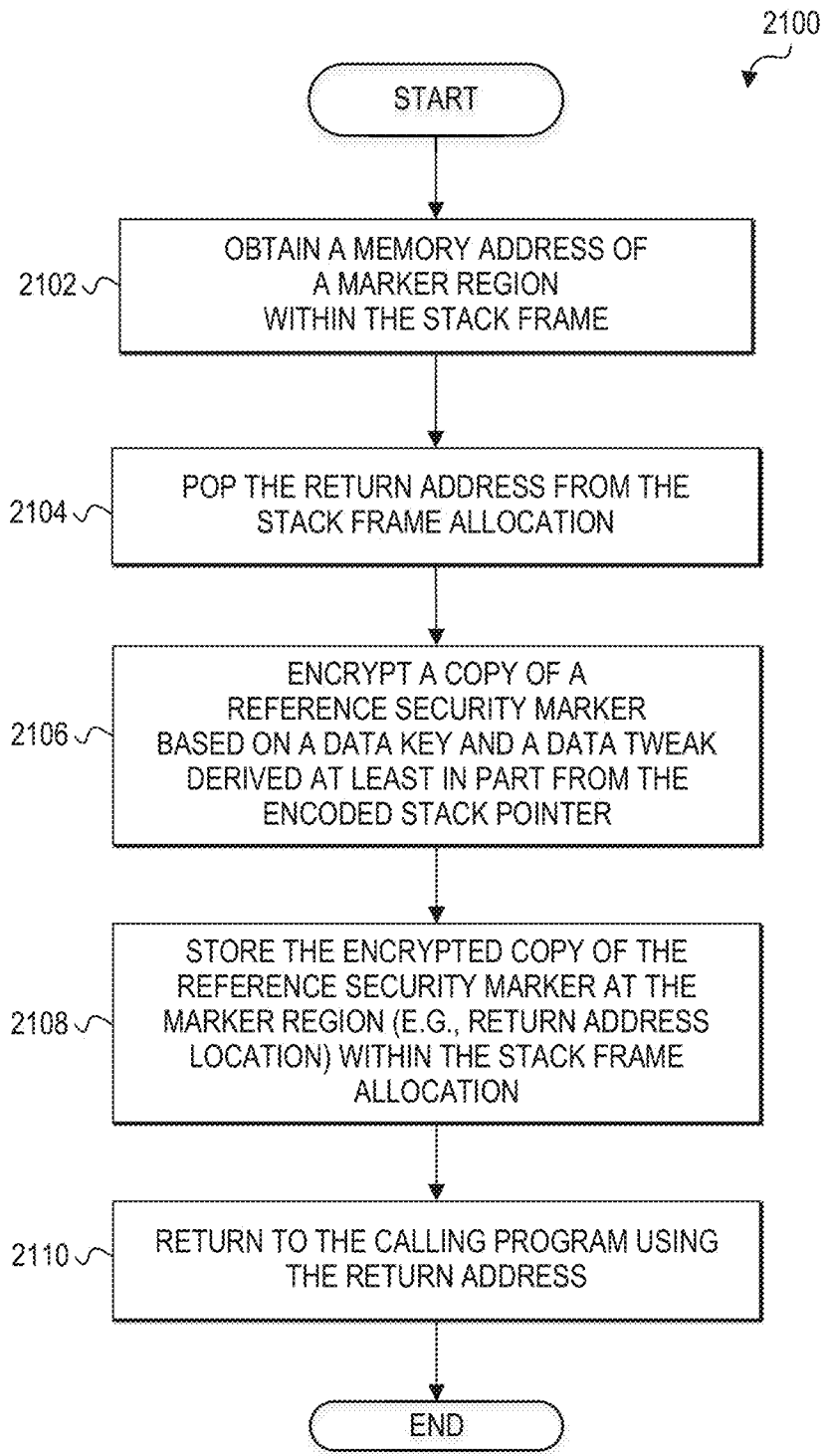
FIG. 21 is a flow diagram of another example process related to security marker checks in stack memory in a cryptographic computing system according to an embodiment.

FIG. 21 is a flow diagram of an example process 2100 for the portion of a security marker check in a cryptographic computing system that is performed in response to returning from or exiting a function in a program according to an embodiment. Process 2100 may be associated with one or more operations. A computing system (e.g., computing device 100) may comprise means such as one or more processors (e.g., 102, 630), for performing the operations. In one example, at least some of the operations shown in process 2100 may be performed by address decoding logic 154 and security marker write logic 170. At least some of the operations of process 2100 may be performed in a response to a request to return (or exit or leave) a function.

It should be noted that a security marker, SM, may be selected and stored as a reference security marker a priori (or during) process 2100 as previously described herein with reference to FIG. 11 at 1102, among other examples.

At 2102, in response to a request to return to a calling program or calling function from a called function, a memory address of a marker region within the stack frame allocation for the function is determined. The location of the marker region may be, for example, a return address location within the stack frame. To determine the memory address of the marker region, first, the encoded pointer ($sp_{enc}$) is manipulated by using pointer arithmetic to reference the marker region (e.g., return address location) of the memory allocation.

Once the encoded pointer has been successfully manipulated to reference the marker region, the encoded pointer may then be decoded to obtain the linear address of the marker region. For example, the encrypted portion of the encoded pointer can be decrypted using as input, an address key and an address tweak derived, at least in part, from the manipulated encoded pointer.

At 2104, the return address is popped (or read) from the stack frame allocation. This may be done based on the linear address.

At 2106, a copy of a reference security marker (which can be selected or generated as described with reference to 1102 of process 1100) can be encrypted based, at least in part, on a tweak derived from the encoded pointer. The tweak can include the version metadata and at least a portion of the memory address data in the encoded pointer.

At 2108, the memory address of the marker region is used to store the encrypted copy of the reference security marker in the marker region of the stack frame allocation. The marker region can be checked during a subsequent function call and associated stack frame allocation.

At 2110, the instruction pointer is returned to the calling program (or calling function) using the return address.

Figure 22:
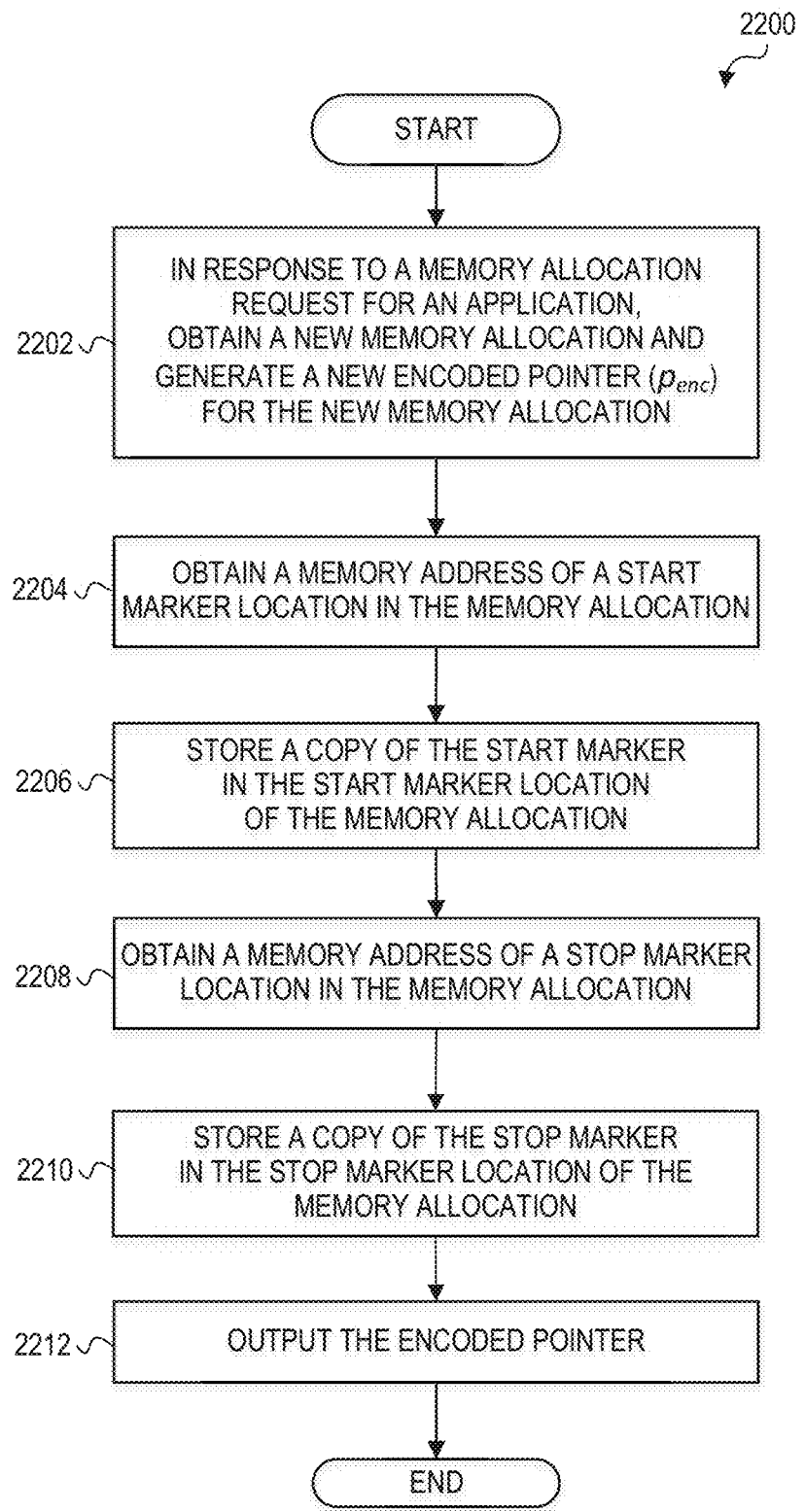
FIG. 22 is a flow diagram of an example process related to boundary marker checks in a cryptographic computing system according to an embodiment.

FIG. 22 is a flow diagram of an example process 2200 for the portion of a bounds marker check in a cryptographic computing system that is performed in response to a memory allocation request according to at least one embodiment. Process 2200 may be associated with one or more operations. A computing system (e.g., computing device 100) may comprise means such as one or more processors (e.g., 102, 630), for performing the operations. In one example, at least some of the operations shown in process 2200 may be performed by address encoding logic 152, address decoding logic 154, and start/stop marker write logic 190. At least some of the operations of process 2200 may be performed in a response to a request for dynamic memory allocation. Such a request could be initiated by an application for a certain size of memory via a software instruction or function such as 'malloc', 'calloc', or 'realloc' in C programming language, or any other dynamic memory allocation instruction in C or another programming language.

It should be noted that start and stop markers, StartM and StopM, may be selected and stored as reference start and stop markers a priori to process 2200 as previously described herein with reference to FIG. 11 at 1102, among other examples.

At 2202, in response to a request by an application to allocate memory, a memory allocation operation is performed for the executing application. The memory allocation operation includes obtaining a memory allocation for a memory range that has certain size S (e.g., in bytes) and generating an encoded pointer ($p_{enc}$) to the memory allocation. The encoded pointer may be generated and configured in a similar manner as other encoded pointers described herein (e.g., encoded pointer 410, 610, encoded indirect address 206). For example, the encoded pointer may include memory address data, size metadata (e.g., power), and at least a portion of the memory address data may be encrypted. The power size metadata determines the number of address bits that are immutable and mutable, where the mutable address bits are used for pointer arithmetic. At least a portion of the memory address data and the power size metadata may be used as part of a tweak to bind encryption of the contents of the memory allocation to the encoded pointer of the memory allocation.

At 2204, the first memory address in the memory range of the memory allocation is obtained. In this embodiment, the first memory address is a location for storing a start marker. In one example, the encoded pointer returned from the memory allocation operation points to the first memory address. The encoded pointer may be decoded to obtain the linear address of the start marker location in the memory allocation. For example, the encrypted portion of the encoded pointer can be decrypted using as input, an address key and an address tweak derived, at least in part, from the encoded pointer.

At 2206, the linear address of the start marker location is used to store a copy of the reference start marker. In some embodiments, the copy of the reference start marker is stored in the start marker location without being encrypted. In other embodiments, the copy of the reference start marker may be encrypted and bound to the encoded pointer like other data to be stored in the memory allocation.

At 2208, the last memory address in the memory range of the memory allocation is obtained. In this embodiment, the last memory address is a location for storing a stop marker. In one example, pointer arithmetic may be used to manipulate the encoded pointer to point to the last memory address. The encoded pointer may be decoded to obtain the linear address of the stop marker location in the memory allocation. For example, the encrypted portion of the encoded pointer can be decrypted using as input, an address key and an address tweak derived, at least in part, from the encoded pointer.

At 2210, the linear address of the stop marker location is used to store a copy of the reference stop marker. In some embodiments, the copy of the reference stop marker is stored in the stop marker location without being encrypted. In other embodiments, the copy of the reference stop marker may be encrypted and bound to the encoded pointer like other data to be stored in the memory allocation.

At 2212, the encoded pointer is outputted to the application.

Figure 23:
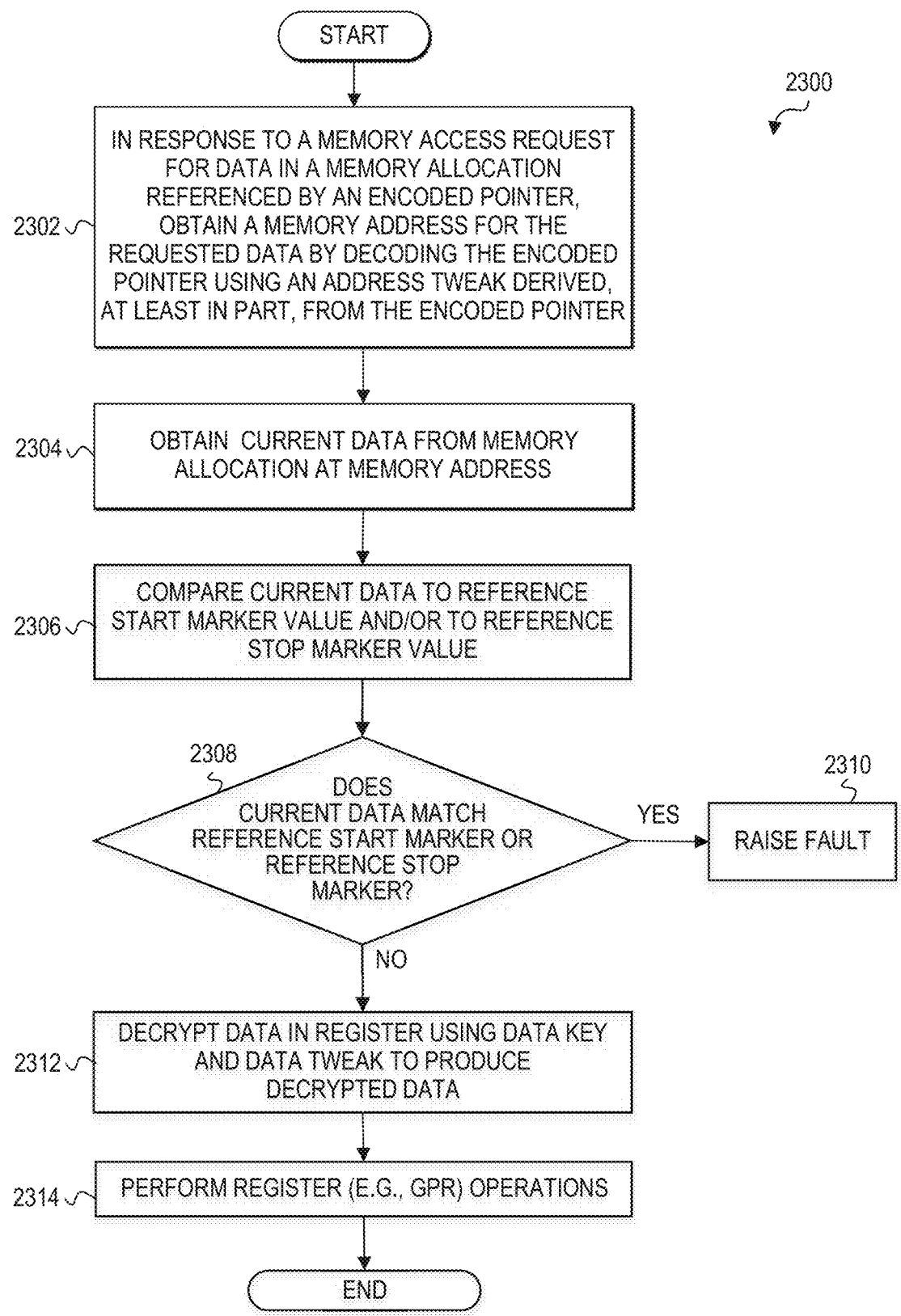
FIG. 23 is a flow diagram of another example process related to bounds marker checks in a cryptographic computing system according to an embodiment.

FIG. 23 is a flow diagram of an example process 2300 for the portion of a bounds marker check in a cryptographic computing system that is performed in response to memory access request (e.g., read, write, move, etc.) according to an embodiment. Process 2300 may be associated with one or more operations. A computing system (e.g., computing device 100) may comprise means such as one or more processors (e.g., 102, 630), for performing the operations. In one example, at least some of the operations shown in process 2300 may be performed by address encoding logic 152, address decoding logic 154, and start/stop marker verify logic 192. At least some of the operations of process 2300 may be performed in a response to a memory access request.

It should be noted that start and stop markers, StartM and StopM may be selected and stored as reference start and stop markers a priori to process 2300 as previously described herein with reference to FIG. 11 at 1102, among other examples.

At 2302, in response to a request by an application to access an object in a memory allocation (e.g., in heap) referenced by an encoded pointer, a memory address indicated by the encoded pointer provided by the memory access request is obtained by decoding the encoded pointer. In one example, the encoded pointer may be decoded as described in any one of the examples herein, depending on the type of memory that is being accessed (e.g., stack or heap). In one example, an address tweak that is derived, at least in part, from the encoded pointer may be used to decrypt the encrypted portion of the encoded pointer (e.g., a portion of the linear address), which is then combined with other portions of the linear address.

At 2304, current data is read at the memory address in the memory allocation and loaded into a register.

At 2306, the current data is compared to a reference start marker and/or a reference stop marker. At 2308, a determination is made as to whether the current data matches one of the reference start and stop markers. If a match is found, then at 2310, a fault is raised because the memory access request has attempted to access data beyond the bounds of the memory allocation.

If a match is not found between the current data and either one of the reference boundary markers, then at 2312, the current data can be decrypted as described in any one of the examples herein, depending on the type of memory (e.g., heap or stack) that is being accessed and the type of encoded pointer that is being used to access that memory. In one example, a data key and a data tweak that is derived, at least in part, from the encoded pointer may be used to decrypt the current data read from the memory allocation.

At 2314, register operations may be performed on the decrypted data that is loaded in a register.

Although the bounds marker check processes of FIGS. 21 and 22 were described primarily with reference to an implementation in heap memory, it should be apparent that the bounds markers could easily be adapted to stack. Accordingly, when a function is called, the stack frame could be sized to accommodate start and stop bounds markers, and copies of reference bound markers could be stored in the appropriate start and stop locations of a stack frame (e.g., beginning and end of a stack frame). Accesses to the stack frame could perform bounds checks to ensure that the start and stop locations containing the start and stop markers were not accessed. If the start and stop locations are accessed, then this could indicate a buffer overflow or underflow and an error could be raised.

Example Architectures

Figure 24:
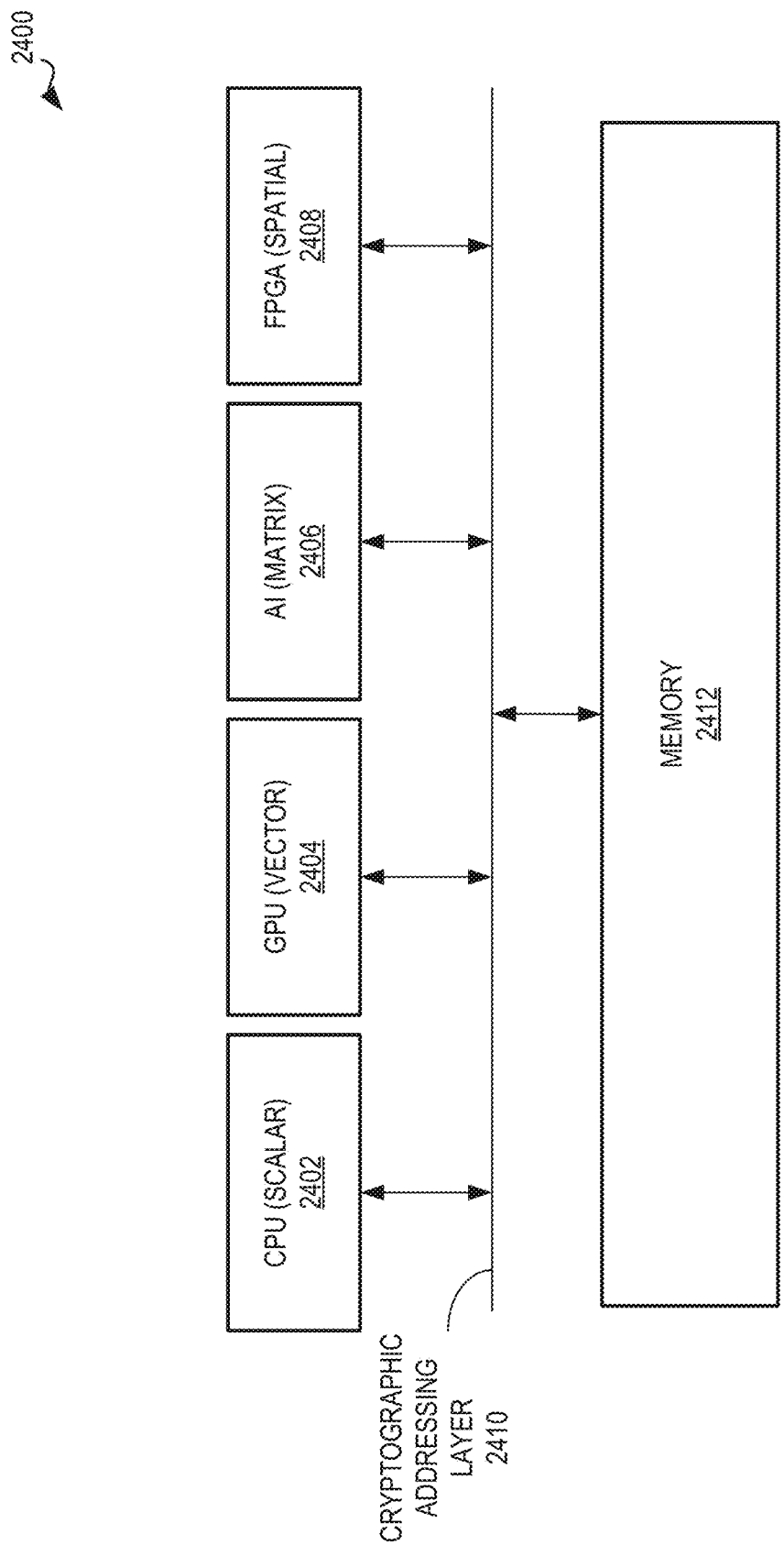
FIG. 24 is a block diagram illustrating an example cryptographic computing environment according to an embodiment.

FIG. 24 is a block diagram illustrating an example cryptographic computing environment 2400 according to at least one embodiment. In the example shown, a cryptographic addressing layer 2410 extends across the example compute vectors central processing unit (CPU) 2402, graphical processing unit (GPU) 2404, artificial intelligence (AI) 2406, and field programmable gate array (FPGA) 2408. For example, the CPU 2402 and GPU 2404 may share the same virtual address translation for data stored in memory 2412, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 2412 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 25:
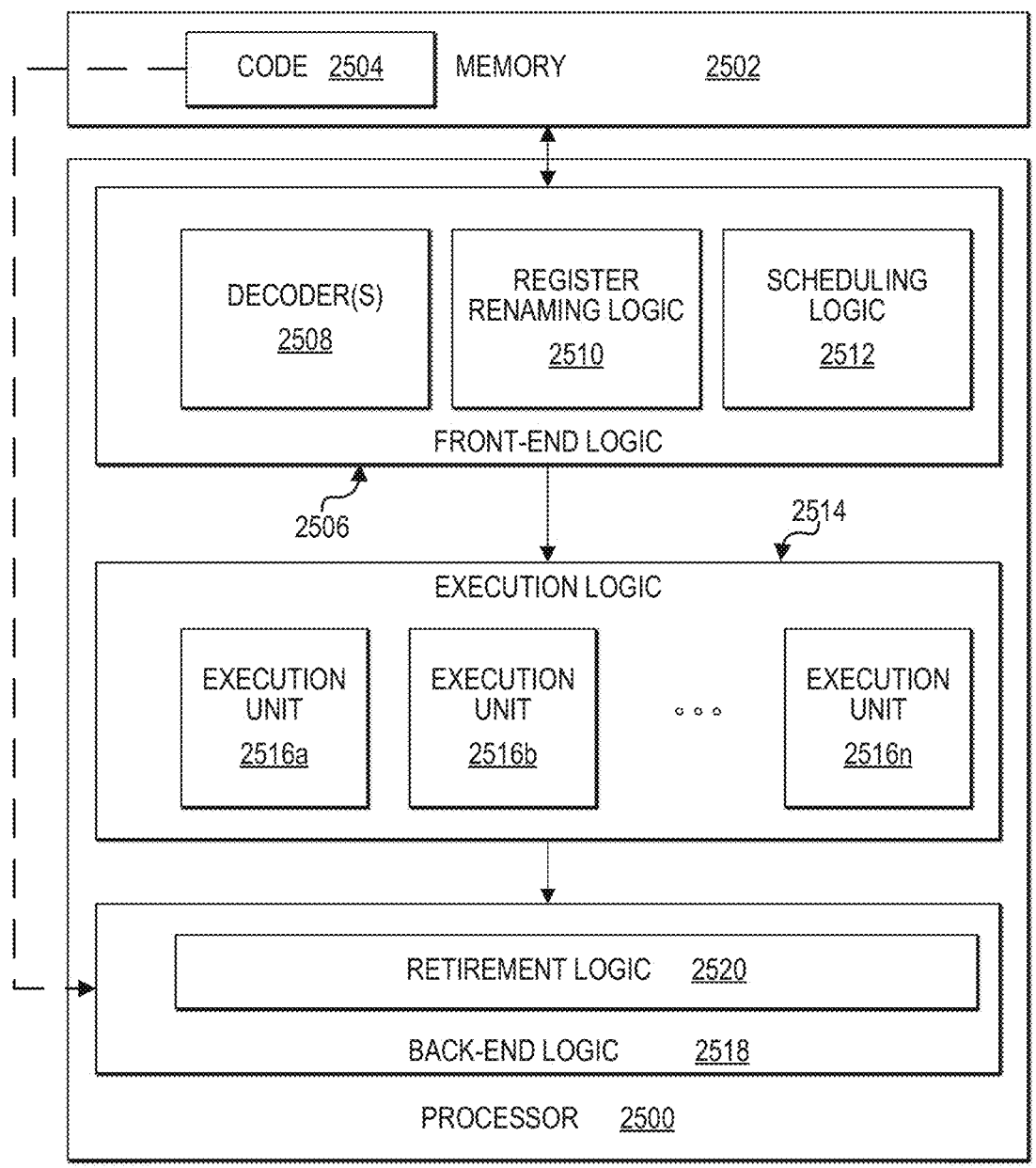
FIG. 25 is a block diagram illustrating an example processor core and memory according to an embodiment.
Figure 26:
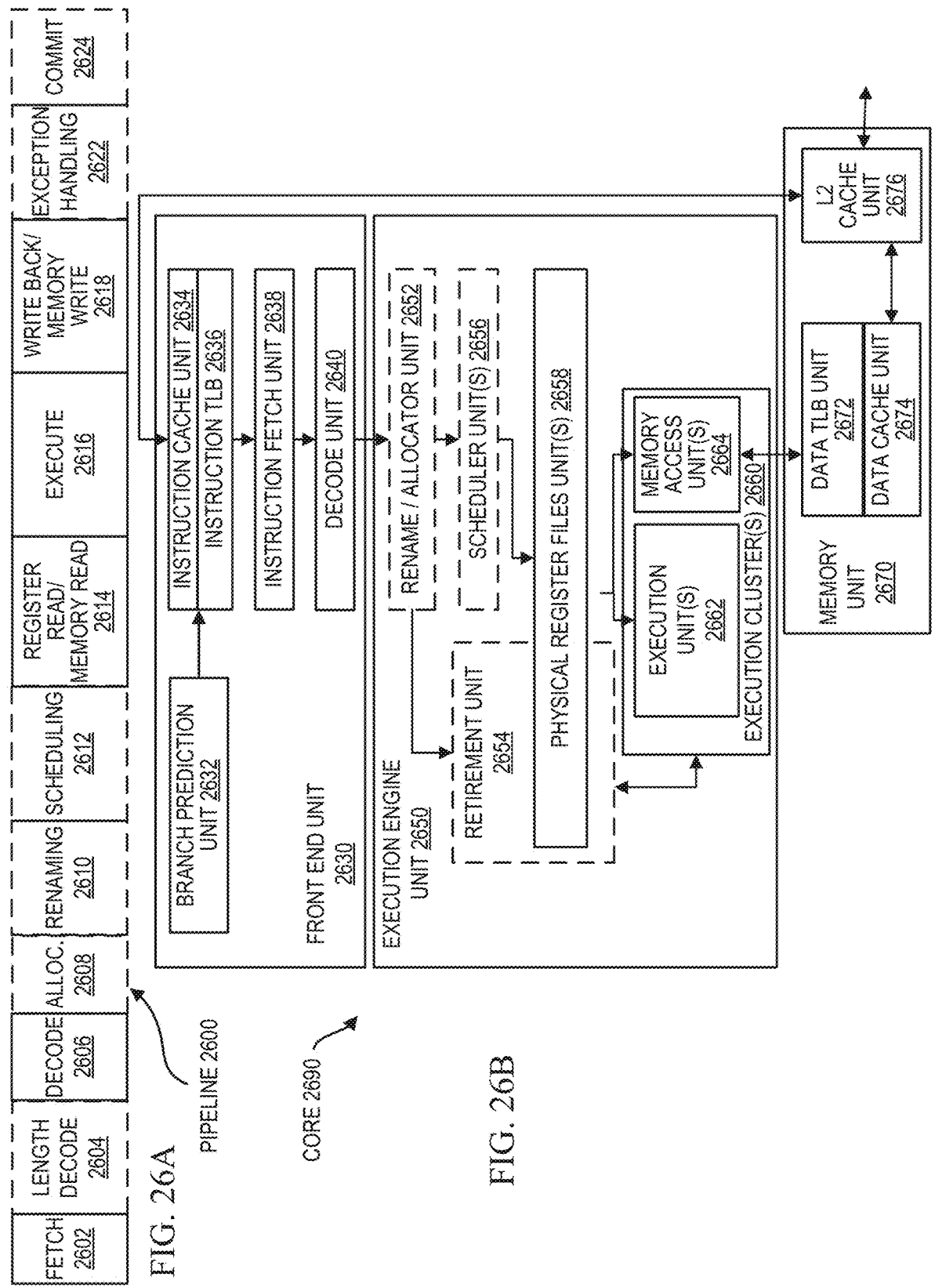
FIG. 26A is a block diagram illustrating both an exemplary in-order pipeline and an exemplary register renaming, out-of-order issue/execution pipeline in accordance with certain embodiments.
FIG. 26B is a block diagram illustrating both an exemplary embodiment of an in-order architecture core and an exemplary register renaming, out-of-order issue/execution architecture core to be included in a processor in accordance with certain embodiments.
Figure 27:
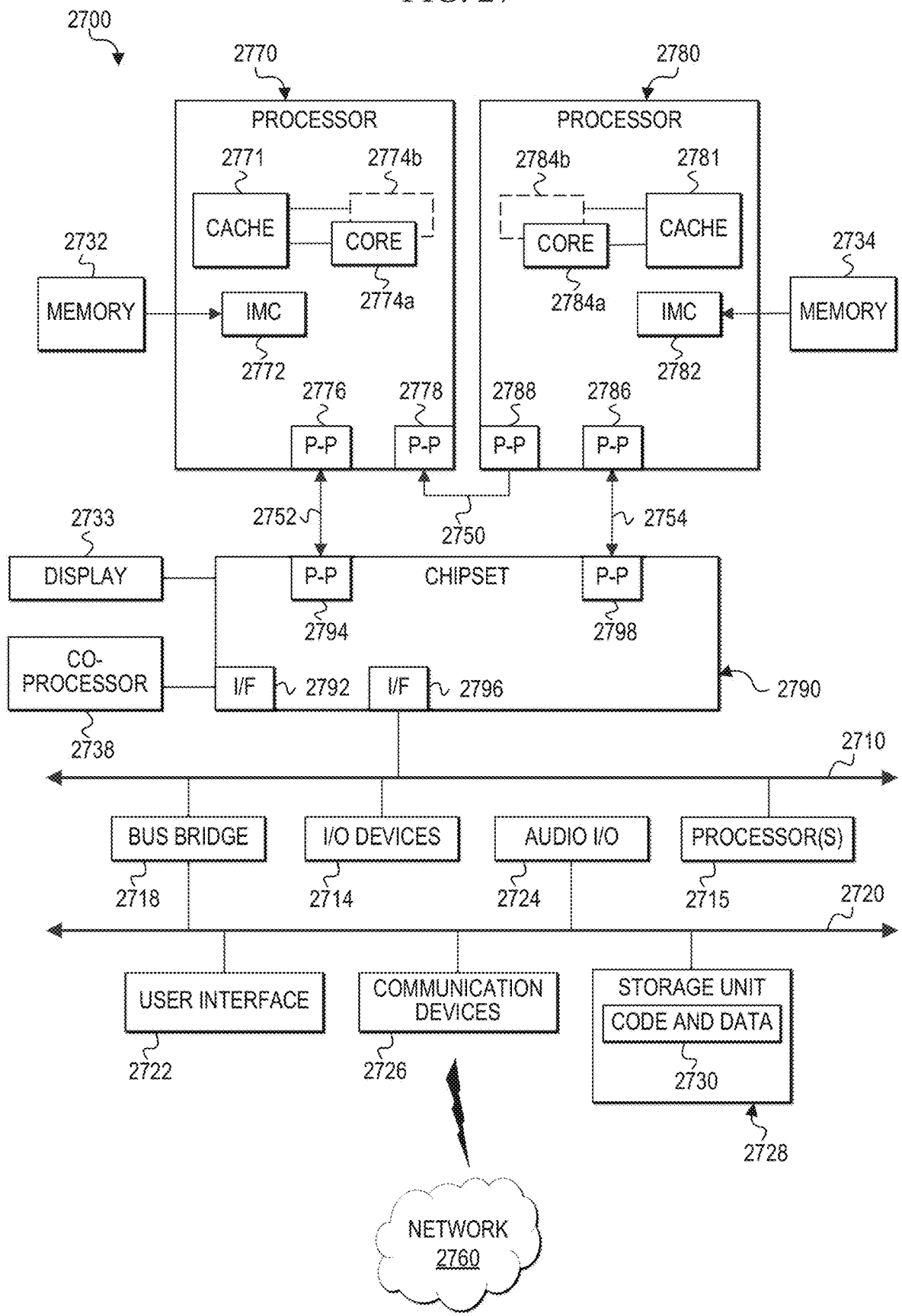
FIG. 27 is a block diagram of an example computer architecture according to an embodiment.

FIGS. 25-27 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 25-27.

FIG. 25 is an example illustration of a processor according to an embodiment. Processor 2500 is an example of a type of hardware device that can be used in connection with the implementations shown and described herein (e.g., processor 102, processor circuitry 630, cores 632). Processor 2500 may be any type of processor, such as a microprocessor, an embedded processor, a digital signal processor (DSP), a network processor, a multi-core processor, a single core processor, or other device to execute code. Although only one processor 2500 is illustrated in FIG. 25, a processing element may alternatively include more than one of processor 2500 illustrated in FIG. 25. Processor 2500 may be a single-threaded core or, for at least one embodiment, the processor 2500 may be multi-threaded in that it may include more than one hardware thread context (or "logical processor") per core.

FIG. 25 also illustrates a memory 2502 coupled to processor 2500 in accordance with an embodiment. Memory 2502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 2500 can execute any type of instructions associated with algorithms, processes, or operations detailed herein. Generally, processor 2500 can transform an element or an article (e.g., data) from one state or thing to another state or thing.

Code 2504, which may be one or more instructions to be executed by processor 2500, may be stored in memory 2502, or may be stored in software, hardware, firmware, or any suitable combination thereof, or in any other internal or external component, device, element, or object where appropriate and based on particular needs. In one example, processor 2500 can follow a program sequence of instructions indicated by code 2504. Each instruction enters a front-end logic 2506 and is processed by one or more decoders 2508. The decoder may generate, as its output, a micro operation such as a fixed width micro operation in a predefined format, or may generate other instructions, microinstructions, or control signals that reflect the original code instruction. Front-end logic 2506 also includes register renaming logic 2510 and scheduling logic 2512, which generally allocate resources and queue the operation corresponding to the instruction for execution.

Processor 2500 can also include execution logic 2514 having a set of execution units 2516*a*, 2516*b*, 2516*n*, etc. Some embodiments may include a number of execution units dedicated to specific functions or sets of functions. Other embodiments may include only one execution unit or one execution unit that can perform a particular function. Execution logic 2514 performs the operations specified by code instructions.

After completion of execution of the operations specified by the code instructions, back-end logic 2518 can retire the instructions of code 2504. In one embodiment, processor 2500 allows out of order execution but requires in order retirement of instructions. Retirement logic 2520 may take a variety of known forms (e.g., re-order buffers or the like). In this manner, processor 2500 is transformed during execution of code 2504, at least in terms of the output generated by the decoder, hardware registers and tables utilized by register renaming logic 2510, and any registers (not shown) modified by execution logic 2514.

Although not shown in FIG. 25, a processing element may include other elements on a chip with processor 2500. For example, a processing element may include memory control logic along with processor 2500. The processing element may include I/O control logic and/or may include I/O control logic integrated with memory control logic. The processing element may also include one or more caches. In some embodiments, non-volatile memory (such as flash memory or fuses) may also be included on the chip with processor 2500.

FIG. 26A is a block diagram illustrating both an exemplary in-order pipeline and an exemplary register renaming, out-of-order issue/execution pipeline according to one or more embodiments of this disclosure. FIG. 26B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 26A-26B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 26A, a processor pipeline 2600 includes a fetch stage 2602, a length decode stage 2604, a decode stage 2606, an allocation stage 2608, a renaming stage 2610, a schedule (also known as a dispatch or issue) stage 2612, a register read/memory read stage 2614, an execute stage 2616, a write back/memory write stage 2618, an exception handling stage 2622, and a commit stage 2624.

FIG. 26B shows processor core 2690 including a front end unit 2630 coupled to an execution engine unit 2650, and both are coupled to a memory unit 2670. Processor core 2690 and memory unit 2670 are examples of the types of hardware that can be used in connection with the implementations shown and described herein (e.g., processor 102, processor circuitry 630, cores 632, and/or memory 120). The core 2690 may be a reduced instruction set computing (RISC) core, a complex instruction set computing (CISC) core, a very long instruction word (VLIW) core, or a hybrid or alternative core type. As yet another option, the core 2690 may be a special-purpose core, such as, for example, a network or communication core, compression engine, coprocessor core, general purpose computing graphics processing unit (GPGPU) core, graphics core, or the like. In addition, processor core 2690 and its components represent example architecture that could be used to implement logical processors and their respective components.

The front end unit 2630 includes a branch prediction unit 2632 coupled to an instruction cache unit 2634, which is coupled to an instruction translation lookaside buffer (TLB) unit 2636, which is coupled to an instruction fetch unit 2638, which is coupled to a decode unit 2640. The decode unit 2640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2690 includes a microcode ROM or other medium that stores microcode for certain macroinstructions (e.g., in decode unit 2640 or otherwise within the front end unit 2630). The decode unit 2640 is coupled to a rename/allocator unit 2652 in the execution engine unit 2650.

The execution engine unit 2650 includes the rename/allocator unit 2652 coupled to a retirement unit 2654 and a set of one or more scheduler unit(s) 2656. The scheduler unit(s) 2656 represents any number of different schedulers, including reservations stations, central instruction window, etc. The scheduler unit(s) 2656 is coupled to the physical register file(s) unit(s) 2658. Each of the physical register file(s) units 2658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2658 comprises a vector registers unit, a write mask registers unit, and a scalar registers unit. These register units may provide architectural vector registers, vector mask registers, and general purpose registers (GPRs). In at least some embodiments described herein, register file(s) units 2658 are examples of the types of hardware that can be used in connection with the implementations shown and described herein (e.g., registers 112). The physical register file(s) unit(s) 2658 is overlapped by the retirement unit 2654 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 2654 and the physical register file(s) unit(s) 2658 are coupled to the execution cluster(s) 2660. The execution cluster(s) 2660 includes a set of one or more execution units 2662 and a set of one or more memory access units 2664. The execution units 2662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 2662 may also include an address generation unit (e.g., 822) to calculate addresses used by the core to access main memory (e.g., memory unit 2670) and a page miss handler (PMH) (e.g., 826).

The scheduler unit(s) 2656, physical register file(s) unit(s) 2658, and execution cluster(s) 2660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2664). It should also be understood that where separate pipelines are used, one or more of these pipelines may be out-of-order issue/execution and the rest in-order.

The set of memory access units 2664 is coupled to the memory unit 2670, which includes a data TLB unit 2672 coupled to a data cache unit 2674 coupled to a level 2 (L2) cache unit 2676. In one exemplary embodiment, the memory access units 2664 may include a load unit, a store address unit, and a store data unit, each of which is coupled to the data TLB unit 2672 in the memory unit 2670. The instruction cache unit 2634 is further coupled to a level 2 (L2) cache unit 2676 in the memory unit 2670. The L2 cache unit 2676 is coupled to one or more other levels of cache and eventually to a main memory. In addition, a page miss handler (e.g., page miss handler 826) may also be included in core 2690 to look up an address mapping in a page table if no match is found in the data TLB unit 2672.

By way of example, the exemplary register renaming, out-of-order issue/execution core architecture may implement the pipeline 2600 as follows: 1) the instruction fetch unit 2638 performs the fetch and length decoding stages 2602 and 2604; 2) the decode unit 2640 performs the decode stage 2606; 3) the rename/allocator unit 2652 performs the allocation stage 2608 and renaming stage 2610; 4) the scheduler unit(s) 2656 performs the schedule stage 2612; 5) the physical register file(s) unit(s) 2658 and the memory unit 2670 perform the register read/memory read stage 2614; the execution cluster 2660 perform the execute stage 2616; 6) the memory unit 2670 and the physical register file(s) unit(s) 2658 perform the write back/memory write stage 2618; 7) various units may be involved in the exception handling stage 2622; and 8) the retirement unit 2654 and the physical register file(s) unit(s) 2658 perform the commit stage 2624.

The core 2690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 2634/2674 and a shared L2 cache unit 2676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 27 illustrates a computing system 2700 that is arranged in a point-to-point (PtP) configuration according to an embodiment. In particular, FIG. 27 shows a system where processors, memory, and input/output devices are interconnected by a number of point-to-point interfaces. Generally, one or more of the computing systems or computing devices described herein (e.g., such as computing device 100 for example) may be configured in the same or similar manner as computing system 2700.

Processors 2770 and 2780 may be implemented as single core processors 2774a and 2784a or multi-core processors 2774a-2774b and 2784a-2784b. Processors 2770 and 2780 may each include a cache 2771 and 2781 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 2700. Moreover, processors 2770 and 2780 are examples of the types of hardware that can be used in connection with the implementations shown and described herein (e.g., processor 102, processor circuitry 630, cores 632).

Processors 2770 and 2780 may also each include integrated memory controller logic (MC) 2772 and 2782 to communicate with memory elements 2732 and 2734, which may be portions of main memory locally attached to the respective processors. In alternative embodiments, memory controller logic 2772 and 2782 may be discrete logic separate from processors 2770 and 2780. Memory elements 2732 and/or 2734 may store various data to be used by processors 2770 and 2780 in achieving operations and functionality outlined herein.

Processors 2770 and 2780 may be any type of processor, such as those discussed in connection with other figures. Processors 2770 and 2780 may exchange data via a point-to-point (PtP) interface 2750 using point-to-point interface circuits 2778 and 2788, respectively. Processors 2770 and 2780 may each exchange data with an input/output (I/O) subsystem 2790 via individual point-to-point interfaces 2752 and 2754 using point-to-point interface circuits 2776, 2786, 2794, and 2798. I/O subsystem 2790 may also exchange data with a high-performance graphics circuit 2738 via a high-performance graphics interface 2739, using an interface circuit 2792, which could be a PtP interface circuit. In one embodiment, the high-performance graphics circuit 2738 is a special-purpose processor, such as, for example, a high-throughput MIC processor, a network or communication processor, compression engine, graphics processor, GPGPU, embedded processor, or the like. I/O subsystem 2790 may also communicate with a display 2733 for displaying data that is viewable by a human user. In alternative embodiments, any or all of the PtP links illustrated in FIG. 27 could be implemented as a multi-drop bus rather than a PtP link.

I/O subsystem 2790 may be in communication with a bus 2710 via an interface circuit 2796. Bus 2710 may have one or more devices that communicate over it, such as a bus bridge 2718, I/O devices 2714, and one or more other processors 2715. Via a bus 2720, bus bridge 2718 may be in communication with other devices such as a user interface 2722 (such as a keyboard, mouse, touchscreen, or other input devices), communication devices 2726 (such as modems, network interface devices, or other types of communication devices that may communicate through a computer network 2760), audio I/O devices 2724, and/or a data storage device 2728. Data storage device 2728 may store code and data 2730, which may be executed by processors 2770 and/or 2780. In alternative embodiments, any portions of the bus architectures could be implemented with one or more PtP links.

Program code, such as code 2730, may be applied to input instructions to perform the functions described herein and generate output information. The output information may be applied to one or more output devices, in known fashion. For purposes of this application, a processing system may be part of computing system 2700 and includes any system that has a processor, such as, for example; a digital signal processor (DSP), a microcontroller, an application specific integrated circuit (ASIC), or a microprocessor.

The program code (e.g., 2730) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 27 is a schematic illustration of an embodiment of a computing system that may be utilized to implement various embodiments discussed herein. It will be appreciated that various components of the system depicted in FIG. 27 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 28:
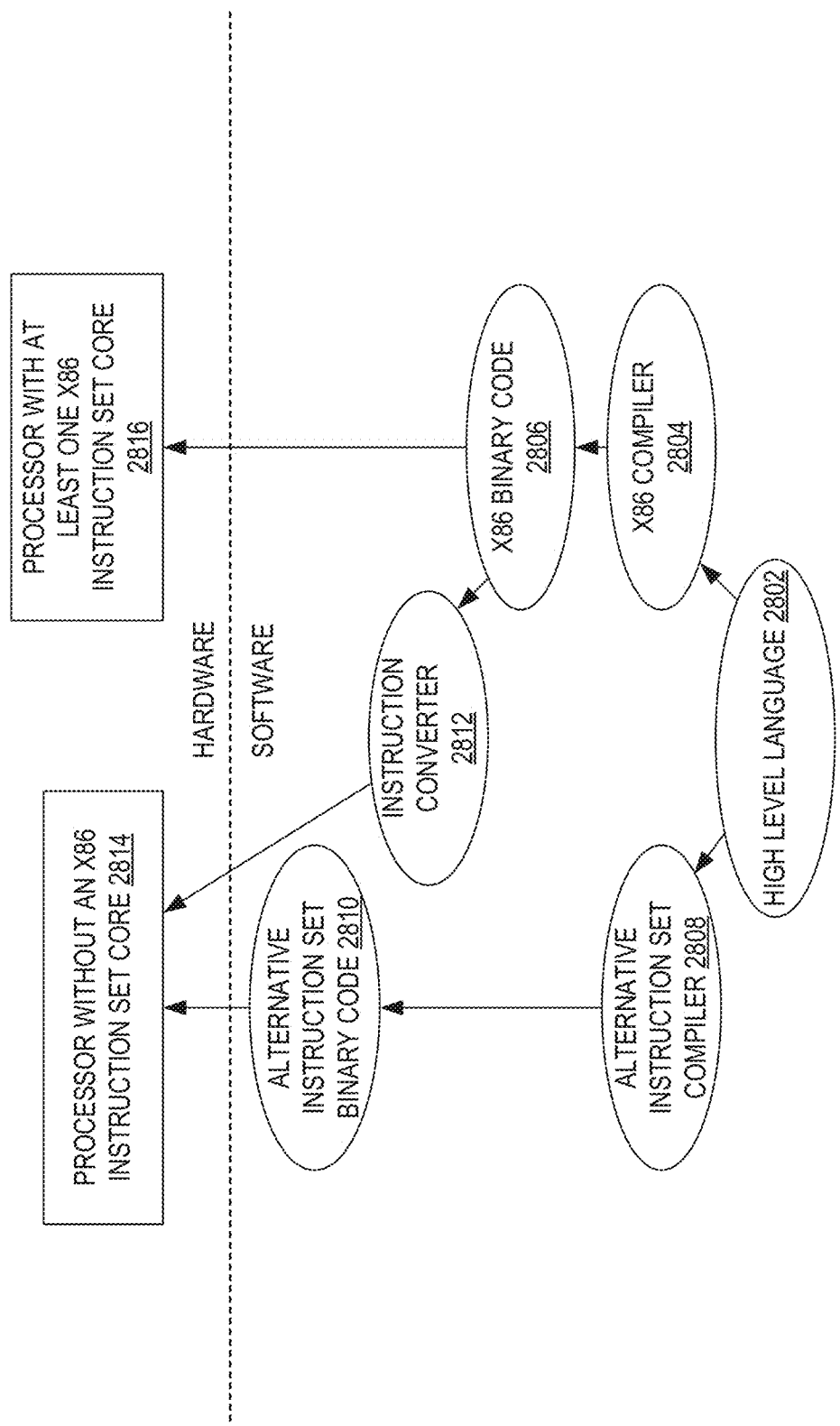
FIG. 28 is a block diagram contrasting the use of a software instruction converter to convert binary instructions in a source instruction set to binary instructions in a target instruction set according to an embodiment of the present disclosure.

FIG. 28 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 28 shows a program in a high level language 2802 may be compiled using an x86 compiler 2804 to generate x86 binary code 2806 that may be natively executed by a processor with at least one x86 instruction set core 2816. The processor with at least one x86 instruction set core 2816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2804 represents a compiler that is operable to generate x86 binary code 2806 (e.g., object code) that can, with or without additional linkage processing, be executed on the processor with at least one x86 instruction set core 2816. Similarly, FIG. 28 shows the program in the high level language 2802 may be compiled using an alternative instruction set compiler 2808 to generate alternative instruction set binary code 2810 that may be natively executed by a processor without at least one x86 instruction set core 2814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2812 is used to convert the x86 binary code 2806 into code that may be natively executed by the processor without an x86 instruction set core 2814. This converted code is not likely to be the same as the alternative instruction set binary code 2810 because an instruction converter capable of this is difficult to make; however, the converted code will accomplish the general operation and be made up of instructions from the alternative instruction set. Thus, the instruction converter 2812 represents software, firmware, hardware, or a combination thereof that, through emulation, simulation or any other process, allows a processor or other electronic device that does not have an x86 instruction set processor or core to execute the x86 binary code 2806.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. The system, apparatus, method, and machine readable storage medium embodiments can include one or a combination of the following examples:

Example A1 provides a processor comprising a register and circuitry coupled to a memory. The register is to store a first encoded pointer for a first memory allocation for an application, where size metadata is stored in first bits of the first encoded pointer and first memory address data is stored in second bits of the first encoded pointer. The circuitry is to determine a first memory address of a first marker region in the first memory allocation; obtain current data from the first marker region at the first memory address; compare the current data to a reference marker stored separately from the first memory allocation; and determine that the first memory allocation is in a first state in response to a determination that the current data corresponds to the reference marker.

Example A2 comprises the subject matter of Example A1, and the first state indicates that at least a portion of the first memory allocation overlaps with a previous memory allocation and that a first keystream to be used for cryptographic operations on first objects to be stored in the first memory allocation is equivalent to a second keystream previously used for cryptographic operations on second objects currently stored in the previous memory allocation.

Example A3 comprises the subject matter of any one of Examples A1-A2, and the circuitry is further to, in response to a determination that the first memory allocation is in the first state, prevent access to contents currently stored in the first memory allocation.

Example A4 comprises the subject matter of Example A3, and to prevent access to the contents currently stored in the first memory allocation is to include replacing the contents with replacement data.

Example A5 comprises the subject matter of Example A3, and to prevent access to the contents currently stored in the first memory allocation is to include obtaining an alternate memory allocation for the application and generating an alternate encoded pointer for the alternate memory allocation, and the alternate encoded pointer is to include alternate memory address data that is different than the first memory address data for the first memory allocation.

Example A6 comprises the subject matter of Example A3, and to prevent access to the contents currently stored in the first memory allocation is to include modifying version metadata in the first encoded pointer.

Example A7 comprises the subject matter of any one of Examples A1-A6, and the circuitry is further to: in response to a first memory allocation request for the application, perform a memory allocation operation including obtaining the first memory allocation and generating the first encoded pointer; prior to the first memory allocation request, in response to a memory deallocation request for a second memory allocation, store the reference marker at a second marker region in the second memory allocation; and deallocate the second memory allocation.

Example A8 comprises the subject matter of Example A7, and the circuitry is further to, prior to storing the reference marker in the second marker region in the second memory allocation, encrypt the reference marker based, at least in part, on a tweak including one or more bits from a second encoded pointer for the second memory allocation.

Example A9 comprises the subject matter of any one of Examples A7-A8, and the first marker region and the second marker region are determined to be located at the first memory address in the memory based on the first memory allocation being assigned to a same slot defined in the memory to which the second memory allocation was previously assigned, and the slot is aligned with a power of two boundary, and the first marker region and the second marker region include a midpoint of the slot.

Example A10 comprises the subject matter of any one of Examples A7-A8, and the first memory allocation is a first stack frame allocated for a first function of the application, and the second memory allocation is a second stack frame allocated for a second function of the application, and to store the reference marker at the second marker region is to replace a return address for the second function.

Example A11 comprises the subject matter of any one of Examples A1-A8, and the first marker region includes a midpoint of a slot defined in the memory, and the slot is aligned with a power of two boundary and sized to contain the first memory allocation.

Example A12 comprises the subject matter of Example A11, and to determine that the current data corresponds to the reference marker is to include determining at least one of: a lower portion of the reference marker matches a lower portion of the current data; or an upper portion of the reference marker matches an upper portion of the current data.

Example A13 comprises the subject matter of any one of Examples A1-A12, and to obtain the current data from the first marker region of the first memory allocation is to include: reading encrypted data from the first marker region at the first memory address of the first memory allocation; and performing a decryption operation on the encrypted data to generate the current data, and input to the decryption operation includes a tweak, the tweak including the size metadata and at least a portion of the first memory address data in the first encoded pointer.

Example A14 comprises the subject matter of Example A1, and the first state indicates that the first memory allocation has not been initialized.

Example A15 comprises the subject matter of Example A14, and the first memory address of the first marker region is determined in response to a memory access request, and the circuitry is further to, in response to a determination that the first memory allocation is in the first state, load initialization data into a register to perform the memory access request.

Example A16 comprises the subject matter of Example A15, and the initialization data is one of all bit values being zeros, all bit values being ones, a deterministic pattern of bit values, or a random pattern of bit values.

Example A17 comprises the subject matter of any one of Examples A14-A16, and the circuitry is further to: in response to a first memory allocation request for the application, perform a memory allocation operation including obtaining the first memory allocation and generating the first encoded pointer; prior to outputting the first encoded pointer to the application, encrypt the reference marker based, at least in part, on a tweak including one or more bits from the first encoded pointer and store the encrypted reference marker in the first marker region of the first memory allocation.

Example A18 comprises the subject matter of any one of Examples A1-A17, and the reference marker is selected during one of: a first initialization process of a boot operation for the processor; a second initialization process of a virtual machine; a third initialization process of the application; a fifth initialization process of variables in a function called in the application; or a memory deallocation request.

Example A19 comprises the subject matter of any one of Examples A1-A18, and the reference marker is stored separately from the first memory allocation in one of main memory, cache memory, a register, or a separate storage unit connected to the processor.

Example M1 provides a method comprising: generating, by a processor, a first encoded pointer for a first memory allocation for an application, and size metadata and first memory address data are stored in the first encoded pointer; determining a first memory address of a first marker region in the first memory allocation; obtaining current data from the first marker region at the first memory address; comparing the current data to a reference marker stored separately from the first memory allocation; and determining that the first memory allocation is in a first state in response to a determination that the current data corresponds to the reference marker.

Example M2 comprises the subject matter of Example M1, and the first state indicates that at least a portion of the first memory allocation overlaps with a previous memory allocation and that a first keystream to be used for cryptographic operations on first objects to be stored in the first memory allocation is equivalent to a second keystream previously used for cryptographic operations on second objects currently stored in the previous memory allocation.

Example M3 comprises the subject matter of any one of Examples M1-M2, and further comprises, in response to a determination that the first memory allocation is in the first state, preventing access to contents currently stored in the first memory allocation.

Example M4 comprises the subject matter of Example M3, and the preventing access to the contents currently stored in the first memory allocation includes replacing the contents with replacement data.

Example M5 comprises the subject matter of Example M3, and the preventing access to the contents currently stored in the first memory allocation includes obtaining an alternate memory allocation for the application and generating an alternate encoded pointer for the alternate memory allocation, and the alternate encoded pointer includes alternate memory address data that is different than the first memory address data for the first memory allocation.

Example M6 comprises the subject matter of Example M3, and the preventing access to the contents currently stored in the first memory allocation includes modifying version metadata in the first encoded pointer.

Example M7 comprises the subject matter of any one of Examples M1-M6, and further comprises: in response to a first memory allocation request for the application, performing a memory allocation operation including obtaining the first memory allocation; prior to the first memory allocation request, in response to a memory deallocation request for a second memory allocation, storing the reference marker at a second marker region in the second memory allocation; and deallocating the second memory allocation.

Example M8 comprises the subject matter of Example M7, and further comprises prior to storing the reference marker in the second marker region in the second memory allocation, encrypting the reference marker based, at least in part, on a tweak including one or more bits from a second encoded pointer for the second memory allocation.

Example M9 comprises the subject matter of any one of Examples M7-M8, and the first marker region and the second marker region are determined to be located at the first memory address in the memory based on the first memory allocation being assigned to a same slot defined in memory to which the second memory allocation was previously assigned, and the slot is aligned with a power of two boundary, and the first marker region and the second marker region include a midpoint of the slot.

Example M10 comprises the subject matter of any one of Examples M7-M8, and the first memory allocation is a first stack frame allocated for a first function of the application, and the second memory allocation is a second stack frame allocated for a second function of the application, and the storing the reference marker at the second marker region includes replacing a return address for the second function.

Example M11 comprises the subject matter of any one of Examples M1-M8, and the first marker region includes a midpoint of a slot defined in memory, and the slot is aligned with a power of two boundary and sized to contain the first memory allocation.

Example M12 comprises the subject matter of Example M11, and the determining that the current data corresponds to the reference marker includes determining at least one of: a lower portion of the reference marker matches a lower portion of the current data; or an upper portion of the reference marker matches an upper portion of the current data.

Example M13 comprises the subject matter of any one of Examples M1-M12, and the obtaining the current data from the first marker region of the first memory allocation includes: reading encrypted data from the first marker region at the first memory address of the first memory allocation; and performing a decryption operation on the encrypted data to generate the current data, and input to the decryption operation includes a tweak, the tweak including the size metadata and at least a portion of the first memory address data in the first encoded pointer.

Example M14 comprises the subject matter of Example M1, and the first state indicates that the first memory allocation has not been initialized.

Example M15 comprises the subject matter of Example M14, and further comprises in response to a determination that the first memory allocation is in the first state, loading initialization data into a register to perform a memory access request.

Example M16 comprises the subject matter of Example M15, and the initialization data is one of all bit values being zeros, all bit values being ones, a deterministic pattern of bit values, or a random pattern of bit values.

Example M17 comprises the subject matter of any one of Examples M14-M16, and further comprises: in response to a first memory allocation request for the application, performing a memory allocation operation including obtaining the first memory allocation and generating the first encoded pointer; prior to outputting the first encoded pointer to the application, encrypting the reference marker based, at least in part, on a tweak including one or more bits from the first encoded pointer and storing the encrypted reference marker in the first marker region of the first memory allocation.

Example M18 comprises the subject matter of any one of Examples M1-M17, and the reference marker is selected during one of: a first initialization process of a boot operation for the processor; a second initialization process of a virtual machine; a third initialization process of the application; a fifth initialization process of variables in a function called in the application; or a memory deallocation request.

Example M19 comprises the subject matter of any one of Examples M1-M18, and the reference marker is stored separately from the first memory allocation in one of main memory, cache memory, a register, or a separate storage unit connected to the processor.

An Example Y1 provides an apparatus, the apparatus comprising means for performing the method of any one of the Examples M1-M19.

Example Y2 comprises the subject matter of Example Y1, and the means for performing the method comprises at least one processor and at least one memory element.

Example Y3 comprises the subject matter of Example Y2, and the at least one memory element comprises machine readable instructions that when executed, cause the apparatus to perform the method of any one of Examples M1-M19.

Example Y4 comprises the subject matter of any one of Examples Y1-Y3, and the apparatus is one of a computing system or a system-on-a-chip.

An Example X1 provides at least one machine readable storage medium comprising instructions, where the instructions when executed realize an apparatus or implement a method as in any one of Examples A1-A19 or M1-M19.

An Example Z1 provides a system that comprises the processor and the memory of any one of Examples A1-A19.

What is claimed is:

1. A processor, comprising:
    a register to store a first encoded pointer for a first memory allocation for an application; and
    circuitry coupled to a memory, the circuitry to:
        determine a first memory address of a first marker region in the first memory allocation;
        obtain current data from the first marker region at the first memory address;
        compare the current data to a reference marker stored separately from the first memory allocation;
        determine that the first memory allocation is in a first state based on a determination that the current data corresponds to the reference marker; and
        based on the first memory allocation being in the first state, prevent access to contents currently stored in the first memory allocation.

2. The processor of claim 1, wherein the first state indicates that at least a portion of the first memory allocation overlaps with a previous memory allocation and that a first keystream to be used for cryptographic operations on first objects to be stored in the first memory allocation is equivalent to a second keystream previously used for cryptographic operations on second objects currently stored in the previous memory allocation.

3. The processor of claim 1, wherein to prevent access to the contents currently stored in the first memory allocation is to include replacing the contents with replacement data.

4. The processor of claim 1, wherein to prevent access to the contents currently stored in the first memory allocation is to include obtaining an alternate memory allocation for the application and generating an alternate encoded pointer for the alternate memory allocation, wherein the first encoded pointer is to include first memory address data associated with the first memory allocation, wherein the alternate encoded pointer is to include alternate memory address data that is different than the first memory address data for the first memory allocation.

5. The processor of claim 1, wherein to prevent access to the contents currently stored in the first memory allocation is to include modifying version metadata in the first encoded pointer.

6. The processor of claim 1, wherein the circuitry is further to:
    in response to a first memory allocation request for the application, perform a memory allocation operation including obtaining the first memory allocation and generating the first encoded pointer;
    prior to the first memory allocation request, in response to a memory deallocation request for a second memory allocation, store the reference marker at a second marker region in the second memory allocation; and
    deallocate the second memory allocation.

7. The processor of claim 6, wherein the circuitry is further to:
    prior to storing the reference marker in the second marker region in the second memory allocation, encrypt the reference marker based, at least in part, on a tweak including one or more bits from a second encoded pointer for the second memory allocation.

8. The processor of claim 6, wherein the first marker region and the second marker region are determined to be located at the first memory address in the memory based on the first memory allocation being assigned to a same slot defined in the memory to which the second memory allocation was previously assigned, wherein the slot is aligned with a power of two boundary, and wherein the first marker region and the second marker region include a midpoint of the slot.

9. The processor of claim 6, wherein the first memory allocation is a first stack frame allocated for a first function of the application, wherein the second memory allocation is a second stack frame allocated for a second function of the application, and wherein to store the reference marker at the second marker region is to replace a return address for the second function.

10. The processor of claim 1, wherein the first marker region includes a midpoint of a slot defined in the memory, wherein the slot is aligned with a power of two boundary and sized to contain the first memory allocation.

11. The processor of claim 10, wherein to determine that the current data corresponds to the reference marker is to include determining at least one of:
    a lower portion of the reference marker matches a lower portion of the current data; or
    an upper portion of the reference marker matches an upper portion of the current data.

12. The processor of claim 1, wherein to obtain the current data from the first marker region of the first memory allocation is to include:
    reading encrypted data from the first marker region at the first memory address of the first memory allocation; and
    performing a decryption operation on the encrypted data to generate the current data, wherein input to the decryption operation includes a tweak, the tweak including size metadata and at least a portion of first memory address data associated with the first memory allocation, wherein the size metadata is to be stored in first bits of the first encoded pointer, and wherein the first memory address data is to be stored in second bits of the first encoded pointer.

13. The processor of claim 1, wherein the first state indicates that the first memory allocation has not been initialized.

14. The processor of claim 13, wherein the first memory address of the first marker region is determined in response to a memory access request, wherein the circuitry is further to:
    in response to the determination that the current data corresponds to the reference marker, load initialization data into a second register to perform the memory access request.

15. The processor of claim 14, wherein the initialization data is one of all bit values being zeros, all bit values being ones, a deterministic pattern of bit values, or a random pattern of bit values.

16. The processor of claim 14, wherein the circuitry is further to:
    in response to a first memory allocation request for the application, perform a memory allocation operation including obtaining the first memory allocation and generating the first encoded pointer; and
    prior to outputting the first encoded pointer to the application, encrypt the reference marker based, at least in part, on a tweak including one or more bits from the first encoded pointer and store the encrypted reference marker in the first marker region of the first memory allocation.

17. The processor of claim 1, wherein the reference marker is selected during one of:
    a first initialization process of a boot operation for the processor;
    a second initialization process of a virtual machine;
    a third initialization process of the application;
    a fifth initialization process of variables in a function called in the application; or
    a memory deallocation request.

18. The processor of claim 1, wherein the reference marker is stored separately from the first memory allocation in one of main memory, cache memory, another register, or a separate storage unit connected to the processor.

19. One or more non-transitory machine-readable media including instructions stored therein that, when executed, cause a processor to:
    generate a first encoded pointer for a first memory allocation for an application;
    determine a first memory address of a first marker region in the first memory allocation;
    obtain current data from the first marker region at the first memory address;
    compare the current data to a reference marker stored separately from the first memory allocation;
    determine that the first memory allocation is in a first state based on a determination that the current data corresponds to the reference marker; and
    based on determining that the first memory allocation is in the first state, prevent access to contents currently stored in the first memory allocation.

20. The one or more non-transitory machine-readable media of claim 19, wherein the instructions, when executed, cause the processor further to:
    in response to a first memory allocation request for the application, perform a memory allocation operation including obtaining the first memory allocation;
    prior to the first memory allocation request, in response to a memory deallocation request for a second memory allocation, store the reference marker at a second marker region in the second memory allocation; and
    deallocate the second memory allocation.

21. The one or more non-transitory machine-readable media of claim 20, wherein the first marker region includes a midpoint of a slot defined in memory, wherein the slot is aligned with a power of two boundary and sized to contain the first memory allocation.

22. The one or more non-transitory machine-readable media of claim 19, wherein to prevent access to the contents currently stored in the first memory allocation is to include replacing the contents with replacement data.

23. The one or more non-transitory machine-readable media of claim 20, wherein the first state indicates that the first memory allocation has not been initialized.

24. A method comprising:
    generating, by a processor, a first encoded pointer for a first memory allocation for an application;
    determining a first memory address of a first marker region in the first memory allocation;
    obtaining current data from the first marker region at the first memory address;
    comparing the current data to a reference marker stored separately from the first memory allocation;

determining that the first memory allocation is in a first state based on a determination that the current data corresponds to the reference marker; and based on the determining that the first memory allocation is in the first state, preventing access to contents currently stated in the first memory allocation.

25. The method of claim 24, further comprising:

in response to a first memory allocation request for the application, performing a memory allocation operation including obtaining the first memory allocation and generating the first encoded pointer;

prior to the first memory allocation request, in response to a memory deallocation request for a second memory allocation, storing the reference marker at a second marker region in the second memory allocation; and deallocating the second memory allocation.

\* \* \* \* \*